US010873957B2

(12) United States Patent
Yoon et al.

(10) Patent No.: US 10,873,957 B2
(45) Date of Patent: *Dec. 22, 2020

(54) METHOD AND APPARATUS FOR TRANSMITTING ADAPTIVE PARTIAL SUBFRAME IN UNLICENSED FREQUENCY BAND, METHOD AND APPARATUS FOR IDENTIFYING A FRAME STRUCTURE, AND METHOD AND APPARATUS FOR TRANSMITTING SIGNAL

(71) Applicant: ELECTRONICS AND TELECOMMUNICATIONS RESEARCH INSTITUTE, Daejeon (KR)

(72) Inventors: Chanho Yoon, Daejeon (KR); Young Jo Ko, Daejeon (KR); Seung-Kwon Baek, Daejeon (KR); Eunkyung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/401,491

(22) Filed: May 2, 2019

(65) Prior Publication Data
US 2019/0261388 A1    Aug. 22, 2019

Related U.S. Application Data

(63) Continuation of application No. 15/317,098, filed as application No. PCT/KR2016/004568 on Apr. 29, 2016, now Pat. No. 10,314,063.

(30) Foreign Application Priority Data

May 12, 2015  (KR) .................. 10-2015-0066067
May 12, 2015  (KR) .................. 10-2015-0066075

(Continued)

(51) Int. Cl.
H04L 12/28    (2006.01)
H04W 72/12   (2009.01)
(Continued)

(52) U.S. Cl.
CPC .......... *H04W 72/1215* (2013.01); *H04L 1/00* (2013.01); *H04L 5/00* (2013.01); *H04L 5/0044* (2013.01);
(Continued)

(58) Field of Classification Search
CPC .. H04L 5/003; H04W 72/0446; H04W 16/14; H04W 74/0808; H04W 74/0825
(Continued)

(56) References Cited

U.S. PATENT DOCUMENTS 8,279,767 B2    10/2012  Kang et al.
8,472,465 B2    6/2013   Suo et al.
(Continued)

FOREIGN PATENT DOCUMENTS

JP    2011-146974 A      7/2011
KR    10-2013-0035830 A  4/2013
(Continued)

OTHER PUBLICATIONS

R1-152027, 3GPP TSG RAN WG1 Meeting #80bis, Belgrade, Serbia, Apr. 11, 2015.
(Continued)

Primary Examiner — John Pezzlo
(74) Attorney, Agent, or Firm — Rabin & Berdo, P.C.

(57) ABSTRACT

There is provided a method for transmitting, by a transmitter, a signal through an unlicensed band channel. The transmitter transmits an initial signal through the unlicensed band channel to preoccupy the unlicensed band channel when the unlicensed band channel is in an idle status. The transmitter includes a first partial subframe transmitted after
(Continued)

the initial signal in a frame burst depending to transmission timing of the initial signal. Further, the transmitter transmits the frame burst through the unlicensed band channel.

10 Claims, 50 Drawing Sheets

(30) Foreign Application Priority Data

| | | |
|---|---|---|
| May 22, 2015 | (KR) | 10-2015-0071964 |
| May 26, 2015 | (KR) | 10-2015-0072864 |
| May 29, 2015 | (KR) | 10-2015-0076377 |
| Jun. 18, 2015 | (KR) | 10-2015-0086688 |
| Sep. 1, 2015 | (KR) | 10-2015-0123724 |
| Sep. 10, 2015 | (KR) | 10-2015-0128608 |
| Nov. 6, 2015 | (KR) | 10-2015-0156160 |
| Jan. 12, 2016 | (KR) | 10-2016-0003869 |
| Mar. 22, 2016 | (KR) | 10-2016-0034296 |
| Mar. 22, 2016 | (KR) | 10-2016-0034299 |
| Apr. 19, 2016 | (KR) | 10-2016-0047539 |

(51) Int. Cl.

| | |
|---|---|
| *H04W 56/00* | (2009.01) |
| *H04L 1/00* | (2006.01) |
| *H04L 27/26* | (2006.01) |
| *H04W 84/04* | (2009.01) |
| *H04L 5/00* | (2006.01) |
| *H04W 28/26* | (2009.01) |
| *H04W 72/04* | (2009.01) |
| *H04J 1/16* | (2006.01) |
| *H04W 74/08* | (2009.01) |

(52) U.S. Cl.
CPC ............ *H04L 5/0048* (2013.01); *H04L 27/26* (2013.01); *H04L 27/2613* (2013.01); *H04W 28/26* (2013.01); *H04W 56/00* (2013.01); *H04W 72/0446* (2013.01); *H04W 84/04* (2013.01); *H04L 5/0007* (2013.01); *H04L 5/0091* (2013.01); *H04W 74/0808* (2013.01)

(58) Field of Classification Search
USPC .......................... 370/252, 230, 329, 445, 478
See application file for complete search history.

(56) References Cited

U.S. PATENT DOCUMENTS

| | | | |
|---|---|---|---|
| 8,923,274 | B2 | 12/2014 | Wang et al. |
| 9,288,795 | B2 | 3/2016 | Lee et al. |
| 9,363,798 | B2 | 6/2016 | Lee et al. |
| 9,473,988 | B2 | 10/2016 | Kim et al. |
| 9,763,225 | B2 | 9/2017 | Ji et al. |
| 2012/0264468 | A1 | 10/2012 | Turtinen et al. |
| 2013/0083752 | A1 | 4/2013 | Kim et al. |
| 2013/0336180 | A1 | 12/2013 | Park et al. |
| 2014/0036853 | A1 | 2/2014 | Kim et al. |
| 2014/0140286 | A1 | 5/2014 | Kim et al. |
| 2014/0177546 | A1 | 6/2014 | Kang et al. |
| 2014/0204854 | A1 | 7/2014 | Freda et al. |
| 2014/0323126 | A1 | 10/2014 | Ro et al. |
| 2014/0341018 | A1 | 11/2014 | Bhushan et al. |
| 2015/0085797 | A1 | 3/2015 | Ji et al. |
| 2015/0201431 | A1 | 7/2015 | Um et al. |
| 2015/0215848 | A1 | 7/2015 | Yang et al. |
| 2016/0183302 | A1 | 6/2016 | Chen et al. |
| 2016/0302230 | A1* | 10/2016 | Novlan ............... H04W 40/244 |
| 2017/0238272 | A1* | 8/2017 | You ....................... H04L 5/0082 370/350 |
| 2017/0280479 | A1* | 9/2017 | Frenne .................. H04W 48/16 |
| 2017/0339704 | A1 | 11/2017 | Matsumoto et al. |
| 2018/0115991 | A1* | 4/2018 | Yang .................. H04W 74/0808 |
| 2020/0022180 | A1* | 1/2020 | Luo ....................... H04L 5/0064 |

FOREIGN PATENT DOCUMENTS

| | | |
|---|---|---|
| KR | 10-2014-0010385 A | 1/2014 |
| KR | 10-2014-0010450 A | 1/2014 |
| KR | 10-2014-0031203 A | 3/2014 |
| KR | 10-2014-0128059 A | 11/2014 |
| WO | WO-2009/070964 A1 | 6/2009 |
| WO | WO-2013/025289 A1 | 2/2013 |
| WO | WO-2015-009433 A1 | 1/2015 |

OTHER PUBLICATIONS

R1-151937, 3GPP TSG RAN WG1 Meeting #80bis, Belgrade, Serbia, Apr. 11, 2015.
R1-151572, 3GPP TSG RAN WG1 Meeting #80bis, Belgrade, Serbia, Apr. 10, 2015.
B.M. Popovic, " Efficient Golay correlator ", IEE Electronics Letters, Aug. 1999.
3GPP TS 36.211 V12.4.0, Dec. 2014.
3G TR 25.870 V5.0.0, Mar. 2002.
R1-155834, 3GPP TSG-RAN1#82bis Malmo, Sweden, Oct. 5-9, 2015.
R1-157240, 3GPP TSG RAN WG1 Meeting #83 Anaheim, USA, Nov. 15-22, 2015.
R1-143964, 3GPP TSG-RAN1#78b Ljubljana, Slovenia, Oct. 6-10, 2014.
R1-157914, 3GPP TSG-RAN Meeting #83 Anaheim, CA, USA, Nov. 15-22, 2015.
R1-157893, 3GPP TS 36.213 V12.7.0, pp. 166-220, Sep. 2015.
R1-157890, 3GPP TSG-RAN WG1 Meeting #83 Anaheim, USA, Nov. 15-22, 2015.
R1-157102, 3GPP TSG-RAN1#83 Anaheim, USA, Nov. 16-20, 2015.
R1-154389, 3GPP TSG-RAN1#82 Beijing, China, Aug. 24-28, 2015.
R1-150647, 3GPP TSG-RAN1#80 Athens, Greece, Feb. 9-13, 2015.
3GPP TS 36.211 V13.2.0, Jun. 2016.
3GPP TS 36.211 V13.1.0, Mar. 2016.
3GPP TS 36.311 V13.0.0, Dec. 2015.
3GPP TS 36.213 V13.3.0, Sep. 2016.
ITL Inc: "Discussion on Channel Access Mechanism based on LBT for LAA", 3GPP Draft R1-145109, 3rd Generation Partnership Project (3GPP), Mobile Competence Centre; 650, Route Des Lucioles; F-06921 Sophia-Antipolis Cedex; France vol. RAN WG1, No. San Francisco, USA; Nov. 17, 2014-Nov. 21, 2014, Nov. 17, 2014 (Nov. 17, 2014), XP050876141, Retrieved from the Internet:URL:http://www.3gpp.org/ftp/Meetings_3GPP_SYNC/RAN1/Docs/ [retrieved on Nov. 17, 2014].
NVIDIA: "Discussion on potential solutions for LAA-LTE", 3GPP Draft; R1-145013, 3rd Generation Partnership Project (3GPP), Mobile Competence Centre; 650, Route Des Lucioles; F-06921 Sophia-Antipolis Cedex; France vol. RAN WG1, No. San Francisco, USA; Nov. 17, 2014-Nov. 21, 2014, Nov. 17, 2014 (Nov. 17, 2014), XP050876059, Retrieved from the Internet:URL:http://www.3gpp.org/ftp/Meetings_3GPP_SYNC/RAN1/Docs/ [retrieved on Nov. 17, 2014].

\* cited by examiner

METHOD AND APPARATUS FOR TRANSMITTING ADAPTIVE PARTIAL SUBFRAME IN UNLICENSED FREQUENCY BAND, METHOD AND APPARATUS FOR IDENTIFYING A FRAME STRUCTURE, AND METHOD AND APPARATUS FOR TRANSMITTING SIGNAL

CROSS-REFERENCE TO RELATED APPLICATION

This application is a continuation of U.S. application Ser. No. 15/317,098, filed on Dec. 7, 2016, which was a National Stage application of PCT/KR2016/004568, filed on Apr. 29, 2016, and claims the benefit of priority of Korean Patent Application Nos. 10-2015-0066067 filed on May 12, 2015, 10-2015-0066075 filed on May 12, 2015, 10-2015-0071964 filed on May 22, 2015, 10-2015-0072864 filed on May 26, 2015, 10-2015-0076377 filed on May 29, 2015, 10-2015-0086688 filed on Jun. 18, 2015, 10-2015-0123724 filed on Sep. 1, 2015, 10-2015-0128608 filed on Sep. 10, 2015, 10-2015-0156160 filed on Nov. 6, 2015, 10-2016-0003869 filed on Jan. 12, 2016, 10-2016-0034296 filed on Mar. 22, 2016, 10-2016-0034299 filed on Mar. 22, 2016, and 10-2016-0047539 filed on Apr. 19, 2016, the entire contents of which are incorporated herein by reference.

TECHNICAL FIELD

The present invention relates to a method and an apparatus for transmitting an adaptive partial subframe in a wireless communication cellular system of an unlicensed frequency band, a method and an apparatus for identifying a frame structure, and a method and an apparatus for transmitting a signal.

BACKGROUND ART

The existing long term evolution (LTE) cellular network is operated only in a licensed band. Notwithstanding that a technology for continuously increasing capacity has been developed, as a demand for high-capacity and fast data service is increased, an LTE standard is not limited to the existing licensed band and adopts a method for accommodating an unlicensed band having a rich frequency bandwidth to increase capacity. The capacity increasing method is now in a standardization stage of $3^{rd}$ generation partnership project (3GPP).

However, unlike a licensed band not hindered by other providers or other devices but having a high degree of freedom, for an unlicensed band, a coexistence problem with devices operated in another unlicensed band needs to be solved. That is, a channel approach and occupation method for temporarily using, by a device, a corresponding channel at every opportunity without greatly lowering performance of other devices on the same unlicensed channel are required.

To solve the coexistence problem, a method known as 'transmission method after sensing of carrier' (for example, clear channel assessment (CCA) or listen before talk (LBT)) has been widely used. The channel approach method is first performed by channel monitoring. That is, a device senses activity of an unlicensed band channel shared with other devices and if energy of the corresponding channel is measured, puts off a wireless signal transmission but if energy of the corresponding channel is not sensed (that is, channel idle status), uses the corresponding channel (transmits or outputs a wireless signal).

If the device senses the channel idle status and then transmits the signal, other devices determine that the energy of the corresponding channel is sensed and thus the corresponding channel is busy and put off the signal transmission. That is, the channel approach method of the unlicensed band may be one of a kind of time division multiple access methods for dividing time to make a plurality of devices approach a radio channel.

Further, an LTE frame of an unlicensed band needs to be time-synchronized with an LTE frame operated in a licensed band. A technology for improving signal transmission efficiency under the situation that the restrictions are present is required.

DISCLOSURE

Technical Problem

The present invention has been made in an effort to provide a method and an apparatus for increasing signal transmission efficiency in an unlicensed band.

Technical Solution

An exemplary embodiment of the present invention provides a method for transmitting, by a transmitter, a signal through an unlicensed band. The method includes: transmitting an initial signal through the unlicensed band channel to preoccupy the unlicensed band channel when the unlicensed band channel is in an idle status; including a first partial subframe to be transmitted after the initial signal in a frame burst depending to transmission timing of the initial signal; and transmitting the frame burst through the unlicensed band channel.

The transmitting of the initial signal may include: immediately transmitting the initial signal without waiting starting timing of a time domain symbol when the unlicensed band channel is in the idle status.

The including of the first partial subframe in the frame burst may include: including a second partial subframe in an end of the frame burst according to the transmission timing of the initial signal.

The first partial subframe may have one of a time length corresponding to one slot and a time length corresponding to a time shifted downlink pilot time slot (DwPTS).

The second partial subframe may have a time length corresponding to a DwPTS.

The initial signal may include a reservation signal with a variable length. The generating of the time domain sequence may include: converting the physical cell ID of the transmitter into a binary number; and generating the frequency domain sequence including a value corresponding to each position of the binary number as an element among (1+j) and (−1−j).

The initial signal may include a reservation signal with a variable length, and time taken to transmit 128 time domain sequences for the reservation signal may be equal to transmission time of one orthogonal frequency division multiplexing (OFDM) symbol other than a cyclic prefix (CP).

The initial signal may include a reservation signal and a synchronous reference signal transmitted after the reservation signal.

The transmitting of the initial signal may include: generating the synchronous reference signal having a time length corresponding to one OFDM symbol.

The including of the first partial subframe in the frame burst may include: generating the first partial subframe having a time length corresponding to one slot, when the transmission timing of the initial signal corresponds to a 1st, 2nd, 3rd, 4th, 5th, or 6th OFDM symbol among 14 OFDM symbols.

The including of the second partial subframe in the end of the frame burst may include: generating the second partial subframe when the transmission timing of the initial signal corresponds to the rest OFDM symbols other than 1st, 2nd, and 3rd OFDM symbols among 14 OFDM symbols.

The including of the first partial subframe in the frame burst may include: generating the first partial subframe having a time length corresponding to 12 OFDM symbols, when the transmission timing of the initial signal corresponds to a 1st OFDM symbol among 14 OFDM symbols; and generating the first partial subframe having a time length corresponding to 7 OFDM symbols, when the transmission timing of the initial signal corresponds to a 6th OFDM symbol among 14 OFDM symbols.

The including of the first partial subframe in the frame burst may include: generating a first indicator indicating configuration information on a first subframe at which the first indicator is transmitted and configuration information on a second subframe subsequent to the first subframe; and including the first indicator in the frame burst.

The first subframe may be one of a partial subframe and a full subframe.

The first indicator may indicate at least one of the number of OFDM symbols occupied within the first subframe and the number of OFDM symbols occupied within the second subframe.

The first indicator may indicate which of a downlink subframe, a special subframe, and an uplink subframe the second subframe corresponds to.

Another exemplary embodiment of the present invention provides a method for transmitting, by a transmitter, a signal through an unlicensed band. The method includes: transmitting first grant information for transmission of a first receiver through the unlicensed band channel; and transmitting first information indicating timing when the first grant information is transmitted through the unlicensed band channel.

The transmitting of the first information may include: generating the first information including a first bit that corresponds to a subframe at which the first grant information is transmitted among a predetermined number of past subframes based on timing when the first information is transmitted and that has a predetermined value.

The method may further include: transmitting second information indicating timing which the first grant information is transmitted through the unlicensed band channel, when a signal corresponding to the first grant information is not received from the first receiver.

The second information may include a first bit corresponding to a subframe at which the first grant information is transmitted among a predetermined number of past subframes based on timing when the second information is transmitted and having a predetermined value.

Yet another exemplary embodiment of the present invention provides a method for transmitting, by a terminal, a signal through an unlicensed band channel. The method includes: receiving first grant information for uplink transmission of the terminal from a base station through the unlicensed band channel at first timing; receiving first information indicating transmission timing of the first grant information from the base station through the unlicensed band channel; and transmitting a first uplink signal corresponding to the first grant information to the base station through the unlicensed band channel, when the transmission timing of the first grant information determined on the basis of the first information matches the first timing.

The transmitting of the first uplink signal to the base station may include: determining a bit order between a first bit and a second bit, when the first information includes the first bit corresponding to a subframe at which the first grant information is transmitted and the second bit corresponding to a subframe at which second grant information is transmitted; and determining a transmission order between a second uplink signal corresponding to the second grant information and the first uplink signal, on the basis of the bit order.

The transmitting of the first uplink signal to the base station may include: checking (confirming) a status (state) of the unlicensed band channel for a predetermined time; and transmitting the first uplink signal to the base station through the unlicensed band channel, when the unlicensed band channel is in an idle status.

The predetermined time may be shorter than a duration where the base station checks (confirms) the status (state) of the unlicensed band channel.

Advantageous Effects

According to an exemplary embodiment of the present invention, the terminal only checks (confirms) the presence or absence of transmission at a predetermined timing when occupying an unlicensed band channel, and as a result it is possible to accurately know the channel occupation timing. Further, the terminal may efficiently receive and process the partial subframe transmitted by the base station on the basis of the accuracy.

Further, according to an exemplary embodiment of the present invention, it is possible to efficiently increase the data transmission in the unlicensed band in which the discontinuous transmission is performed by the regulatory requirement (for example, LBT, maximum limited time of continuous transmission).

Further, according to an exemplary embodiment of the present invention, it is possible to improve the transmission efficiency of each data link even when the uplink and the downlink are present together.

Further, according to an exemplary embodiment of the present invention, the mechanism for performing, by the scheduling-based cellular network, the uplink transmission depending on the instruction of the base station in the unlicensed band may be preserved.

MODE FOR INVENTION

Figure 1:
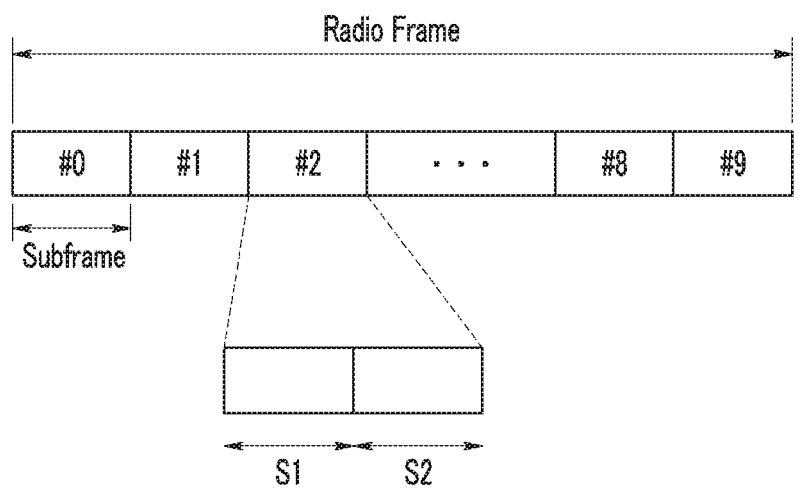
FIG. 1 is a diagram illustrating a radio frame structure used in a mobile communication system of a licensed band, according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A case in which any one part is connected with the other part includes a case in which the parts are directly connected with each other and a case in which the parts are electrically connected with each other with other elements interposed therebetween.

In the specification and claims, unless explicitly described to the contrary, the word "comprise" and variations such as "comprises" or "comprising", will be understood to imply the inclusion of stated elements but not the exclusion of any other elements.

Throughout the specification, a terminal may refer to a mobile terminal, a mobile station, an advanced mobile station, a high reliability mobile station, a subscriber station, a portable subscriber station, an access terminal, user equipment, and the like and may also include all or some of the functions of the terminal, the mobile terminal, the mobile station, the advanced mobile station, the high reliability mobile station, the subscriber station, the portable subscriber station, the access terminal, the user equipment, and the like.

Further, a base station (BS) may refer to an advanced base station, a high reliability base station, a nodeB, an evolved node B (eNodeB, eNB), an access point, a radio access station, a base transceiver station, a mobile multihop relay (MMR)-BS, a relay station serving as a base station, a high reliability relay station serving as a base station, a repeater, a macro base station, a small base station, and the like and may also include functions of all or some of the base station, the advanced base station, the HR-BS, the nodeB, the eNodeB, the access point. the radio access station, the base transceiver station, the MMR-BS, the relay station, the high reliability relay station, the repeater, the macro base station, the small base station, and the like.

Meanwhile, in the present specification, 'A or B' may include 'A', '13', or 'A and B'.

1. Method for Acquiring Automatic Time Synchronization in Wireless Communication Cellular System of Unlicensed Frequency Band To use an unlicensed band in an LTE cellular network, it is essential to be time-synchronized with an LTE frame operated in a licensed band.

Therefore, the LTE cellular network needs to solve the problem of the occupation of the unlicensed band channel and the time synchronization with the licensed band.

The licensed band and the unlicensed band have different channel characteristics such as delay spread. Therefore, when the terminal takes the time synchronization of the received frame, there are characteristics in that optimal symbol timing is different in the licensed band and the unlicensed band. The existing licensed band has a structure of correcting and tracking the time synchronization of the terminal based on a primary synchronization signal (PSS) transmission every 5 ms. However, the base station may not transmit the PSS for the time synchronization every 5 ms in the unlicensed band. This is due to factors such as LBT regulations, maximum continuous transmission time limitation, and channel occupation by other devices as described above. Therefore, there is a problem in that it is actually difficult to periodically acquire the time synchronization due to discontinuity of the unlicensed band and unpredictable channel occupation probability.

Hereinafter, a communication method for achieving time synchronization of a received signal and maintaining frame synchronization with a licensed band when a mobile communication system of a licensed band intends to use an unlicensed band will be described. Hereinafter, a communication method using an unlicensed band in a mobile communication system of a licensed band will be described.

FIG. 1 is a diagram illustrating a radio frame structure used in a mobile communication system of a licensed band, according to an exemplary embodiment of the present invention.

Referring to FIG. 1, in a long term evolution (LTE) system that is a representative mobile communication system operating a licensed band, one frame has a length of 10 ms and includes ten subframes #0 to #9 in a time domain. Each subframe #0 to #9 has a length of 1 ms and consists of two slots S1 and S2. Each slot S1 and S2 has a length of 0.5 ms. The slots S1 and S2 include a plurality of transmission symbols in the time domain and a plurality of resource blocks (RBs) in the frequency domain. The resource block includes a plurality of subcarriers in the frequency domain. The transmission symbol may be called an orthogonal frequency division multiplex (OFDM) symbol, an DELETEDTEXTS symbol, an SC-FDMA symbol, etc., depending on a multiple access scheme. The number of transmission symbols included in one slot may be variously changed depending on a channel bandwidth or a length of a cyclic prefix (CP). For example, in the case of a normal CP in the LTE system, one slot includes 7 transmission symbols but in the case of an extended CP, one slot includes 6 transmission symbols. The number of subframes included in a radio frame, the number of slots included in a subframe, or the number of transmission symbols included in a slot may be variously changed.

Figure 2:
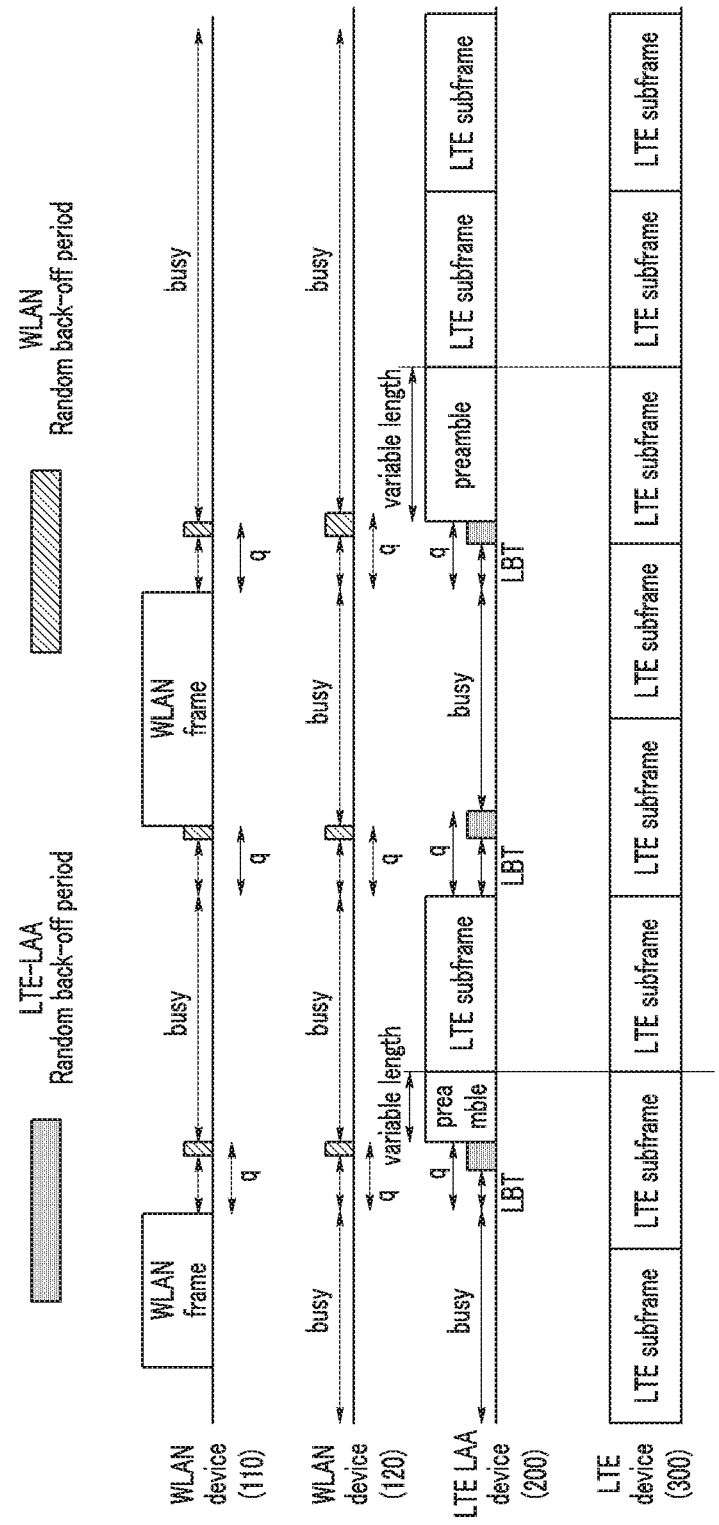
FIG. 2 is a diagram describing a method for using an unlicensed band in an LTE system, according to an exemplary embodiment of the present invention.

FIG. 2 is a diagram describing a method for using an unlicensed band in an LTE system, according to an exemplary embodiment of the present invention. Referring to FIG. 2, the LTE system supports a license assisted access (LAA) integrating a license frequency band and an unlicensed frequency band to satisfy a data demand. That is, the LTE system does not limit a use frequency to a licensed band, but secures an insufficient frequency using an unlicensed band of 5 GHz to secure additional capacity and provide a faster data speed The unlicensed band is a frequency band defined for anyone to use for free and therefore an exclusive frequency use right thereof is not guaranteed. The unlicensed band is used by wireless local area network (WLAN) devices generally called WiFi. Therefore, for the LTE system to use the unlicensed band, a method for effectively avoiding an interference problem with a WLAN device providing a service within an in-band is required.

For description of the method for using, by an LTE system, an unlicensed band, FIG. 2 illustrates two WLAN devices 110 and 120 and an LTE device (hereinafter, referred to as 'LTE LAA device') 200 using the same unlicensed band as the WLAN devices 110 and 120 and an LTE device 300 using the licensed band. Here, the device may also mean a base station or a terminal.

First, a basic access mechanism of a medium access control (MAC) in a WLAN system is a carrier sense multiple access with collision avoidance (CSMA/CA) mechanism. The CSMA/CA mechanism basically adopts a listen before talk (LBT) access mechanism. Therefore, the WLAN devices 110 and 120 may perform clear channel assessment (CCA) for sensing a radio channel, prior to starting a transmission. If it is determined that the radio channel is in an idle status for a predetermined period (DCF inter-frame space (DIFS) period), to avoid a collision, the WLAN devices 110 and 120 set (configure) a delay time (for example, WLAN random back-off period) for a channel access to wait further and then start a WLAN frame transmission. On the other hand, as the CCA sensing result, if it is sensed that the radio channel is in a busy status, the WLAN devices 110 and 120 do not start transmission and wait until the radio channel becomes an idle status.

As such, by applying the WLAN random back-off period, the WLAN devices 110 and 120 wait for different time and then try a frame transmission, thereby minimizing a collision.

The LTE LAA device 200 uses the listen before talk (LBT) mechanism as the access mechanism to use the unlicensed band. The LBT mechanism is a method for periodically listening a busy status (use or not) of a channel prior to talk a signal. Like the WLAN system, as the LBT result, if it is determined that the radio channel is in the idle status, the LTE LAA device 200 sets a delay period [for example, LTE random back-off period] for a channel access to wait and then starts a subframe transmission through the corresponding radio channel. On the other hand, if it is sensed that the radio channel is in the busy status, the LTE LAA device 200 does not start the transmission and waits until the radio channel becomes the idle status.

The LTE device 300 uses the licensed band, and therefore may directly transmit the LTE frame having the structure as illustrated in FIG. 1 if data to be transmitted are generated.

Next, a method for using, by an LTE LAA device 200, a radio channel of an unlicensed band under the environment that the WLAN devices 110 and 120, the LTE LAA device 200, and the LTE device 300 coexist will be illustrated in detail.

First, it is assumed that the WLAN device 110 transmits the WLAN frame and the LTE device 300 does not interfere with the signal of the unlicensed band and therefore continuously transmits the LTE subframe, as illustrated in FIG. 2.

When the WLAN device 110 transmits the WLAN frame, the WLAN device 120 and the LTE LAA device 200 each determine that the unlicensed band channel is in the busy status and put off the transmission. If the WLAN device 110 ends the transmission of the WLAN frame, the WLAN device 120 and the LTE LAA device 200 sense that the channel is in the idle status based on the CCA.

If it is sensed that the channel is in the idle status for the DIFS time, the WLAN device 120 waits the WLAN random back-off period further and then may perform the transmission. Similarly, the LTE LAA device 200 also performs the LBT to wait the LTE random back-off period and then perform the transmission if it is sensed that the channel is in the idle status.

As such, the WLAN device 120 and the LTE LAA device 200 contend with each other to use the unlicensed band and to win the contention and transmit data, a device that first passes through a q period corresponding to any delay time may transmit data. Here, the q may be a temporal concept and may be a counter of a 1 μs unit. In the case of the WLAN device 120, q becomes a sum of the DIFS time and the WLAN random back-off period and In the case of the LTE LAA device 200, q becomes a sum of the delay time due to the LBT function and the LTE random back-off period. Generally, the DIFS time is set to be 34 μs and the WLAN random back-off period is set to be a multiple of 9 μs including 0. Further, the sum of the delay time due to the LBT function and the LTE random back-off period is set to be N*20 μs and N is basically set randomly.

As illustrated in FIG. 2, if the LTE LAA device 200 first passes through the q period, the LTE LAA device 200 transmits a preamble and then transmits the LTE subframe including the data to be transmitted. The preamble may be transmitted up to starting timing of a subsequent subframe or designated timing. The preamble is preferentially transmitted to allow other devices to immediately recognize that the unlicensed band channel is in the busy status and is also transmitted to perform an assistant role for synchronization with the LTE subframe of the licensed band. In this case, the WLAN devices 110 and 120 generating data to be transmitted sense that the channel is in the busy status due to the preamble transmitted from the LTE LAA device 200 and put off the transmission.

Next, if the transmission of one LTE subframe is completed depending on a size of data to be transmitted by the LTE LAA device 200, the WLAN devices 110 and 120 sense that the channel is in the idle status and starts a contention for occupying the channel.

Further, if the WLAN device 110 first passes through the q period, it transmits the WLAN frame.

After the WLAN device 110 completes the transmission, the WLAN device 120 and the LTE LAA device 200 senses that the channel is in the idle status and starts a contention for occupying the channel. As illustrated in FIG. 2, if the LTE LAA device 200 first passes through the q period, the LTE LAA device 200 transmits a preamble and then transmits the LTE subframe including the data to be transmitted. In this case, at least one LTE subframe may be continuously transmitted depending on the size of data.

By the method, the WLAN devices 110 and 120 and the LTE LAA devices 200 having data to be transmitted start the contention for occupying the channel and the device occupying the channel transmits data based on the contention.

In particular, the LTE LAA device 200 starts the contention for occupying the channel regardless of a boundary of the LTE subframe to occupy the channel. When occupying the channel, the LTE LAA device 200 may transmit the preamble and then transmit the LTE subframe. The preamble has a variable length and may be equal to or shorter than the length of the subframe.

As such, the LTE LAA device 200 uses the LBT function and the preamble to use an LTE subframe of a physical layer used in the existing licensed band as it is without modifying the LTE subframe, and thus may transmit the LTE subframe even in the unlicensed band. Further, the LTE LAA device 200 does not arouse interference or is not affected by interference while coexisting with other kinds of devices like the WLAN and may occupy the channel to be used for a predetermined period.

The LBT is currently defined in ETSI and the LTE LAA device 200 according to the exemplary embodiment of the present invention uses the preamble in the unlicensed band to transmit data in the unlicensed band.

For time synchronization with the LTE licensed band, the preamble according to an exemplary embodiment of the present invention may be transmitted up to the boundary of the subframe like the starting timing of the subframe or the ending timing of the LTE licensed band. Further, the preamble may also be transmitted up to a boundary of a slot within the subframe or a boundary of a specific symbol within the subframe, not up to the boundary of the subframe. If the subframes of the unlicensed band and the licensed band have the temporal synchronization, it is advantageous in implementation or scheduling, and therefore the basic premise is that the synchronization needs to be made in the standardization stage FIG. 3 is a diagram illustrating a preamble structure, according to an exemplary embodiment of the present invention and FIG. 4 is a diagram illustrating an example of a signal [w(n)] illustrated in FIG. 3.

Figure 3:
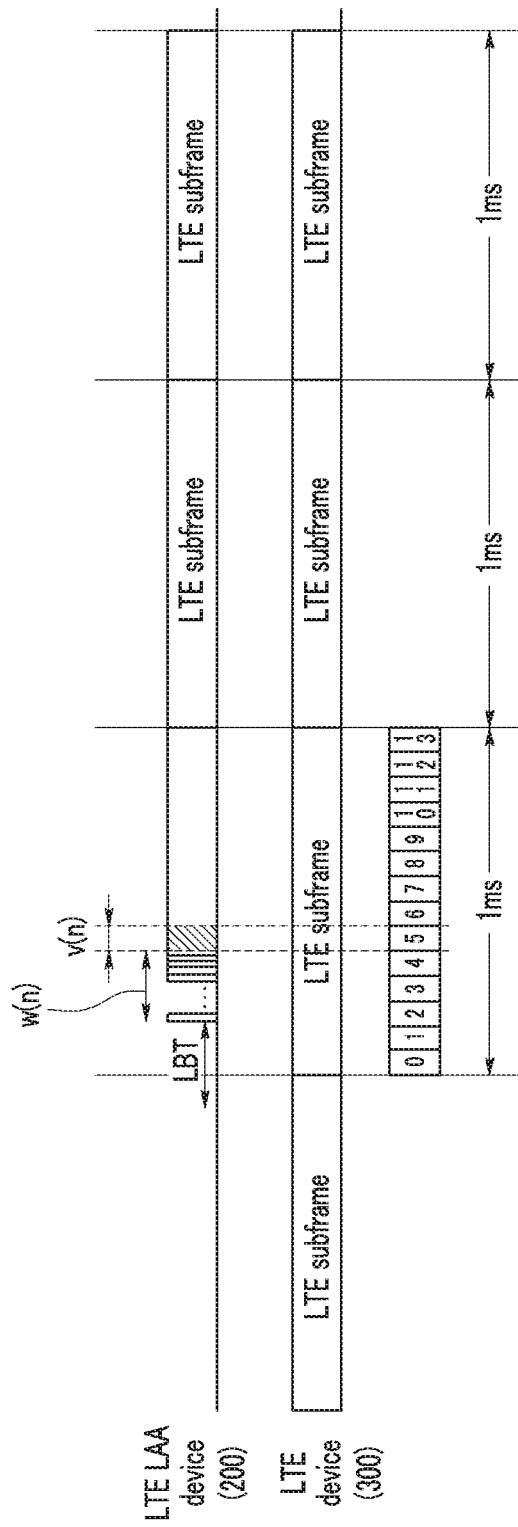
FIG. 3 is a diagram illustrating a preamble structure, according to an exemplary embodiment of the present invention.
Figure 4:
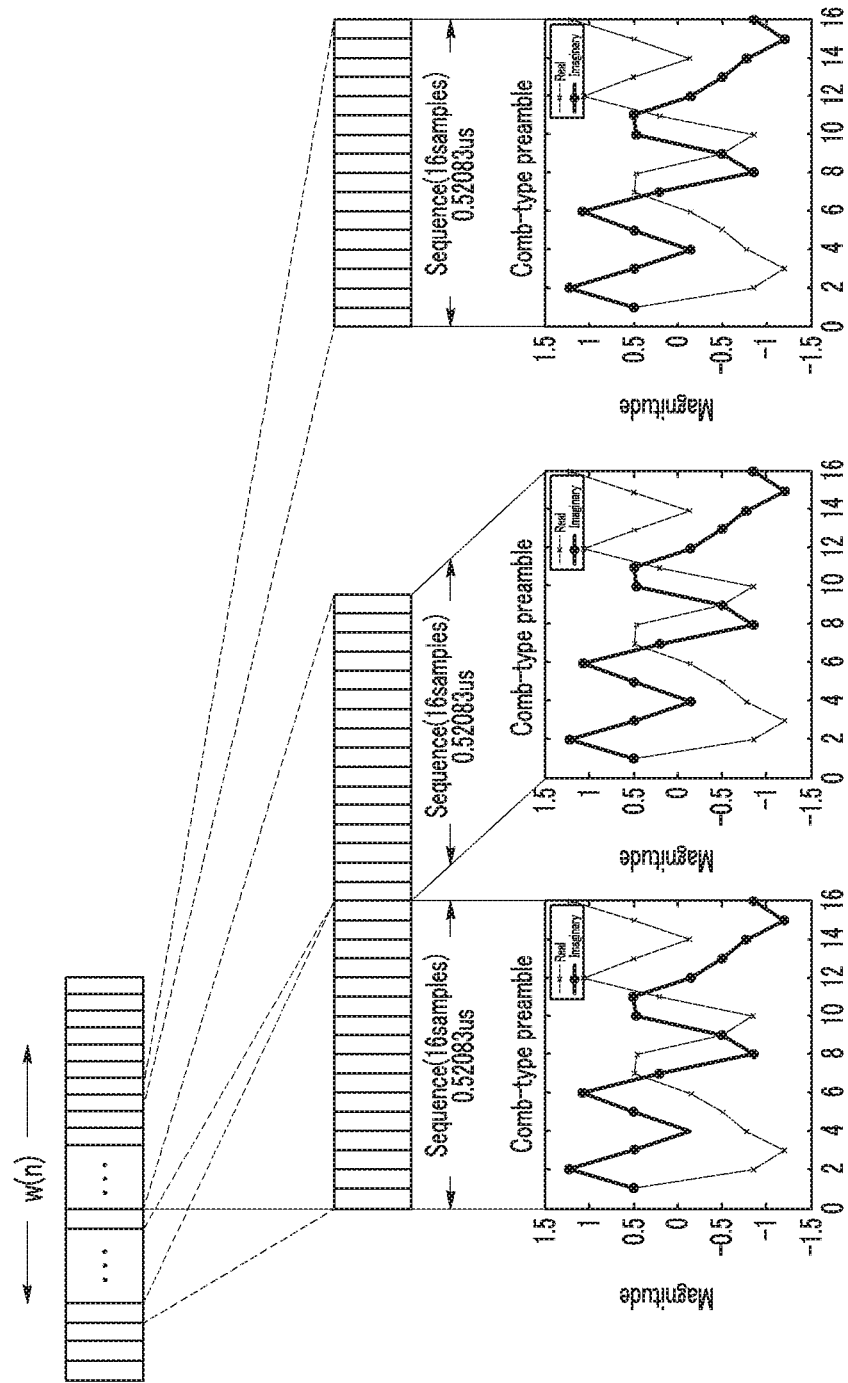
FIG. 4 is a diagram illustrating an example of a signal [w(n)] illustrated in FIG. 3.

Referring to FIG. 3, the length of the preamble is flexibly changed. The preamble includes a signal[w(n)] and a fine time symbol training field (FSTF) signal [v(n)].

The signal [w[n] may consist of at least one basic unit sequence and has a variable length.

The FSTF signal[v(n)] is positioned subsequent to the signal[w(n)] and has a length of one transmission symbol. The FSTF signal[v(n)] may be time-synchronized with a received signal at a receiving end and may be used to maintain the synchronization with the LTE subframe of the licensed band.

FIG. 3 illustrates that the preamble is transmitted up to the specific period within the subframe, not up to the boundary of the subframe, in which the specific period may be the slot and the transmission symbol.

Referring to FIG. 4, a basic unit sequence of the signal [w(n)] has a length of about 0.521 μs and has a waveform having a real value and an imaginary value.

A digital sample rate of the LTE is 30.72 MHz, time taken to transmit one sample is 0.326 μs [1/(30.72e6)] and time taken to transmit 16 samples is 0.521 [=16/(30.72e6)]. That is, a basic unit sequence of the preamble corresponds to a length of 16 samples.

For reference, a transmission time of an LTE OFDM symbol is 66.67 μs [=2048/(30.72e6)] and a transmission time/length of the CP is 4.69 μs [=144/(30.72e6)]. A length of one LTE subframe is 1 ms [=30720/(30.72e6)]. Therefore, when 1920 basic unit sequences of the preamble are continuously transmitted, it becomes 1 ms.

A basic unit sequence s(n) in the time domain having the 16 sample lengths is generated by the following Equation 1.

$$s(n) = p \cdot \sum_{k=-8}^{7} \exp(j \cdot 2\pi \cdot \Delta f \cdot k \cdot n) \cdot z(k) \quad \text{(Equation 1)}$$

$$s(n) = p \cdot \sum_{k=-8}^{7} \exp(j \cdot 2\pi \cdot \Delta f \cdot k \cdot n) \cdot z(k)$$

In the above Equation 1, p represents a constant for normalizing a signal and a sequence z(k) and an index (k) of the frequency domain are defined as the following Equation 2.

$z(k)[0\ 0\ 0\ a_{-5}\ a_{-4}\ a_{-3}\ a_{-2}\ a_{-1}\ 0\ a_1\ a_2\ a_3\ a_4\ a_5\ 0\ 0]$ $k=\{-8\ -7\ -6\ -5\ -4\ -3\ -2\ -1\ 0\ 1\ 2\ 3\ 4\ 5\ 6\ 7\}$ $z(k)=[0\ 0\ 0\ a_{-5}\ a_{-4}\ a_{-3}\ a_{-2}\ a_{-1}\ 0\ a_1\ a_2\ a_3\ a_4\ a_5\ 0\ 0]$ $k=\{-8\ -7\ -6\ -5\ -4\ -3\ -2\ -1\ 0\ 1\ 2\ 3\ 4\ 5\ 6\ 7\}$ (Equation 2)

The Equation 2 means $\Delta f$-(30.72 MHz)/16

In the above Equation, $a_{-5}$ to $a_5$ are a complex number and is defined like the following Equation 2 by a binary bit.

$b_k=0, a_k=1+j$ $b_k=1, a_k=-1-j$ $b_k=0, a_k=1+j$ $b_k=1, a_k=-1-j$

Binary bits of $b_{-5}$ to $b_5$ are determined by $N_{ID}^{(1)}$ and $N_{ID}^{(2)}$ that are a physical cell identifier (physical cell ID) of the base station defined in the LTE standard like the following Equation 4 are mapped.

$B(N_{ID}^{(2)})=b_4 b_5$ $B(N_{ID}^{(1)})=b_{-5} b_{-4} b_{-3} b_{-2} b_{-1} b_1 b_2 b_3$

Here, B(.) is a binary operator function that performs a conversion into a binary number.

$B(N_{ID}^{(2)})=b_4 b_5$ $B(N_{ID}^{(1)})=b_{-5} b_{-4} b_{-3} b_{-2} b_{-1} b_1 b_2 b_3$

For example, if it is assumed that $N_{ID}^{(2)}=2$ and $N_{ID}^{(1)}=97$, binary numbers $b_{-5} b_{-4} b_{-3} b_{-2} b_{-1} b_1 b_2 b_3 b_4 b_5$ are determined as 110000110. Therefore, z(k) becomes [0 0 0 −1−j −1−j 1+j 1+j 1+j 0 1+j 1+j −1−j −1−j 1+j 0 0].

When p is 4, if z(k) is converted into the time domain based on the above Equation 1, the basic unit sequence s(n) depends on the following Equation 5.

$$s(n)=[0.5+j0.5\ 0.82+j0.82\ 1.56+j0.15\ -0.16\ -j0.16$$
$$-2+j0\ -0.54-j0.54\ 0.85-j0.56\ -0.11-j0.11$$
$$-0.5-j0.5-0.11-j0.11\ -0.56+j0.85\ -0.54\ -j0.54$$
$$0\ -j2-0.16\ -j0.16\ 0.15+1.56\ 0.82+j0.82]$$

$$s(n)=[0.5+j0.5\ 0.82+j0.82\ 1.56+j0.15\ -0.16\ -j0.16$$
$$-2+j0\ -0.54\ -j0.54\ 0.85-j0.56\ -0.11\ -j0.11$$
$$-0.5-j0.5\ -0.11-j0.11\ -0.56+j0.85\ -0.54\ -j0.54$$
$$0\ -j2\ -0.16\ -j0.16\ 0.15+1.56\ 0.82+j0.82] \quad \text{(Equation 5)}$$

The signal[w(n)] may be generates by repeating the basic unit sequence s(n).

Referring back to FIG. 3, the LTE LAA device 200 occupies the channel, transmits at least one basic unit sequence up to designated timing, and then may transmit an FSTF signal [v(n)] for OFDM symbol timing.

The FSTF signal[v(n)] for the OFDM symbol timing is fixed to a 2192 or 2208 sample length based on sampling of 30.72 MHz. 2192 or 2208 sample lengths are represented by a sum of 2048 sample lengths and the length of the CP. That is, the FSTF signal[V(n)] has the 2192 or 2208 sample lengths depending on the length of the CP and has a length determined depending on a position of the symbol of the LTE subframe of the licensed band.

Generally, in the LTE subframe of the licensed band, in the case of the normal CP, one slot includes 7 transmission symbols and a CP of a first symbol at a first slot and a second slot has 160 sample lengths and a CP of as second to seventh symbols at the first slot and the second slot has 144 sample lengths. Therefore, if the FSTF signal[v(n)] is transmitted a position of a first symbol of the LTE subframe of the licensed band, the FSTF signal[v(n)] has the 2208 sample lengths and if the FSTF signal[v(n)] is transmitted at a position of any one of the second to seventh symbols of the LTE subframe of the licensed band, the FSTF signal[v(n)] has the 2192 sample lengths.

As illustrated in FIG. 3, if the FSTF signal[v(n)] is transmitted at a position of the fifth symbol, the FSTF signal[v(n)] may be generated to have the 2192 sample lengths.

Figure 5:
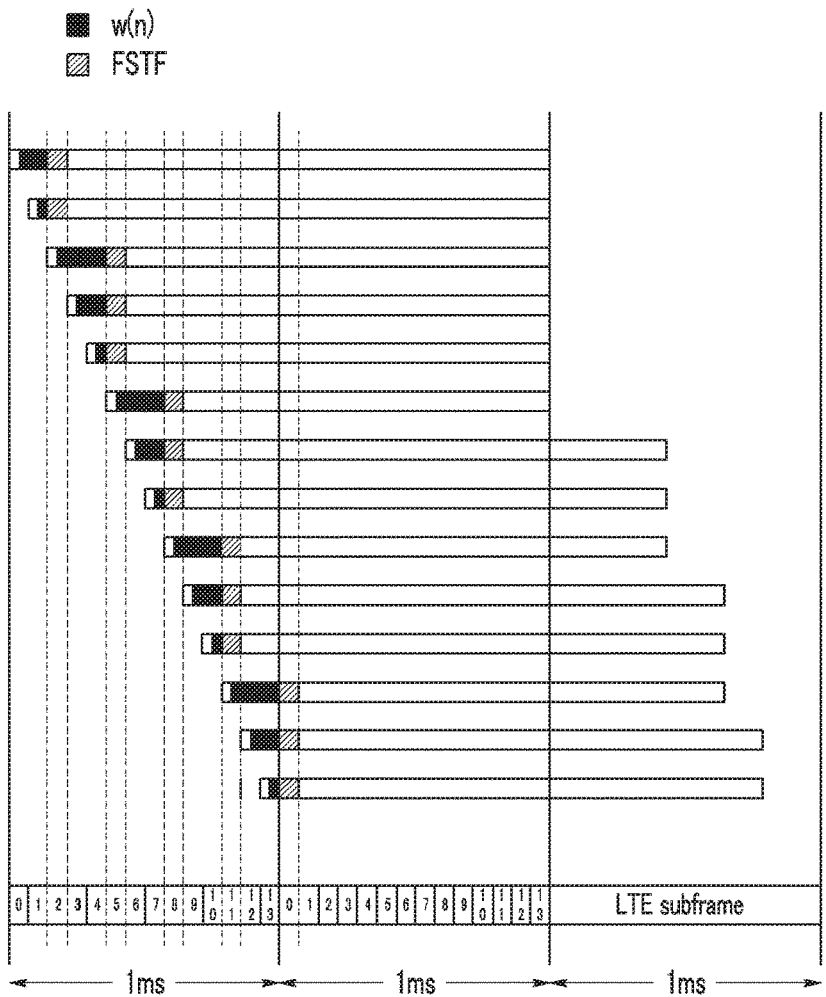
FIG. 5 is a diagram illustrating a transmission position of an FSTF signal, according to an exemplary embodiment of the present invention.

FIG. 5 is a diagram illustrating a transmission position of an FSTF signal, according to an exemplary embodiment of the present invention.

Referring to FIG. 5, it is assumed that a transmission position of the FSTF signal[v(n)] is defined as third, sixth, ninth, and twelfth symbols of odd-numbered subframes and is defined as first, fourth, seventh, tenth, and thirteenth symbols of even numbered subframes. In this case, if the corresponding channel is occupied by the LBT before starting timing of the third symbol of the odd numbered subframes, the signal[w(n)] is transmitted up to timing when the second symbol ends, and then the FSTF signal[v(n)] is transmitted from starting timing of the third symbol to timing when the third symbol ends. If the corresponding channel is occupied by the LBT before starting timing of the sixth symbol from starting timing of the third symbol of the odd numbered subframes, the signal[w(n)] is transmitted up to timing when the fifth symbol ends, and then the FSTF signal[v(n)] is transmitted from starting timing of the sixth symbol to timing when the sixth symbol ends If the corresponding channel is occupied by the LBT before starting timing of the ninth symbol from starting timing of the sixth symbol of the odd numbered subframes, the signal[w(n)] is transmitted up to timing when the eighth symbol ends, and then the FSTF signal[v(n)] is transmitted from starting timing of the ninth symbol to timing when the ninth symbol ends If the corresponding channel is occupied by the LBT before starting timing of the twelfth symbol from starting timing of the ninth symbol of the odd numbered subframes, the signal[w(n)] is transmitted up to timing when the eleventh symbol ends, and then the FSTF signal[v(n)] is transmitted from starting timing of the twelfth symbol to timing when the twelfth symbol ends By the method, the FSTF signal[v(n)] is transmitted for one symbol period.

Figure 6:
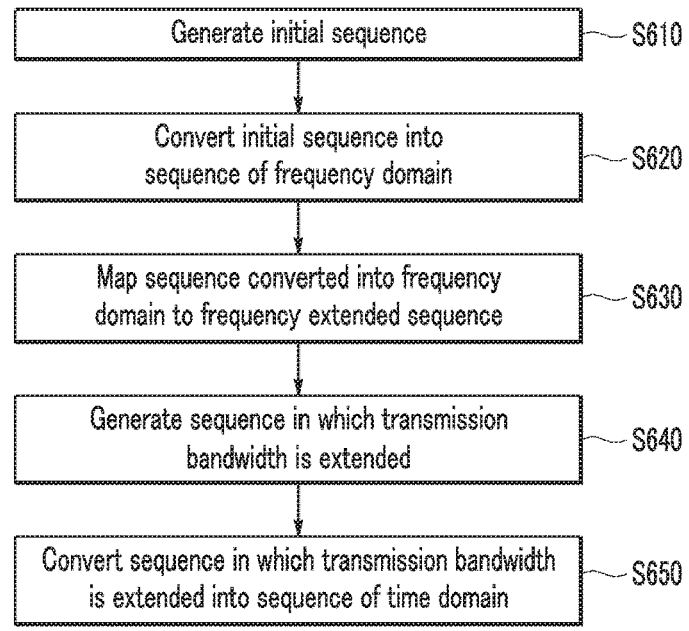
FIG. 6 is a flow chart illustrating a method for generating an FSTF signal, according to the exemplary embodiment of the present invention.

FIG. 6 is a flow chart illustrating a method for generating an FSTF signal, according to the exemplary embodiment of the present invention.

Referring to FIG. 6, to efficiently acquire the synchronization with the LTE subframe of the licensed band, the FSTF signal[v(n)] first consists of a signal[y(n)] having the 2048 sample lengths and temporally has a transmission time of 66.67 μs.

The LTE LAA device 200 uses a Golay sequence having the 1024 sample lengths to generate the signal[y(n)]. The Golay sequence may be generated based on the following Equation 6.

$$A_0(n)=\delta(n)$$

$$B_0(n)=\delta(n)$$

$$A_k(n)=W_k A_{k-1}(n)+B_{k-1}(n-D_k)$$

$$B_k(n)=W_k A_{k-1}(n)-B_{k-1}(n-D_k)$$

$$A_0(n)=\delta(n)$$

$$B_0(n)=\delta(n)$$

$$A_k(n)=W_k A_{k-1}(n)+B_{k-1}(n-D_k)$$

$$B_k(n)=W_k A_{k-1}(n)-B_{k-1}(n-D_k) \quad \text{(Equation 6)}$$

In the above Equation 6, $D_k$=[1 8 2 32 4 16 64 128 256 512]. In this case, k=1, 2, . . . , 10. $D_k$ is a Dirac delta function and when n=0, has a value of 1 and has a value of 0 for n except for that. Further, $A_k(n)$ and $B_k(n)$ have a value of 0 in an n<0 and n≥$2^k$ period.

bk determining a vector of $W_k$ is defined by a concatenated bi-polar symbol configured on the basis of a physical cell identifier (for example, $N_{ID}^{(2)}$ and $N_{ID}^{(1)}$). Like the following Equation 7, $b_1$ to $b_2$ represent $N_{ID}^{(2)}$ and the rest $b_3$ to $b_{10}$ represent $N_{ID}^{(1)}$. Therefore, if $N_{ID}^{(2)}$ and $N_{ID}^{(1)}$ are concatenated to each other, $W_k$ is represented by a variable of 10 bits depending on the following Equation 8.

$$B(N_{ID}^{(2)})=b_1 b_2$$

$$B(N_{ID}^{(1)})=b_3 b_4 b_5 b_6 b_7 b_8 b_9 b_{10} \quad \text{(Equation 7)}$$

$$W_k[b_1\ b_2\ b_3\ b_4\ b_5\ b_6\ b_7\ b_8\ b_9\ b_{10}] \quad \text{(Equation 8)}$$

For example, if $N_{ID}^{(2)}$ is 2 and $N_{ID}^{(1)}$ is 97, the concatenated binary sequence becomes 0110000110. If the concatenated binary sequence goes through BPSK modulation, $W_k$ becomes [1 −1 −1 1 1 1 1 −1 1].

For example, when $D_k$ is [1 4 2] and $W_k$=[1 −1 1], $Z_8(n)=A_3(7-n)$ may be generated like the following Equation 9. Here, k=1, 2, 3.

$$A_0(n)=\delta(n)$$

$$B_0(n)=\delta(n)$$

$A_1(n)=W_1A_0(n)+B_0(n-1)=\delta(n)+\delta(n-1)$ $B_1(n)=W_1A_0(n)+B_0(n-1)=\delta(n)-\delta(n-1)$ $B_1(n)=W_1A_0(n)-B_0(n-1)=\delta(n)-\delta(n-1)$ $A_2(n)=W_2A_1(n)+B_1(n-4)=-\delta(n)-\delta(n-1)+\delta(n-4)-\delta(n-5)$ $B_2(n)=W_2A_1(n)-B_1(n-4)=-\delta(n)-\delta(n-1)-\delta(n-4)+\delta(n-5)$ $A_3(n)=W_3A_2(n)+B_2(n-2)=-\delta(n)-\delta(n-1)+\delta(n-4)-\delta(n-5)-\delta(n-2)-\delta(n-3)-\delta(n-6)+\delta(-7)$ $B_3(W_3 A_2(n)-B_2(n-2)=-\delta(n)-\delta(n-1)+\delta(n-4)-\delta(n-5)+\delta(n-2)+\delta(n-3)+\delta(n-6)-\delta(n-7)$ $z_8(n)=-\delta(7-n)-\delta(6-n)+\delta(3-n)-\delta(2-n)-\delta(5-n)-\delta(4-n)-\delta(1-n)+\delta(0-n)$ $$z_8(n)=[1\ -1\ -1\ 1\ -1\ -1\ -1\ -1], n=0.1,2,\ldots,0.7 \quad \text{(Equation 9)}$$

The LTE LAA device 200 uses the above Equation 6 and $W_k=[b_1\ b_2\ b_3\ b_4\ b_5\ b_6\ b_7\ b_8\ b_9\ b_{10}]$ (k=1, 2, . . . , 10) to generate the initial sequence (S610). The LTE LAA device 200 applies $Z_{1024}(n)=A_{10}$ (1023-n) to generate the initial sequence.

The LTE LAA device 200 converts the initial sequence $Z_{1024}(n)$ into the sequence of the frequency domain like the following Equation 10 to apply the spectrum shaping of the initial sequence $Z_{1024}(n)$ (S620).

$$S_{1024}(k) = \sum_{n=0}^{1023} \exp\left(-j\frac{2\pi \cdot \Delta f \cdot k \cdot n}{1024}\right) \cdot z_{1024}(n), \quad \text{(Equation 10)}$$

$$k = -512, -511, \ldots 0, \ldots, 511$$

Here, $\Delta f$=7.5 kHz

The LTE LAA device 200 maps the sequence converted into the frequency domain to a frequency extended sequence Y(k) like the following Equation 11 (S630).

$Y(k)=[S_{1024}(0),S_{1024}(1),\ldots S_{1024}(511)0,\ldots 0,\ldots 0,S_{1024}(-512),\ldots S_{1024}(-1)]$, $$k=-1024,-1023,\ldots 0,\ldots 1023 \quad \text{(Equation 11)}$$

Next, the LTE LAA device 200 applies the transmission bandwidth extension to the sequence Y(k). That is, the LTE LAA device 200 generates a sequence Y'(k) in which the transmission bandwidth is extended like the following Equation 12 (S640). In this case, the transmission bandwidth extension depends on ETSI transmission regulations of Europe.

$Y'_{1024}(k)=[S_{1024}(0),\ldots S_{1024}(511),S_{1024}(-512),\ldots, S_{1024}(-481),0,\ldots 0,\ldots 0,S(480),\ldots,S_{1024}(511),S_{1024}(-512),\ldots S_{1024}(-1)]$, $$k=-1024,-1023,\ldots 0,\ldots 1022,1023 \quad \text{(Equation 12)}$$

That is, 32 subcarriers are added to both band edge portions and thus a total of 64 subcarriers is added compared to the sequence Y(k) illustrated in the above Equation 11.

Finally, the LTE LAA device 200 converts the sequence Y'(k) in which the transmission bandwidth is extended into the sequence of the time domain like the following Equation 13 (S650).

$$y(n) = p \cdot \sum_{k=-1056}^{1055} \exp(j \cdot 2\pi \cdot \Delta f \cdot k \cdot (n - N_{CP}T_s)) \cdot Y'_{1024}(k), \quad \text{(Equation 13)}$$

$$n = 0, T_s, 2T_s, \ldots (2048 + N_{CP} - 1) \cdot T_s$$

Here, $N_{CP}$ represents the length of the CP and p is a scale factor for normalizing the power of the transmission signal.

Figure 7:
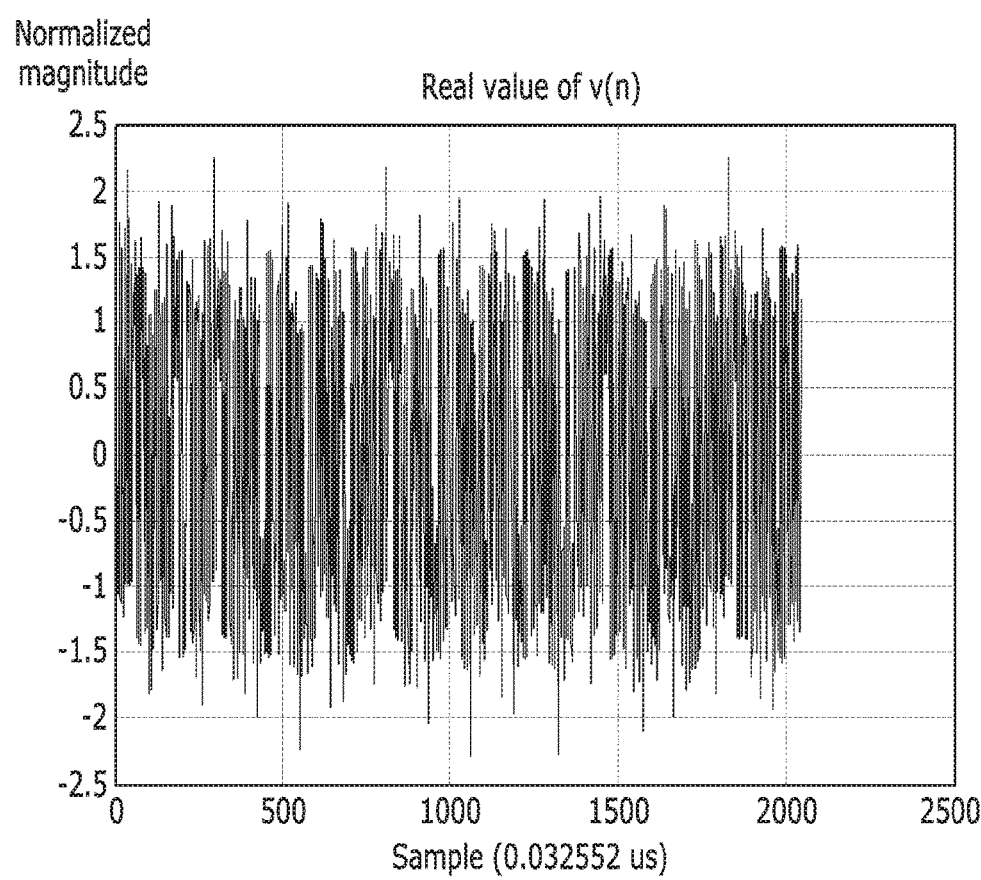
FIG. 7 is a diagram illustrating an example of a signal [y(n)] when an available bandwidth is 20 MHz, according to an exemplary embodiment of the present invention.
Figure 8:
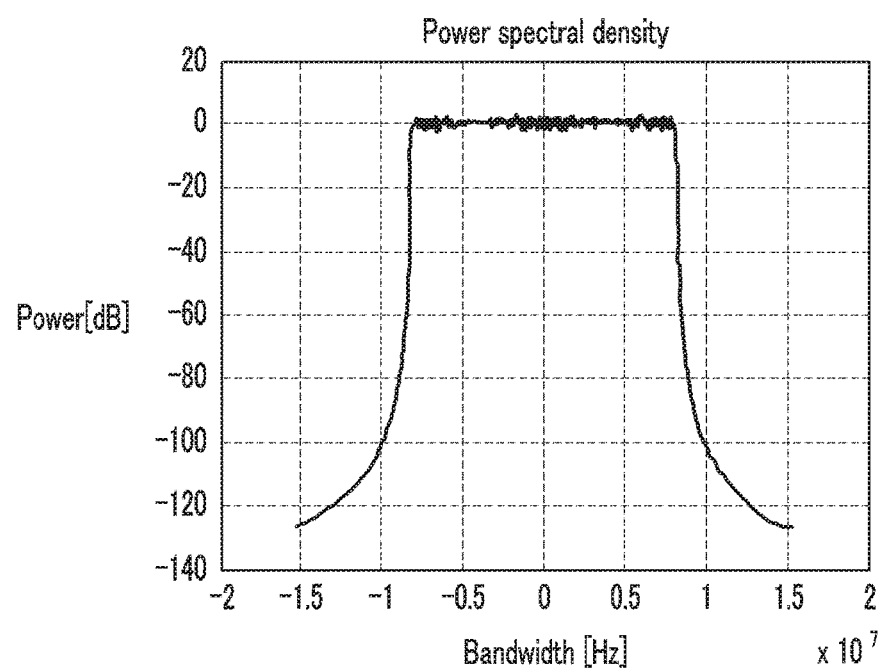
FIG. 8 is a diagram illustrating a frequency spectrum density of the signal [y(n)] illustrated in FIG. 7.

FIG. 7 is a diagram illustrating an example of a signal [y(n)] when an available bandwidth is 20 MHz, according to an exemplary embodiment of the present invention and FIG. 8 is a diagram illustrating a frequency spectrum density of the signal [y(n)] illustrated in FIG. 7.

When a vector component of $D_k$ is defined by [1 8 2 32 4 16 64 128 256 512] and a vector component of $W_k$ is defined by [1 -1 -1 -1 -1 -1 1 -1 1], the signal[y(n)] of the time domain as illustrated in FIG. 6 may be generated by the method described in FIG. 5.

Further, the frequency spectrum density of the so generated signal[y(n)] is as illustrated in FIG. 8. That is, it may be confirmed that the signal[y(n)] occupies 16.32 MHz that is equal to or more than 80% of a bandwidth of 20 MHz. The result of the spectrum is a value satisfying the ETSI regulations of Europe.

Figure 9:
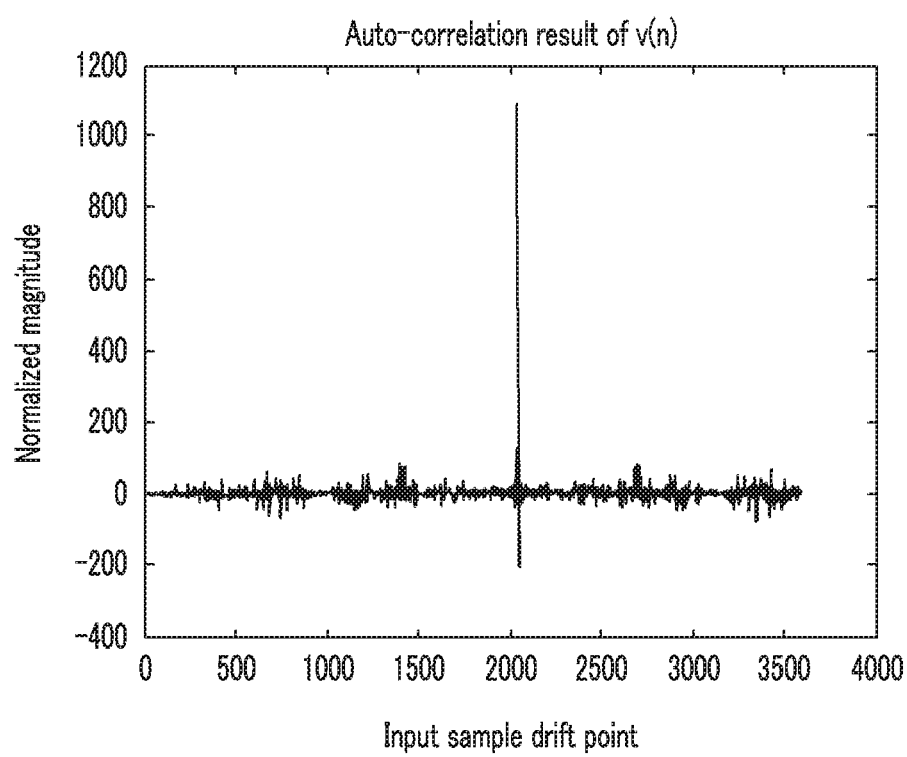
FIG. 9 is a diagram illustrating a correlation value of the FSTF signal, according to an exemplary embodiment of the present invention.

FIG. 9 is a diagram illustrating a correlation value of the FSTF signal, according to an exemplary embodiment of the present invention.

When the LTE LAA device (for example, terminal) receiving the FSTF signal knows the signal[y(n)], a correlation value [v(n)] of the FSTF signal may be represented like FIG. 9 and if it is assumed that a correlation value when the time synchronization is not matched is 0, a maximum value of the correlation value has a correlation value that is equal to or more than 30 dB on average compared to when the time synchronization is not matched.

Therefore, the terminal of the unlicensed band obtains reference timing information that may achieve accurate time synchronization (i.e., FFT window timing) on the basis of the correlation result of the FSTF signal.

As such, the terminal receives the FSTF signal and a correlator is required to estimate the time synchronization and since the FSTF signal is generated on the basis of the Golay sequence, an efficienty Golay correlator is used to greatly reduce the complexity of the correlator. The efficient Golay correlator does not perform addition or subtraction 1023 times to have the correlation value of a Golay sequence having 1024 lengths used in advance but performs the addition or subtraction only 10 [=log 1024] times, and therefore when the efficient Golay cooreelator is used, the addition or subtraction frequency may be remarkably reduced.

The process of generating a FSTF signal as described above is described on the basis of a frequency bandwidth (sample rate of 30.72 MHz) of 20 MHz.

When the transmission bandwidth is 10 MHz, a Golay sequence of length 512 may be used to generate the signal [y(n)] to a frequency bandwidth of 10 MHz. In this case, $Z_{512}(n)=A_9$ 511-n is applied to the following Equation 14 to be converted into the sequence of the frequency domain.

$$S_{512}(k) = \sum_{n=0}^{511} \exp\left(-j\frac{2\pi \cdot \Delta f \cdot k \cdot n}{512}\right) \cdot z_{512}(n),$$ (Equation 14)

$$k = -256, -255, \ldots 0, \ldots, 255$$

In the above Equation 14, $Z_{512}(n)=A_9$ 511-n may be generated by substituting $D_k$=[1 8 2 32 4 16 64 128 256] (k=1, 2, . . . , 9) and $W_k$=[$b_1$ $b_2$ $b_3$ $b_4$ $b_6$ $b_7$ $b_9$] (k=1, 2, . . . , 9) into the above Equation 6.

As such, the sequence converted into the frequency domain may be mapped to the frequency extended sequence by a method similar to the above Equation 11 and the frequency extended sequence may be mapped to the sequence Y'(k) in which the transmission bandwidth is extended like the following Equation 15.

$Y'_{512}(k)$=[$S_{512}$(0), . . . $S_{512}$(255),$S_{512}$(−256), . . . ,$S_{512}$(−251),0, . . . 0, . . . 0,$S$(240), . . . ,$S_{512}$(255),$S_{512}$(−256), . . . $S_{512}$(−1)], $k$=−512,−511 . . . 0, . . . 510,511 (Equation 15)

That is, 16 subcarriers are added to both band edge portions, respectively and thus a total of 32 subcarriers are added compared to the frequency extended sequence.

Finally, the Y'(k) in which the transmission bandwidth is extended is converted into the signal of the time domain like the following Equation 16.

$$y(n) = p \cdot \sum_{k=528}^{527} \exp(j \cdot 2\pi \cdot \Delta f \cdot k \cdot (n - N_{CP}T_s)) \cdot Y'_{512}(k),$$ (Equation 16)

$$n = 0, T_s, 2T_s, \ldots (1024 + N_{CP} - 1) \cdot T_s$$

Here, in the case of the transmission bandwidth of 10 MHz, $N_{CP}$ becomes 72 or 80.

Meanwhile, when the transmission bandwidth is 5 MHz, $Z_{256}(n)=A_8$ 255-n is converted into the sequence of the frequency domain like the following Equation 17.

$$S_{256}(k) = \sum_{n=0}^{255} \exp\left(-j\frac{2\pi \cdot \Delta f \cdot k \cdot n}{256}\right) \cdot z_{256}(n),$$ (Equation 17)

$$k = -128, -127, \ldots 0, \ldots, 127$$

In the above Equation 17, $Z_{256}(n)=A_8$ 255-n may be generated by substituting $D_k$=[1 8 2 32 4 16 64,128] (k=1, 2, . . . , 8) and $W_k$=[$b_1$ $b_2$ $b_3$ $b_4$ $b_5$ $b_6$ $b_7$ $b_8$] (k=1, 2, . . . , 8) into the above Equation 6.

As such, the sequence converted into the frequency domain may be mapped to the frequency extended sequence by a method similar to the above Equation 11 and the frequency extended sequence may be mapped to the sequence Y'(k) in which the transmission bandwidth is extended like the following Equation 18.

$Y'_{256}(k)$=[$S_{256}$(0), . . . $S_{256}$(255),$S_{256}$(−256), . . . ,$S_{256}$(−249),0, . . . 0, . . . 0, $S$(248), . . . ,$S_{256}$(255),$S_{256}$(−256), . . . $S_{256}$(−1)], $k$=−256,−255, . . . 0, . . . ,254,255 (Equation 18)

That is, eight subcarriers each are added to both band edge portions, and thus a total of 16 subcarriers is added compared to the frequency extended sequence.

Finally, the Y'(k) in which the transmission bandwidth is extended is converted into an arc of the time domain like the following Equation 19.

$$y(n) = p \cdot \sum_{k=-263}^{263} \exp(j \cdot 2\pi \cdot \Delta f \cdot k \cdot (n - N_{CP}T_s)) \cdot Y'_{256}(k),$$ (Equation 19)

$$n = 0, T_s, 2T_s, \ldots (512 + N_{CP} - 1) \cdot T_s$$

Here, in the case of the transmission bandwidth of 5 MHz, $N_{CP}$ becomes 36 or 40.

Meanwhile, $W_k$=[$b_1$ $b_2$ $b_3$ $b_4$ $b_5$ $b_6$ $b_7$ IN $b_9$ $b_{10}$] (k=1, 2, . . . , 10) described above may also be used as a usage for transmitting system broadcasting information that may inform a message of 10 bits, instead of the physical cell identifier of the base station.

Figure 10:
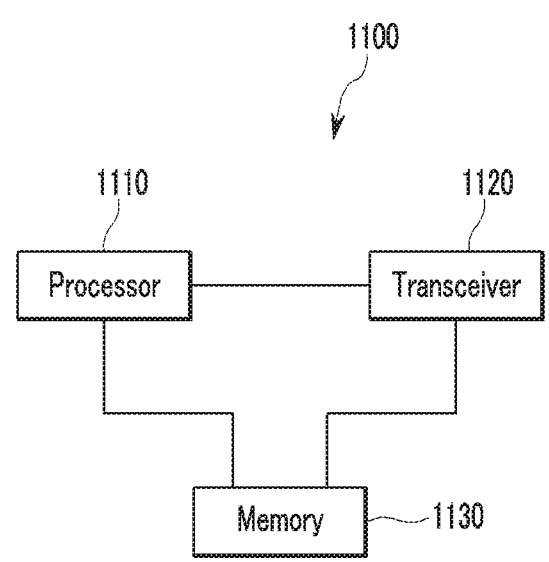
FIG. 10 is a diagram illustrating a communication apparatus using an unlicensed band, according to an exemplary embodiment of the present invention.

FIG. 10 is a diagram illustrating a communication apparatus using an unlicensed band, according to an exemplary embodiment of the present invention.

Referring to FIG. 10, a communication apparatus 1100 using the unlicensed band includes a processor 1110, a transceiver 1120, and a memory 1130. The communication apparatus 1100 using the unlicensed band may be implemented within the LTE LAA device 200. The LTE LAA device 200 may be the base station or the terminal as described above.

The processor 1110 contends with the WLAN devices to occupy the unlicensed band prior to transmitting data. The processor 1110 performs the LBT to check (confirm) that the channel is in the busy status, waits the LTE random back-off period if it is determined that the channel is in the idle status and then allows other devices to recognize the busy status of the corresponding channel if it is determined that the corresponding channel is in the busy status, and generates the preamble to be synchronized with the subframe of the licensed band and transmits the preamble through the transceiver 1120. The processor 1110 may generate the preamble by the method described with reference to FIGS. 3 to 5. In particular, the processor 1110 may generate the FSTF signal by the method described with reference to FIG. 5. Next, the processor 1110 generates the LTE subframe for data transmission and transmits the LTE subframe through the transceiver 1120.

The transceiver 1120 transmits the preamble and the LTE subframe.

The memory 1130 stores instructions which are performed by the processor 1110 or loads instructions from a storage (not illustrated) and temporarily stores the instructions and the processor 1110 executes the instructions which are stored or loaded in the memory 1130.

The processor 1110 and the memory 1130 are connected to each other through a bus (not illustrated) and an input/output interface (not illustrated) may also be connected to the bus. In this case, the transceiver 1120 is connected to the input/output interface and peripheral devices such as an input device, a display, a speaker, and a storage device may be connected to the input/output interface.

According to an exemplary embodiment of the present invention, the LTE system may be operated by applying the standard of the LTE physical layer in the unlicensed band as it is while maintaining the frame synchronization with the licensed band without greatly changing the standard of the existing LTE physical layer.

Further, according to the exemplary embodiment of the present invention, the receiver may use the sequence generated by the physical cell ID based pattern that is known by both of the base station and the terminal to estimate the time synchronization, thereby easily estimating the time synchronization of the received signal and may use the correlator having low complexity to reduce the battery consumption.

Further, according to the exemplary embodiment of the present invention, the function of transmitting the promised digital information through the preamble may also be extended, and thus various functions may be performed at a time.

Further, according to the exemplary embodiment of the present invention, the good element technology of the standardization technology for the LTE operation in the unlicensed band may be provided.

2. Method for Acquiring Time Uplink Frame and Time Downlink Frame Structure in Wireless Communication Cellular System of Unlicensed Frequency Band Hereinafter, a method for acquiring a time uplink frame structure and a time downlink frame structure in a wireless communication cellular system of unlicensed frequency bandwidth and an efficient uplink transmission and retransmission mechanism to an unlicensed band will be described.

Further, a method for configuring a guard period for an LTE system of an unlicensed band supporting an uplink and a downlink in a time division duplexing (TDD) form will be described.

Further, a method for configuring a guard interval that minimizes interference will be described below.

Further, a method for configuring a license assisted access (LTE-LAA) TDD frame structure and a frame format indicator suitable for an unlicensed band will be described.

Further, a method for determining opportunistic and adaptive uplink signal transmission timing suitable for an unlicensed band by using an aggregated uplink grant signal will be described.

A method and an apparatus according to an exemplary embodiment of the present invention may belong to a physical layer of an LTE wireless mobile communication system. In detail, a method and an apparatus according to an exemplary embodiment of the present invention relate to a frame structure and a transmission and control technology considered to operate an uplink (UL) signal and a downlink (DL) signal of an LTE system in an unlicensed band in which a signal is discontinuously transmitted.

Like the LTE frame of the licensed band, the LTE frame of the unlicensed band may basically be divided into a downlink and an uplink. Therefore, the existing frame structure (FS frame structure)-type 2 of the licensed band may be preferentially applied to the unlicensed band.

Figure 11:
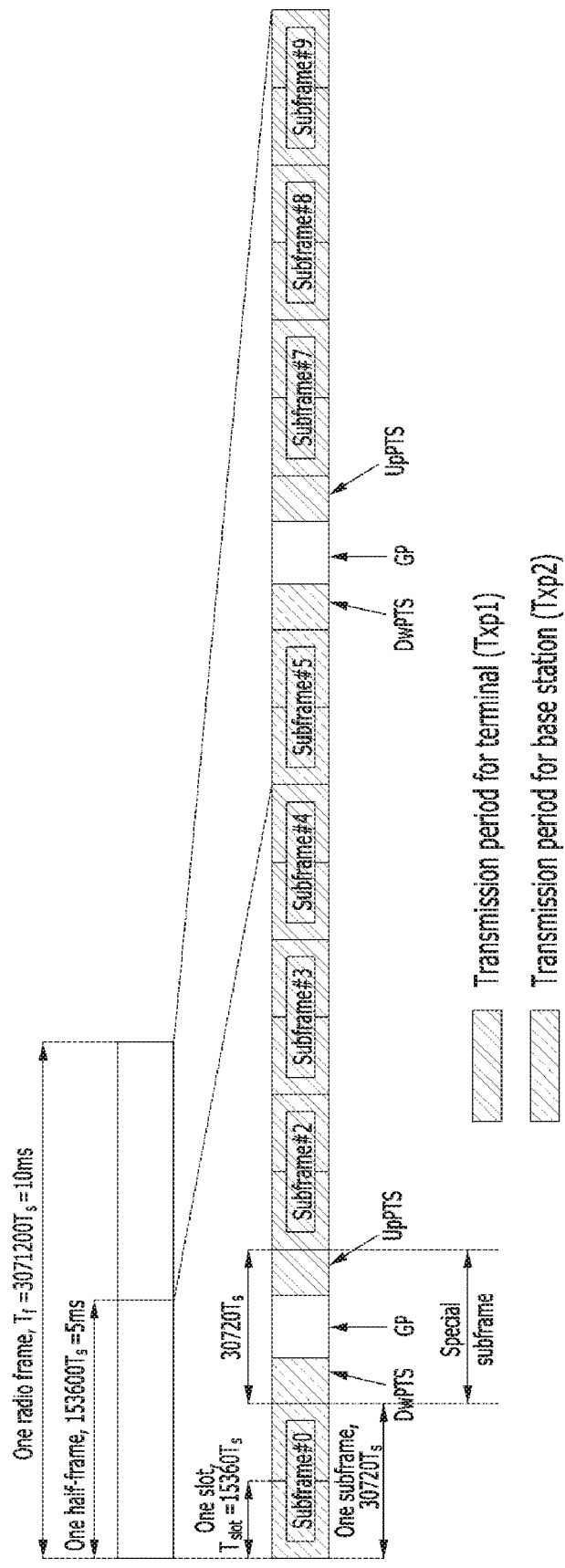
FIG. 11 is a diagram illustrating an uplink and downlink multiplexing transmission that is applied to an LTE frame structure-type 2 and is based on time.

FIG. 11 is a diagram illustrating an uplink and downlink multiplexing transmission that is applied to an LTE TS-type 2 and is based on time.

One radio frame illustrated in FIG. 11 may have a length of $T_f$. Here, $T_f$ may be 10 ms (=307200*$T_s$). $T_s$ may be defined as 1/30.72 MHz=32.552 ns. One radio frame may include ten subframes (Nos. 1 to 9). One subframe may have a length of 1 ms (=30720*$T_s$). One time slot may have a length of $T_{slot}$. Here, $T_{slot}$ may be 15360*$T_s$.

A special subframe may include a downlink pilot time slot (DwPTS), a guard period (GP), and an uplink pilot time slot (UpPTS).

As illustrated in FIG. 11, the FS-type 2 of the licensed band may be divided into a transmission period for the base station and a transmission period for the terminal.

A period Txp1 illustrated in FIG. 11 is a period in which the terminal transmits a signal. Period Txp2 illustrated in FIG. 11 is the rest period other than the period Txp1 and the GP in the entire period and is a period in which the base station transmits a signal. Therefore, the DwPTS is a transmission period for the base station and the UpPTS is a transmission period for the terminal.

The GP period is a period between the DwPTS and the UpPTS and may have a length of at least 47.396 μs (=1456*$T_s$). In detail, the GP is a period in which the base station and the terminal do not transmit a signal and may have time when a propagation delay due to a distance difference between a transmitting end and a receiving end and a switching time of a radio frequency is synthetically considered. According to a current LTE standard, a minimum time of the GP is about 1456/30.72 MHz=47.39 μs. The idle time is time enough for an unlicensed band device (for example, WiFi device) to perform CCA and occupy the channel.

Further, the existing GP length may not be appropriate for characteristics of the unlicensed band having coverage smaller than a small cell due to a relatively lower output. The coverage of the small cell of the unlicensed band is set to be a maximum of about 140 ms and is only about 0.5 μs if a round trip time of reception after the transmission is calculated using a light speed. Even though the switching time of the RF is added to the round trip time, the coverage may not reach 15 μs in total.

Therefore, the GP length needs to be set for the small cell. If the GP length is set to be shorter than or similar to an inter frame space (IFS) time like a distributed coordinate function interframe space (DIFS) of WiFi, the unlicensed band LTE transmission burst consisting of the uplink and the downlink may determine the CCA of the WiFi device and then fundamentally block the occurrence of interference due to the performance of the transmission signal output.

However, to define the GP length smaller than the existing minimum GP length, it is essential to transmit any continuous signal after the DwPTS (or UpPTS). However, 71 μs that is an orthogonal frequency division multiplexing (OFDM) symbol unit of a current standard is too long and thus inappropriate (length longer than 47.39 μs that is the minimum GP length according to the current standard) when filling a portion of the existing GP to make the short GP length. Therefore, to make the GP having a length shorter than 47.39 μs but similar to the IFS (for example, 34 μs in the case of the DIFS) of the WiFi, a function of filling a continuous signal like the preamble between the DwPTS and the GP and a preamble signal itself need to be defined.

The LTE subframe of the unlicensed band is based on the application of a carrier aggregation (CA) function support principle of preventing the time synchronization with the LTE subframe operated in the licensed band from being out of a predetermined numerical value or more. When the device occupies the channel through the LBT, the case of starting to occupy the channel at the boundary of the subframe is little present and the case of occupying the channel after the LBT at the intermediate portion of the subframe is general. In this case, the data transmission in the partial subframe form needs to be performed and in the current LTE standard, the partial subframe transmission is supported only in the DwPTS and the UpPTS form.

However, the timing when the device starts to occupy the channel after the LBT may not be predicted and since the lengths of the DwPTS and the UpPTS are limited, the problem of the data transmission efficiency occurs. To increase the transmission efficiency of the unlicensed band, a new partial subframe needs to be defined.

In particular, since a length that may continuously transmit a signal at the maximum is limited by the propagation and communication regulations in areas such as Europe and Japan, a newer partial subframe is required.

In detail, in the case of Japan, the continuous signal transmission of 4 ms or more may not be made. Therefore, in Japan, the continuous signal transmission may not follow the time division duplexing (TDD)-LTE frame format-type 2 of the licensed band designed based on a length of 10 ms. In particular, when the continuous signal transmission is limited to 10 ms or less, the smaller the special subframes (including the DwPTS, the GP, and the UpPTS) illustrated in FIG. 11, the higher the transmission efficiency.

Therefore, the TDD-LTE standard of the current licensed band defines that two special subframes are present in a unit of 10 ms, and therefore the problems that are not supported in the current LTE standard need to be solved in order that one special subframe is present in a unit of 10 ms. Therefore, the new TDD-LTE standard suitable for the LTE operation of the unlicensed band needs to be defined.

As described above, like the LTE frame of the licensed band, the LTE frame of the unlicensed band may basically be divided into the downlink and the uplink in the TDD form. The uplink data transmission may be made only after the grant of the base station.

In the case of the existing licensed band, the terminal granted by the base station transmits the uplink signal at the defined timing.

Figure 12:
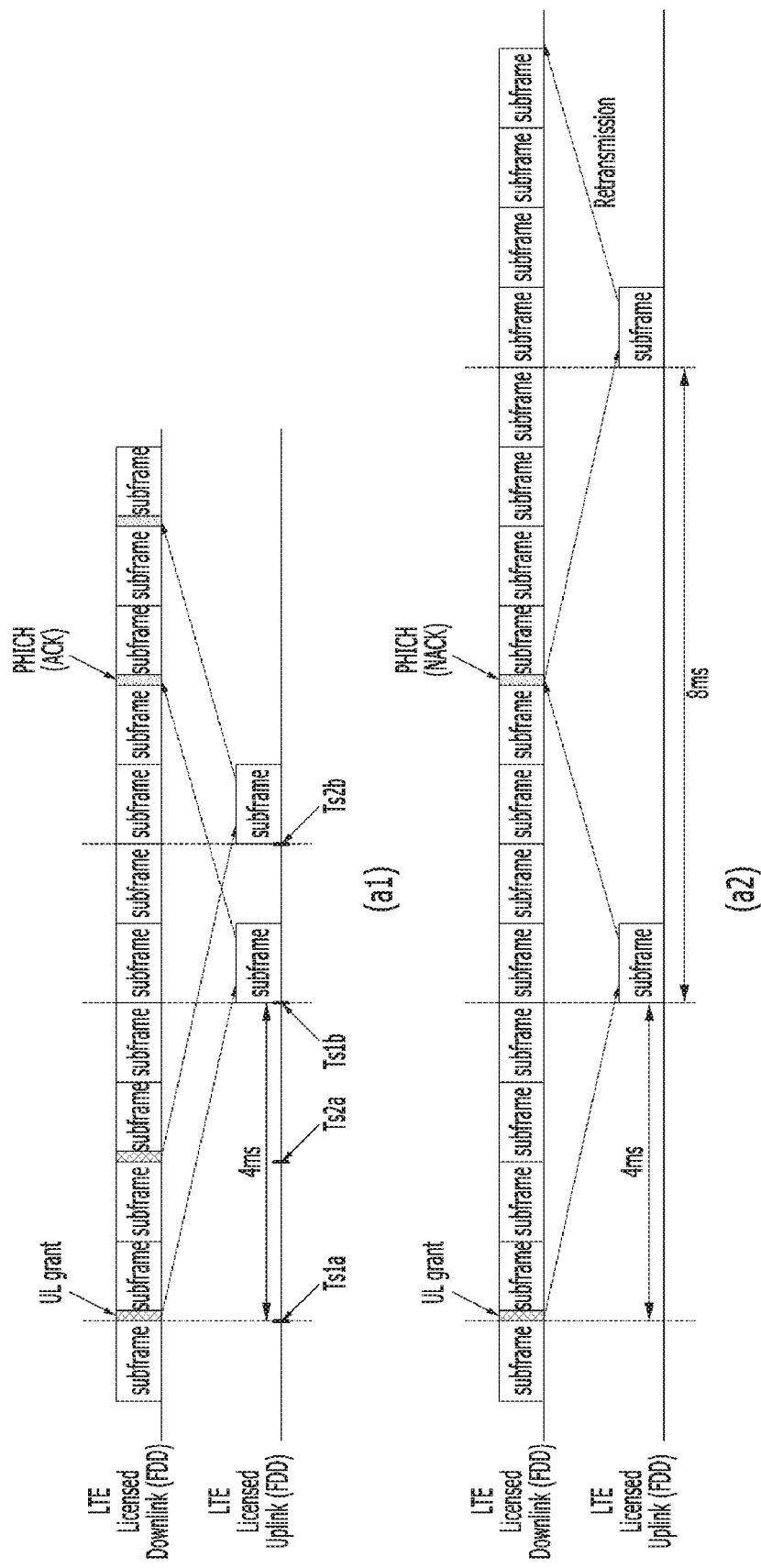
FIG. 12 is a diagram illustrating a timing relationship between an uplink grant (UL grant) of a licensed band and a physical hybrid automatic repeat request indicator channel (PHICH) transmission.

FIG. 12 is a diagram illustrating a timing relationship between an uplink grant (UL grant) of a licensed band and a physical hybrid automatic repeat request indicator channel (PHICH) transmission.

In detail, FIG. 12 illustrates the case in which the downlink signal and the uplink signal are transmitted in the LTE frequency division duplexing (FDD) system of the licensed band.

As illustrated in (a1) of FIG. 12, the terminal transmits a signal at timing Ts1$b$ or Ts2$b$ when a preset 4 ms lapses from timing Ts1$a$ or Ts2$a$ when it receives downlink control information (including the UL grant) transmitted through a downlink control information (DCI) at the timing Ts1$a$ or Ts2$a$. Further, the base station transmits PHICH (ACK) information indicating that there is nothing wrong with demodulation for the signal of the terminal As illustrated in (a1) of FIG. 12, the signal transmission/reception is processed for each subframe unit, and therefore when the base station transmits the UL grant at different timings Ts1$a$ and Ts2$a$, the base station transmits a response (PHICH) to the terminal at timing when 8 ms lapses from each timing Ts1$a$ and Ts2$a$. In summary, the uplink signal is transmitted at the timings Ts1$b$ and Ts2$b$ when 4 ms lapses from the timings Ts1$a$ and Ts2$a$ when the UL grant is transmitted and the base station informs the terminal of a response signal (for example, ACK signal or negative acknowledgement (NACK) signal) at timing when 4 ms lapses from the timings Ts1$b$ and Ts2$b$.

As illustrated in (a2) of FIG. 12, the demodulation error for the uplink transmission signal that the base station receives from the terminal occurs or when the base station does not receive the uplink signal, the base station uses the PHICH channel to transmit the NACK signal to the terminal as the downlink signal, thereby requesting the retransmission of the uplink signal to the terminal.

A time difference between the transmission and the response that are made by the base station and the terminal is fixed as 4 ms and the retransmission mechanism (for example, hybrid acknowledgement) is synchronously performed at an interval of 4 ms. Therefore, in the licensed band, the synchronous timing when the transmitting/receiving response time interval is constantly maintained without a separate signal indicator associated with the transmission timing may be maintained.

However, in the unlicensed band, the mechanism and the response for the synchronous transmission are not secured. In the case of the uplink transmission, when the result of the LBT performed after the time difference (for example, 4 ms) between the preset transmission and response is that the corresponding channel is in the busy status, since the terminal may not transmit the uplink signal, the terminal tries to retransmit the uplink signal. As a result, the uplink transmission efficiency is reduced and in the worst case, the terminal may also continue only the retransmission try.

Figure 13:
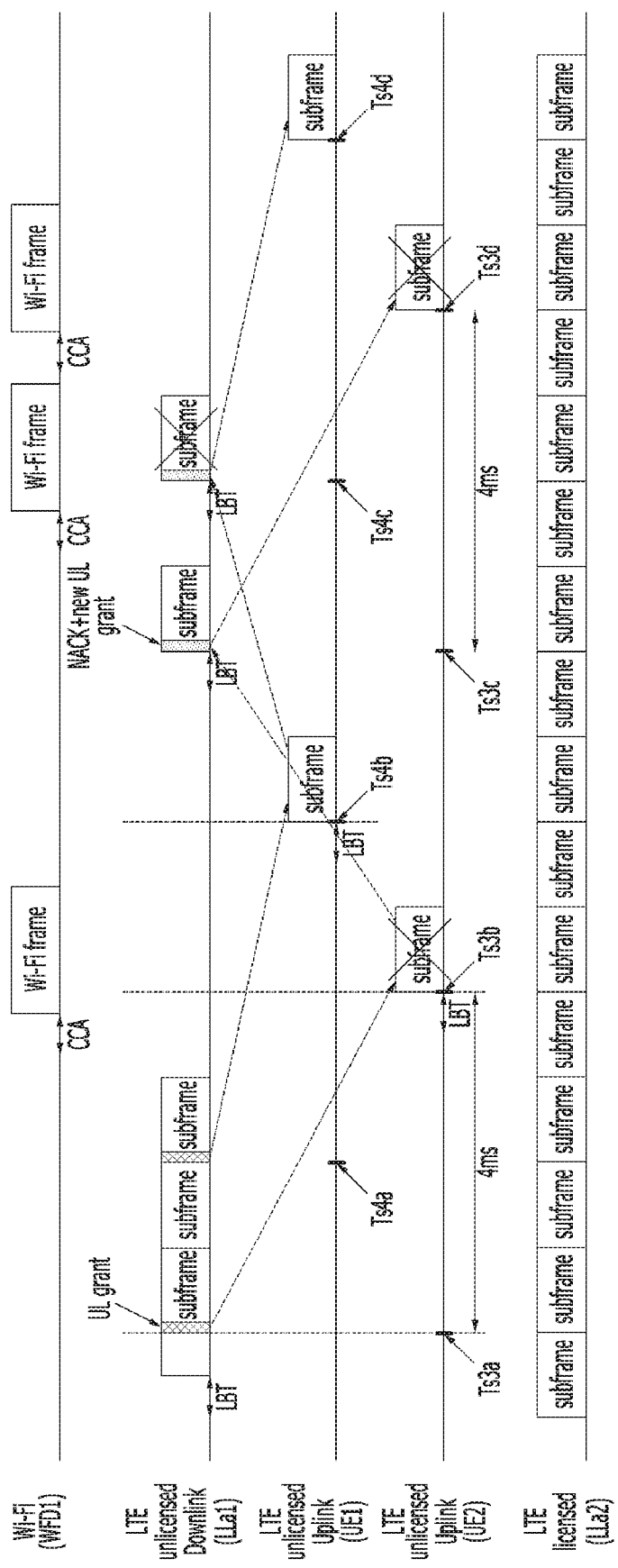
FIG. 13 is a diagram illustrating a problem of occurring when an uplink signal and a downlink signal are transmitted at preset timing in an unlicensed band.

FIG. 13 is a diagram illustrating a problem of occurring when an uplink signal and a downlink signal are transmitted at preset (preconfigured) timing in an unlicensed band.

In detail, FIG. 13 illustrates the WiFi device, a base station LLa1, a plurality of terminals UE1 and UE2 that are operated in the unlicensed band and a base station LLa2 operated in the licensed band.

As illustrated in FIG. 13, when a share channel is occupied by other devices (for example, WFD1) and thus the corresponding channel is in a busy status at timing Ts3$b$, the terminal UE2 fundamentally discards the signal transmission at the timing Ts3$b$ when a preset time (for example, 4 ms) lapses from timing Ts3$a$ when the DCI (including the UL grant) is transmitted by the base station LLa1.

For example, when the terminal UE2 does not transmit the uplink signal due to the channel occupation of the WiFi device WFD1 at the timing Ts3$b$, the terminal UE2 receives a NACK signal and a new UL grant from the base station LLa1 at timing Ts3$c$. The terminal UE2 tries to retransmit the uplink signal at timing Ts3$d$ when 4 ms lapses from the timing Ts3$c$ but fails in the retransmission due to the channel occupation of the WiFi device WFD1.

As another example, the terminal UE1 transmits the uplink signal at timing Ts4$b$ when 4 ms lapses from timing Ts4$a$ when the UL grant of the base station LLa1 is transmitted. The base station LLa1 does not transmit the response signal at timing Ts4$c$ when 4 ms lapses from the Ts4$b$ due to the channel occupation of the WiFi device WFD1. The terminal UE1 that does not receive the response signal retransmits the uplink signal at timing Ts4$d$ when 4 ms lapses from the timing Ts4$c$.

As illustrated in FIG. 13, if the channel is in the busy status at the transmission timing designated for the uplink or the transmission timing designated for the downlink, the retransmission process is progressed. In this case, the mechanism of the licensed band is applied to the unlicensed band as it is, and thus if the uplink transmission is progressed, the transmission efficiency may be greatly reduced.

Therefore, the efficient uplink transmission and retransmission mechanism to the unlicensed band is required. In detail, the flexibility of the uplink transmission timing is required. Further, when the uplink transmission timing for first transmitting new data and the timing for retransmitting them are simultaneously considered, a channel resource and timing alposition method and a channel approach method therefor are required.

Figure 14:
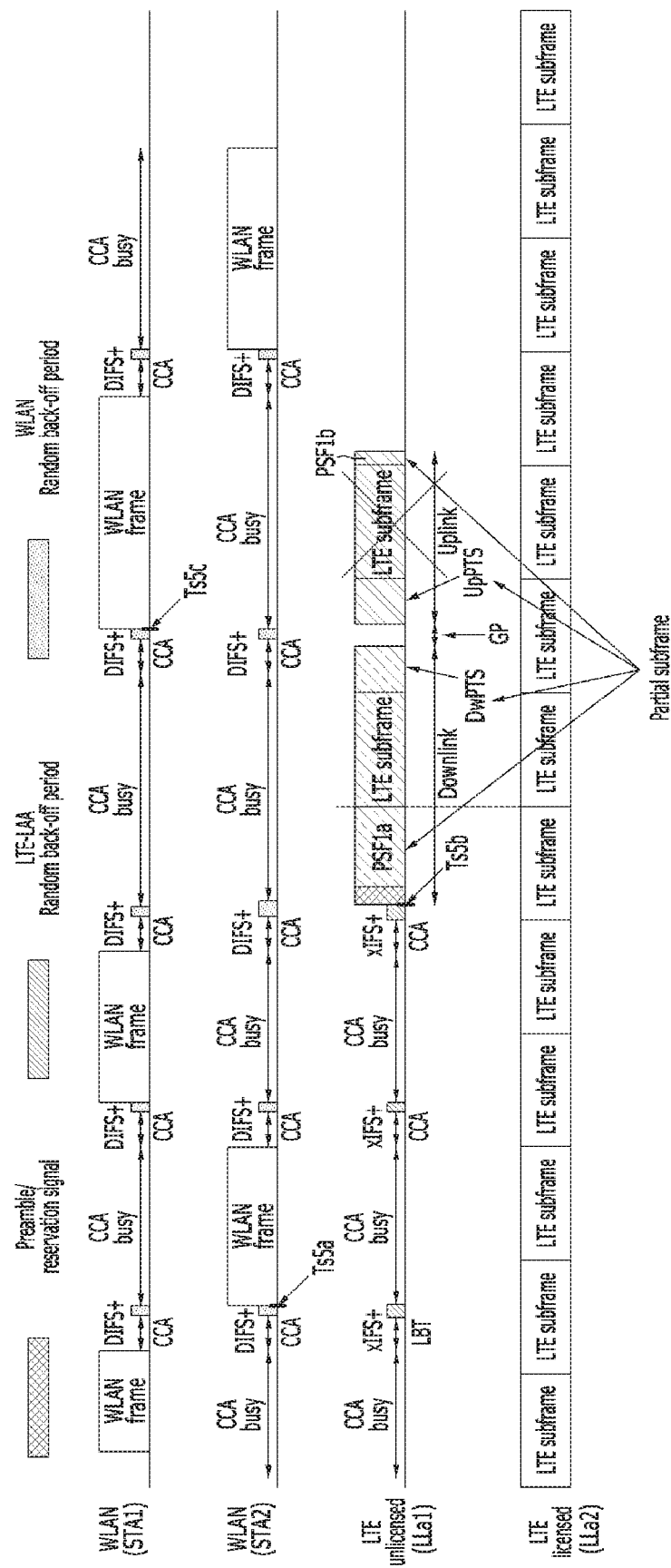
FIG. 14 is a diagram illustrating a case in which an uplink transmission fails or a collision occurs due to a long guard interval in an LTE uplink and downlink frame for an unlicensed band.

FIG. 14 is a diagram illustrating a case in which an uplink transmission fails or a collision occurs due to a long guard interval in an LTE uplink and downlink frame for an unlicensed band. In detail, FIG. 14 illustrates WLAN devices STA1 and STA2 and the LTE base station LLa1 that are operated in the unlicensed band and the base station operated in the licensed band.

A method for designing a GP or an extended DwPTS preamble preventing or minimizing interference will be described with reference to FIG. 14. The GP or the DwPTS preamble may be applied to a frame supporting the uplink and the downlink.

Periods PSF1a and PSF1b and the DwPTS and the UpPTS of the subframe illustrated in FIG. 14 correspond to the partial subframe.

In detail, FIG. 14 illustrates that the LTE base station LLa1 operated in the unlicensed band uses the same unlicensed band (for example, frequency bandwidth of 5 GHz) as IEEE 802.11a/n/ac wireless local area network (WLAN) devices STA1 and STA2. In this case, a method for maintaining coexistence and synchronization between an unlicensed band and a licensed band will be described. The LTE base station LLa1 may be an LTE license assisted access (LAA) device. Meanwhile, the LTE base station LLa1 may also be operated in both of the unlicensed band and the licensed band and in this case, may simultaneously transmits the signal of the unlicensed band and the signal of the licensed band.

The CCA is a method for determining whether a radio channel is used or not by using an energy level. Similarly, the LBT performs the same function as the CCA. The success of the CCA or the LBT for the channel means that the device performing the CCA or the LBT occupies the corresponding channel. The busy status of the channel represents that the corresponding channel is occupied and the idle status of the channel represents that any device does not use the corresponding channel.

As illustrated in FIG. 14, when the WLAN device STA1 first occupies the channel of the unlicensed band in time to transmit the signal, the WLAN device STA2 and the LTE base station LLa1 each determine that the corresponding channel is in the busy status and put off the signal transmission.

If the transmission of the WLAN device STA1 ends, the WLAN device STA2 and the LTE base station LLa1 sense that the corresponding channel is in the idle status.

When the WLAN device STA2 senses the idle status of the corresponding channel using the CCA check function, the WLAN device STA2 prepares the signal transmission but needs to perform the transmission after passing through the temporal delay period called the DIFS and the random back-off in standard (for example, distributed coordinate function (DCF) that is the function of the channel access technique for WLAN).

Similarly, when the LTE base station LLa1 also performs the LBT function including a function of channel activity sensing and random delay to sense the idle status of the channel, it suffers from a random delay and then prepares the signal transmission (for example, LBT function of the European Telecommunications Standards Institute (ETSI) standard).

In this case, the WLAN device STA2 and the LTE base station LLa1 contend with each other to use the unlicensed band and the device first passing through q that is any delay time as described above may win a contention to transmit a signal. Here, the q may be a temporal concept and may be a counter of a μs unit.

Therefore, the WLAN device STA2 and the LTE base station LLa1 each may transmit a signal only when passing through a total of any delay time q called the constant delay and random back-off. In the case of the WLAN device STA2, the q may include the DIFS time (for example, 34 μs) and the random back-off (for example, multiple of 9 μs (including 0), that is, time of 0–N*9 μs, however, N follows IEEE 802.11 standard). In the case of the LTE base station LLa1, the q by the LBT function may include a similar xIFS value and random back-off (for example, N*20 μs, however, N is basically random and a maximum value of N may be 24 according to the ETSI regulations) in the DIFS of the WLAN.

For example, when the LTE base station LLa1 passes through the random back-off period (xIFS+CCA check) in a first idle period, the WLAN device STA2 first passes through 'DIFS+random back-off period' to start to transmit the WLAN frame at timing Ts5a.

As another example, the LTE base station LLa1 wins a contention with the WLAN device STA1 and the WLAN device STA2 in a second idle period to start to transmit a signal at timing Ts5b. In this case, the LTE frame transmitted by the LTE base station LLa1 may be an FS-type 2 form that consists of the uplink and the downlink. Therefore, the uplink transmission is performed after the downlink transmission and the GP may be positioned between the downlink transmission and the uplink transmission. However, the WLAN device STA1 senses that the corresponding channel is in the idle status in the GP period to pass through the 'CCA+random back-off' time to thereby start to transmit the WLAN frame at timing Ts5c.

In this case, for the LTE uplink transmission of the unlicensed band, the terminal disregards whether the WLAN device STA1 transmits the signal and when the terminal performs the signal transmission (former) or senses that the corresponding channel is in the busy status, it may not perform the uplink signal transmission (latter). In the former case, the receiving performance is adversely affected due to a collision of the LTE signal with the WiFi signal. In the latter case, the terminal does not perform the uplink transmission and therefore causes a deterioration in throughput of the LTE-LAA system. To prevent the occurrence of the situation, there is a need to reduce the GP length but according to the current LTE standard, it is impossible to set time corresponding to the DIFS period of the WiFi by reducing the GP.

Therefore, a method for reducing a GP by transmitting a reservation signal having a variable length after a DwPTS transmission will be described.

Figure 15:
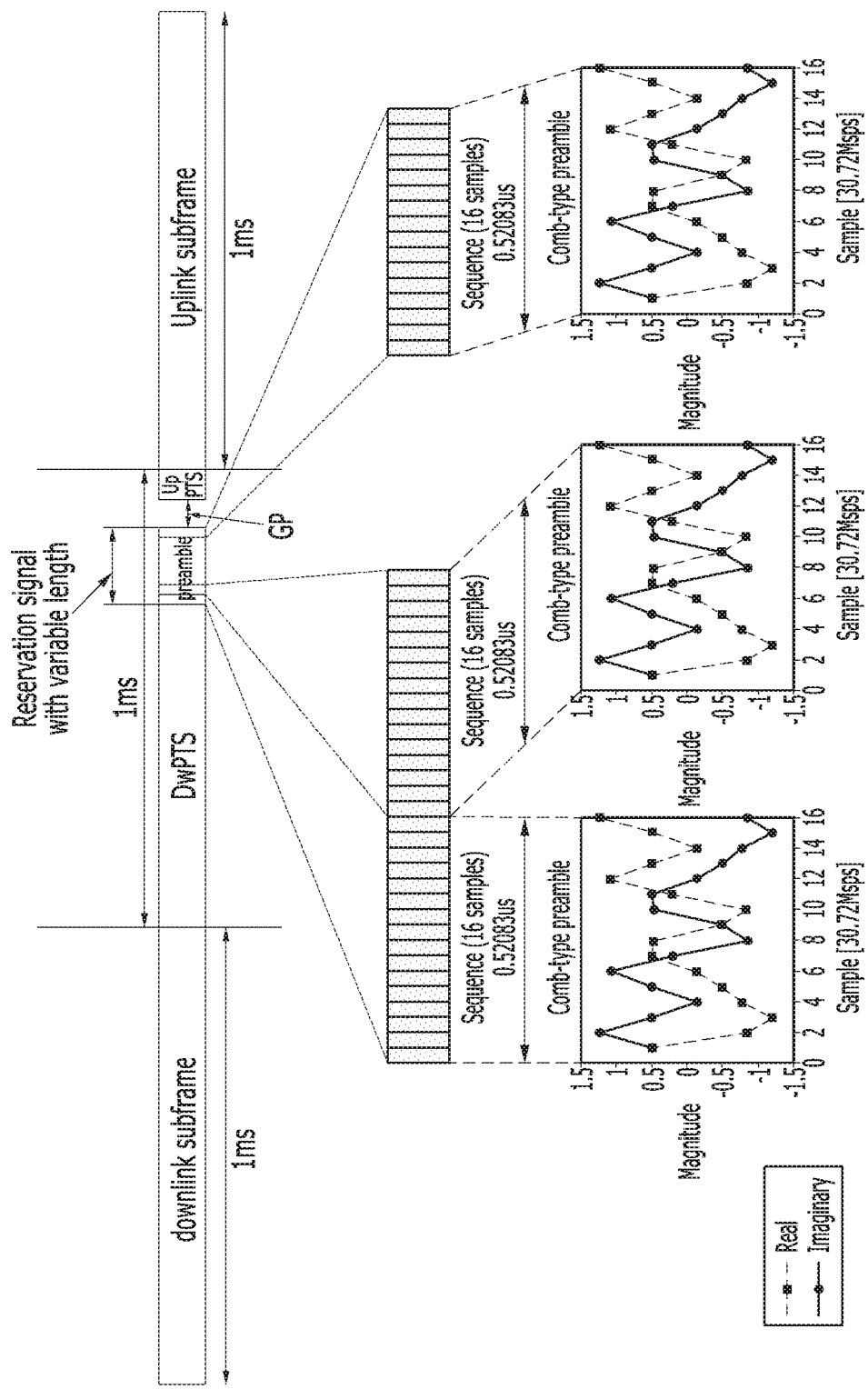
FIG. 15 is a diagram illustrating a method for reducing a length of the guard interval by transmitting a reservation signal with a variable length after a downlink pilot time slot (DwPTS) transmission, according to an exemplary embodiment of the present invention.

FIG. 15 is a diagram illustrating a method for reducing a length of the guard interval by transmitting a reservation signal with a variable length after a DwPTS transmission, according to an exemplary embodiment of the present invention.

As illustrated in FIG. 15, the reservation signal (or preamble) of the variable length after the DwPTS transmission may be transmitted subsequent to DwPTS.

In detail, FIG. 15 illustrates a structure of a preamble (reservation signal) according to an exemplary embodiment of the present invention. An s(n) area of the reservation signal featuring the variable length may include a transmission period of a minimum signal unit having a length of about 0.521 μs. When the digital sample rate of the LTE is 30.72 MHz, time $T_s$ taken to transmit one sample is 1/(30.72e6)=0.326 μs.

Therefore, according to an exemplary embodiment of the present invention, a transmission time of a sequence having a length of 16 is approximately 0.521 μs (=16/(30.72e6)). For reference, the transmission time of the LTE OFDM symbol is 2048/(30.72e6)=66.67 μs. The transmission time (or length) of the cyclic prefix is 144/(30.72e6)=4.69 μs or 160/(30.72e6)=5.2083 μs. Further, a length (or transmission time) of one LTE t subframe is 30720/(30.72e6)=1 ms. That is, if the sequence that is a basic unit of the preamble (reservation signal) is continuously transmitted in 1920 numbers, the sequence becomes 1 ms (i.e., one LTE subframe may be divided into 1920 periods).

The sequence s(n) of the time domain having the length of 16 may be generated by the following Equation 20.

$$s(n) = p \cdot \sum_{k=-8}^{7} \exp(j \cdot 2\pi \cdot \Delta f \cdot k \cdot n) \cdot z(k) \quad \text{(Equation 20)}$$

Here, p is a constant for normalizing a signal and represents $\Delta f = (30.72 \text{ MHz})/16$ The sequence z(k) and the index k of the frequency domain may be defined like the following Equation 21.

$$z(k) = [0\ 0\ 0\ a_{-5}\ a_{-4}\ a_{-3}\ a_{-2}\ a_{-1}\ 0\ a_1\ a_2\ a_3\ a_4\ a_5\ 0\ 0]$$

$$k = \{-8\ -7\ -6\ -5\ -4\ -3\ -2\ -1\ 0\ 1\ 2\ 3\ 4\ 5\ 6\ 7\} \quad \text{(Equation 21)}$$

In the above Equation 21, $a_5$ to $a_5$ are a complex number and may be defined like the following Equation 22 by a binary bit.

$$b_k = 0, a_k 1 + j$$

$$b_k = 1, a_k = -1 - j \quad \text{(Equation 22)}$$

Binary bits $b_{-5}$ to $b_5$ may be determined by ID and ID that are the physical cell ID of the base station defined in the LTE standard and may be mapped to the following Equation 23.

$$B(N_{ID}^{(2)}) = b_4 b_5$$

$$B(N_{ID}^{(1)}) = b_{-5} b_{-4} b_{-3} b_{-2} b_{-1} b_1 b_2 b_3 \quad \text{(Equation 23)}$$

Here, B(.) is a binary operator function that performs a conversion into a binary number. For example, if it is assumed that $N_{ID}^{(2)}=2$ and $N_{ID}^{(1)}=97$, the binary number $b_{-5}b_{-4}b_{-3}b_{-2}b_{-1}b_1b_2b_3b_4b_5$ is determined as 0110000110. Therefore, z(k) becomes [0 0 0 1+j −1−j 1+j 0 1+j 1+j −−j −1−j 1+j 0 0].

When p is 4, if the z(k) is converted into the time domain depending on the above Equation 20, the subsequent s(n) sequence may be generated.

s(n)=[0.5+j0.5 −04328−j0.4328 0.8536+j0.8536−
0.7617−j0.7617 −1.0−j1.0 1.4688+j1.4688
0.1464+j0.1464 −02743−j0.2743 −0.5−j0.5−
0.2743−j0.2743 0.1464+j0.1464 1.4688+j1.4688
−1.0−j1.0−0.7617+j0.7617 0.8536+0.8536−
0.4328−j0.4328]

Since the variable length preamble (reservation signal) according to the exemplary embodiment of the present invention has granularity of about 0.521 μs, the high degree of freedom for the adjustment of the extended DwPTS length may be obtained. As a result, the GP length may be freely designed. For example, when the special subframe configuration of the TDD-LTE in which the normal cyclic prefix is assumed is set to be '3', each of the lengths of the DwPTS and the UpPTS becomes 24144*$T_s$ and 2192*$T_s$. Consequently, the GP length becomes 4384*$T_s$. 4384*$T_s$ corresponds to a length of 4384/30.72 MHz=142.7 μs. The length of the reservation signal needs to be 108.7 μs (=142.7 μs−34 μs) so that the GP length approximates 34 μs that is a numerical value of the DIFS of the WiFi by reducing the GP length. Therefore, when 209 sequences s(n) are generated, the length of the reservation signal becomes 108.85 μs (=209*16/30.72 MHz) and the GP has a length of 33.85 μs that approximates 34 μs.

Figure 16:
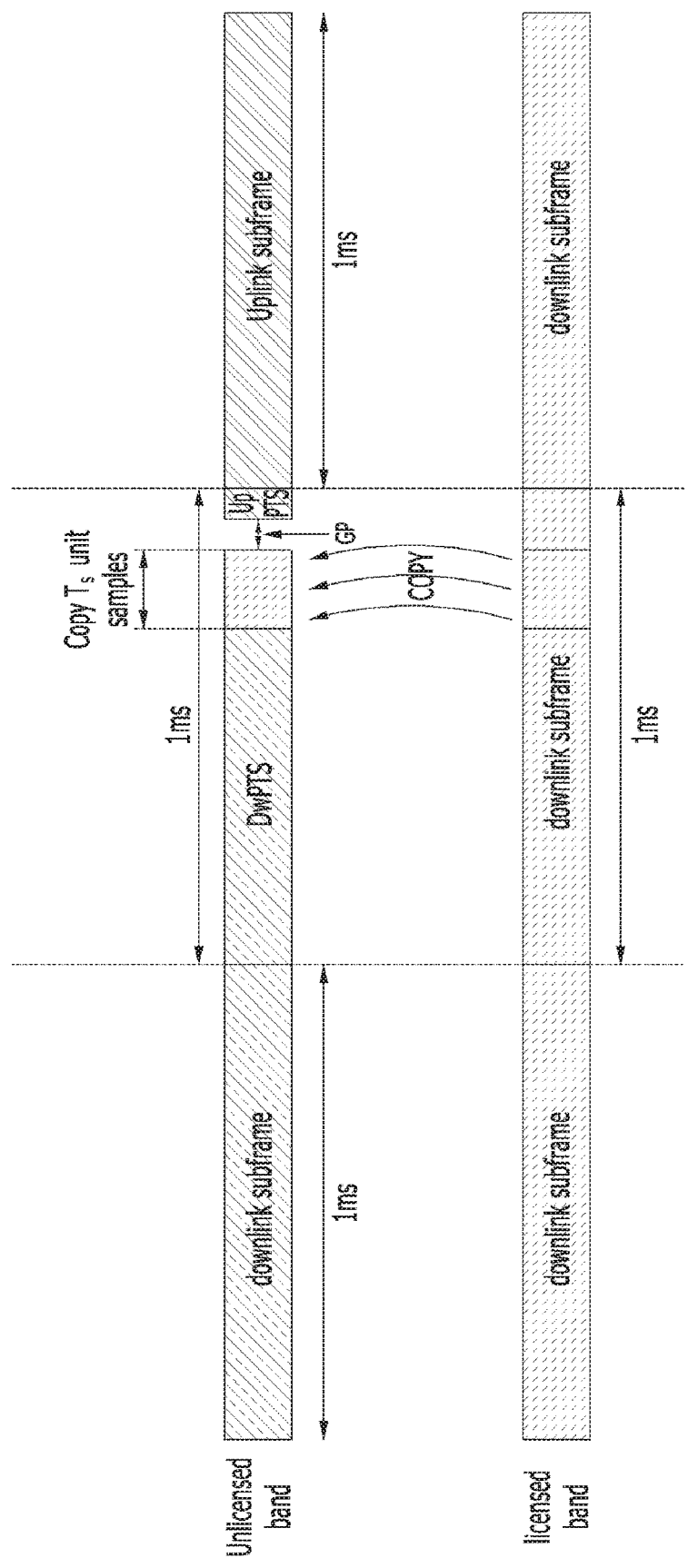
FIG. 16 is a diagram illustrating a method for adjusting a length of a guard interval by copying a baseband signal of a licensed band, according to an exemplary embodiment of the present invention.

FIG. 16 is a diagram illustrating a method for adjusting a length of a guard interval by copying a baseband signal of a licensed band, according to an exemplary embodiment of the present invention.

As illustrated in FIG. 16, the baseband signal (OFDM modulated signal) transmitted in the licensed band is copied as it is without the foregoing reservation signal, and thus may also be transmitted in the unlicensed band. In detail, the baseband signal of the licensed band is copied after the DwPTS transmission in the unlicensed band and thus may be transmitted subsequent to the DwPTS.

In the method illustrated in FIG. 16, the signal of the licensed band may be copied to multiple $T_s$ sample units.

Another method for adjusting a GP length is a method for making any signal having energy and transmitting the signal instead of the foregoing reservation signal.

Therefore, a method for adjusting a GP length according to an exemplary embodiment of the present invention is a method for transmitting energy through an unlicensed band channel regardless of a form to prevent the corresponding channel from being in an idle status after sensing of CCA and allow a GP length to correspond to an IFS period of WiFi.

Hereinafter, a method for configuring an LTE-LAA frame structure in a TDD type and a frame format indicator that are suitable for an unlicensed band will be described.

Figure 17:
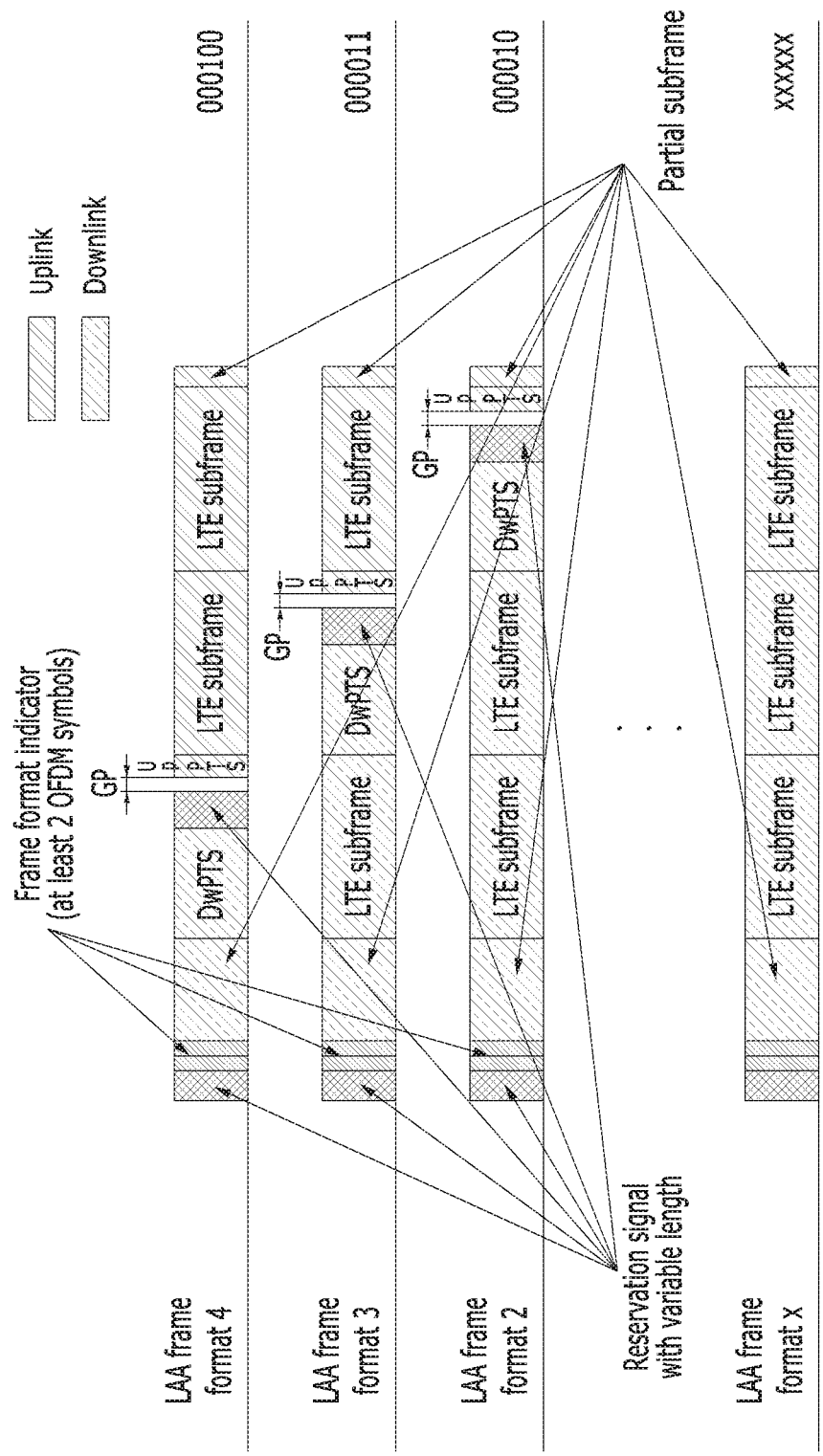
FIG. 17 is a diagram illustrating a TDD-LTE frame format configuration for LAA when a maximum continuous transmission length is 4 ms, according to an exemplary embodiment of the present invention.

FIG. 17 is a diagram illustrating a TDD-LTE frame format configuration for LAA when a maximum continuous transmission length is 4 ms, according to an exemplary embodiment of the present invention.

When in the TDD LTE frame structure, the special subframe is limited to one and the frame type has the uplink and downlink burst form, as illustrated in FIG. 17, the TDD-LTE frame format for the unlicensed band may be generalized.

In detail, the TDD-LTE frame format for the unlicensed band illustrated in FIG. 17 may also be applied to a downlink only frame.

In the TDD-LTE frame format illustrated in FIG. 17, the position of the special subframe and the entire length of the transmission burst of the TDD-LTE frame format may be represented using six bits of n bits allocated to the FFI. For example, in the LAA frame format 4, the position of the special subframe and the entire length of the transmission burst of the TDD-LTE frame format may be represented by 000100. As another example, in the LAA frame format 3, the position of the special subframe and the entire length of the transmission burst of the TDD-LTE frame format may be represented by 000011. As another example, in the LAA frame format 2, the position of the special subframe and the entire length of the transmission burst of the TDD-LTE frame format may be represented by 000010.

As illustrated in FIG. 17, the structure of the TDD-based frame format (for example, LAA frame format 4, 3, 2, . . . , x) suitable for the unlicensed band may include the reservation signal, the FFI, the downlink partial subframe, the downlink subframe, the DwPTS, the GP, the UpPTS, the uplink subframe, the uplink partial subframe, or the like.

The reservation signal and the FFI may be included in the initial signal. The FFI may include at least two OFDM symbols.

The UpPTS transmission is canceled and thus the reservation signal positioned before the GP may also be transmitted longer.

A method for configuring FFI will be described below.

Figure 18:
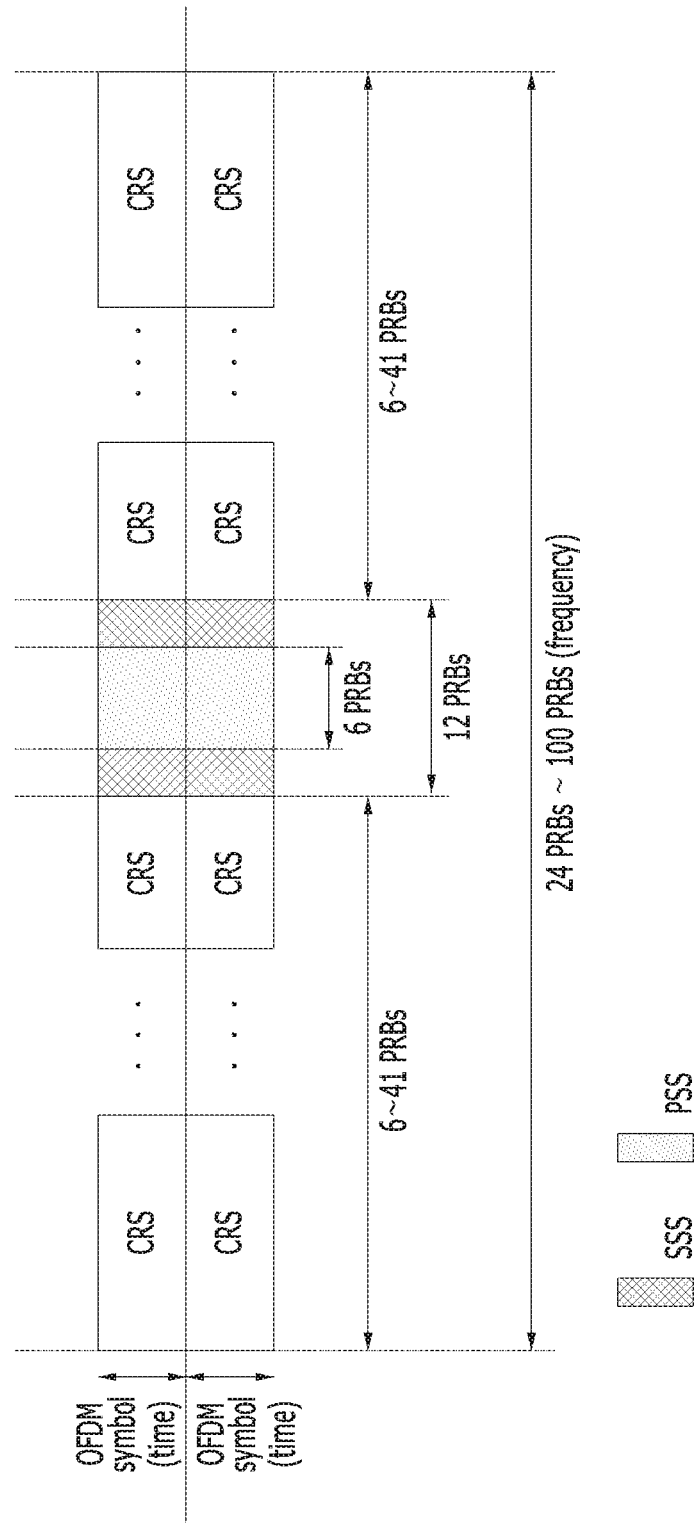
FIG. 18 is a diagram illustrating a structure of a frame format indicator-type 2 depending on various bandwidths, according to an exemplary embodiment of the present invention.
Figure 19:
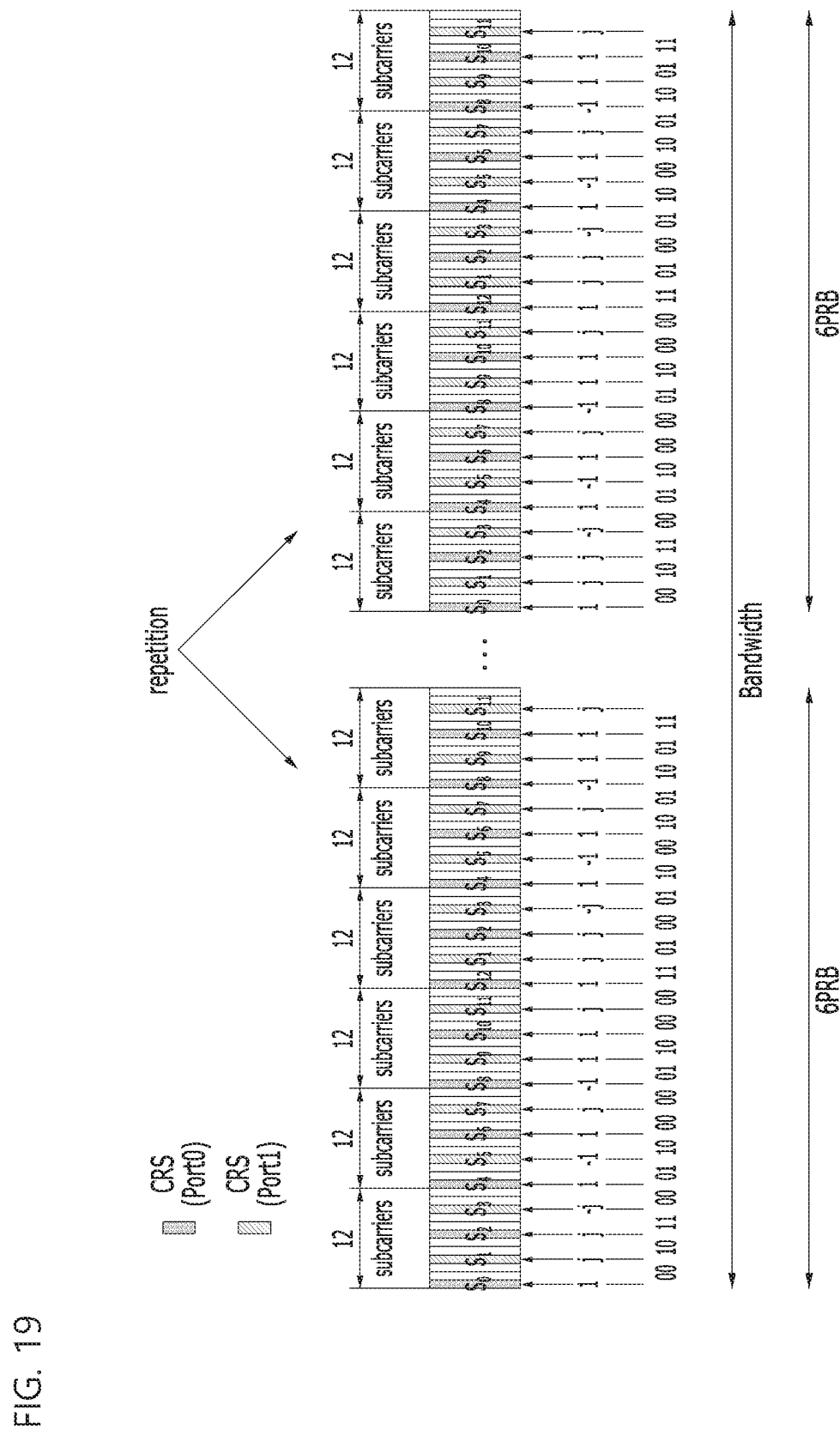
FIG. 19 is a diagram illustrating a cell-specific reference signal (CRS) mapping method of a frequency base and a modulation method for each symbol, when the number of PRBs corresponding to the entire bandwidth is 25, according to an exemplary embodiment of the present invention.

The FFI may be represented in the frequency domain as illustrated in FIG. 18 or 19.

FIG. 18 is a diagram illustrating a structure of a frame format indicator (FFI)-type 2 depending on various bandwidths, according to an exemplary embodiment of the present invention.

The FFI may include a primary synchronization signal (PSS), a secondary synchronization signal (SSS), and a cell-specific reference signal (CRS) on the frequency base.

First, the PSS will be described.

The PSS has the same signal configuration and mapping form on the frequency base as the LTE system of the licensed band. As illustrated in FIG. 18, the PSS region may occupy six physical resource blocks (PRBs) belonging to an intermediate point among PRBs (for example, 24 to 100) corresponding to the entire frequency bandwidth defined by the system. Here, one PRB corresponds to 12 subcarriers.

A process of generating a frequency domain sequence $d_u(n)$ for a PSS and mapping it to a frequency domain may be defined like the following Equation 24.

$$d_u(n) = \begin{pmatrix} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{pmatrix} \quad \text{(Equation 24)}$$

In the above Equation 24, u may be defined by the following Table 1.

TABLE 1

Root indices for the PSS

| N_ID^(2) | Root index u |
|---|---|
| 0 | 25 |
| 1 | 29 |
| 2 | 34 |

In the above Table 1, N_ID^(2) represents $N_{ID}^{(2)}$.

The frequency subcarrier index k of the PSS mapped to the frequency domain PSS may be defined like $$k = n - 31 + \frac{N_{RB}^{DL} N_{SC}^{RB}}{2}$$

(however, n=0,1,2, . . . ,61).

Here, $N_{RB}^{DL}$ represents the number of PRBs corresponding to the entire bandwidth of the system and $N_{sc}^{RB}$ is 12. $N_{RB}^{DL}$ considered in the unlicensed band may be 25, 50, 75, or 100.

The frequency subcarrier index k of the PSS mapped to a void region may be defined like $$k = n - 31 + \frac{N_{RB}^{DL} N_{SC}^{RB}}{2}$$

(however, n=−5,−4, . . . ,−1,62,63, . . . 66).

The SSS will be described.

The SSS may be divided in half. In detail, as illustrated in FIG. 18, a region corresponding to each of the half (three PRBs) of the SSS is mapped to a frequency domain lower or higher than the PSS region. A method for generating an SSS region may be defined like the following Equation 25.

$d(2n) = s_0^{(m0)}(n)c_0(n)$ $d(2n+1) = s_1^{(m1)}(n)c_1(n)z_1^{(ms)}(n)$ or $d(2n) = s_1^{(m1)}(n)c_0(n)$ $d(2n+1) = s_0^{(m0)}(n)c_1(n)z_1^{(m)}(n)$ (Equation 25)

In the above Equation 25, $0 \leq n \leq 30$ and index $m_0$ and $m_1$ may be defined by a physical layer cell identity group $N_{ID}^{(1)}$ like the following Equation.

$$m_0 = m' \bmod 31$$

$$m_1 = (m_0 + \lfloor m'/31 \rfloor + 1) \bmod 31$$

$$m' = N_{ID}^{(1)} + q(q+1)/2, \quad q = \left\lfloor \frac{N_{ID}^{(1)} + q'(q'+1)/2}{30} \right\rfloor, \quad q' = \lfloor N_{ID}^{(1)}/30 \rfloor$$

Here, $N_{ID}^{(1)}$ may be one of values of the following Table 2. That is, $N_{ID}^{(1)}$ in may be one of 0 to 167.

TABLE 2

Mapping between physical-layer cell-identity group and the indices $m_0$ and $m_1$

| N_ID^(1) | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |

TABLE 2-continued

Mapping between physical-layer cell-identity group and the indices $m_0$ and $m_1$

| N_ID^(1) | $m_0$ | $m_1$ |
|---|---|---|
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |

In the above Table 2, N_ID^(1) represents $N_{ID}^{(1)}$.

The $m_0$ and $m_1$ values (value defined in the above Table 2) applied to two sequences $s_0^{(m_0)}(n)$ and $s_1^{(m_1)}(n)$ becomes a factor of shifting an m-sequence of $\tilde{s}(n)$. Further, the process may be defined like the following Equation.

$$s_0^{(m_0)}(n) = \tilde{s}((n+m_0) \bmod 31)$$

$$s_1^{(m_1)}(n) = \tilde{s}((n+m_1) \bmod 31)$$

Here, $\tilde{s}_{(i)}$ may be defined like $\tilde{s}(i) = 1 - 2x(i)$ (however, $0 \leq i \leq 30$) and $x(i)$ may be defined like $x(\bar{i}+5) = (x(\bar{i}2) + x(\bar{i})) \bmod 2$, $0 \leq \bar{i} \leq 25$. Further, the initial state (status) is the same as $x(0) = 0$, $x(1) = 0$, $x(2) = 0$, $x(3) = 0$, and $x(4) = 1$.

$c_0(n)$ and $c_1(n)$ are two scrambling sequences and are determined by a PSS identity (ID) and may be determined by $\tilde{c}(n)$ consisting of two m-sequences.

$$c_0(n) = \tilde{c}((n+N_{ID}^{(2)}) \bmod 31)$$

$$c_1(n) = \tilde{c}((n+N_{ID}^{(2)}+3) \bmod 31)$$

Here, $N_{ID}^{(2)} \in \{0,1,2\}$ represents a PSS identity (ID) group.

Here, $\tilde{c}(i)$ may be defined like $\tilde{c}(i)=1-2x(i)$ (however, $0 \le i \le 30$) and $x(i)$ may be defined like $x(\bar{I}+5)=(x(\bar{I}+3)+x(\bar{I}) \bmod 2$ (however, $0 \le \bar{I} \le 25$). $\tilde{c}(i)$ Further, the initial state is the same as $x(0)=0$, $x(1)=0$, $x(2)=0$, $x(3)=0$, and $x(4)=1$.

The scrambling sequence $z_1^{(m_0)}(n)$ and $z_1^{(m_1)}(n)$ may consist of a sequence of $\tilde{z}(n)$ consisting of the following m-sequence.

$$z_1^{(m_0)}(n) = \tilde{z}((n+(m_0 \text{ and } 8)) \bmod 31)$$

$$z_1^{(m_1)}(n) = \tilde{z}((n+(m_1 \bmod 8)) \bmod 31)$$

Here, $m_0$ and $m_1$ follow the values of the above Table 2 and $\tilde{z}(i)$ is $\tilde{z}(i)=1-2x(i)$ (however, $0 \le i \le 30$). Further, $x(i)$ may be defined $x(\bar{I}+(x(\bar{I}+4)+x(\bar{I}+2)+x(\bar{I}+1) x(0) \bmod 2$ like (however, $0 \le \bar{I} \le 25$). Further, the initial state is the same as $x(0)=0$, $x(1)=0$, $x(2)=0$, $x(3)=0$, and $x(4)=1$.

Meanwhile, the frequency subcarrier index k of the SSS mapped to the frequency domain may be defined like $$k = n - 31 + 72 + \frac{N_{RB}^{DL} N_{SC}^{RB}}{2}$$

(however, n=0,1,2, ... ,30) and $$k = n - 31 - 72 + \frac{N_{RB}^{DL} N_{SC}^{RB}}{2}$$

(however, n=31,32, ... ,61).

$N_{RB}^{DL}$ considered in the unlicensed band may be 25, 50, 75, or 100.

The frequency subcarrier index k of the SSS mapped to the void region may be defined like $$k = n - 31 + \frac{N_{RB}^{DL} N_{SC}^{RB}}{2}$$

(however, n=−36,−35, ... ,−32.93, 94, ... ,97).

One subcarrier has a bandwidth of 15 KHz. Therefore, six PRBs occupy a bandwidth of 1.08 MHz.

Finally, the CRS including the frame information and the uplink scheduling information will be described. As illustrated in FIG. 18, the CRS region before or after the synchronous signal regions (PSS and SSS) may occupy 6 to 41 PRBs. The structure of the CRS will be described in detail with reference to FIG. 19.

FIG. 19 is a diagram illustrating a cell-specific reference signal (CRS) mapping method of a frequency base and a modulation method for each symbol, when the number of PRBs corresponding to the entire bandwidth is 25, according to an exemplary embodiment of the present invention.

$S_0, S_1, \ldots, S_{12}$ illustrated in FIG. 19 represent a modulation symbol configuring the CRS.

The CRS region (region to which the CRS is mapped) has the CRS structure (using two antenna ports (for example, antenna port Nos. 0 and 1)) mapped to the existing LTE OFDM symbol No. 0 and may be defined by the following Equation 26.

$$a_{k,l}^{(p)} = r_l(m) \qquad \text{(Equation 26)}$$

In the above Equation 26, a is a complex symbol and represents a signal input to an inverse fast Fourier transform (IFFT) block. Further, in the above Equation 26, p represents the antenna port number and corresponds to the index k of the frequency base and the index l of the OFDM symbol.

In the above Equation 26, k, l, and m may be defined as follows.

$$k = 6m + (v + v_{shift}) \bmod 6$$

$$l = 0, 1, 2, \ldots, \text{ or } 13$$

$$m = \begin{cases} m_0, & k < \frac{N_{RB}^{DL} N_{sc}^{RB}}{2} \\ m_1 - (N_{RB}^{DL} + 13), & k \ge \frac{N_{RB}^{DL} N_{sc}^{RB}}{2} \end{cases}$$

$$m_0 = 1, 2, \ldots, N_{RB}^{DL} - 14$$

$$m_1 = N_{RB}^{DL} + 14, N_{RB}^{DL} + 15, \ldots, 2N_{RB}^{DL} - 1$$

Here, v may be defined by $$v = \begin{cases} 0 & \text{if } p = 0 \\ 3 & \text{if } p = 1 \end{cases}$$

and vshift may be defined $v_{shift} = N_{ID}^{cell} \bmod 6$. $N_{ID}^{cell}$ by represents the physical cell ID. $N_{ID}^{cell}$ In detail, FIG. 19 illustrates the CRS mapping of the frequency base when $N_{RB}^{DL}$ is 25 (i.e., when the entire bandwidth of the system is 5 MHz).

In the above Equation 26, $r_l(m)$ consists of a differential quadrature phase shift keying (D-QPSK) symbol and may be mapped like the following Equation 27.

$$r_l(i) = z_i \cdot z_{i+1} \qquad \text{(Equation 27)}$$

$$z_0 = s_{init}$$

$$z_i = \begin{cases} \tilde{c}_i = 0, \tilde{c}_{i+1} = 0 & z_i = \exp\left(j \cdot \frac{\pi}{2}\right) \\ \tilde{c}_i = 0, \tilde{c}_{i+1} = 1, & z_i = \exp(j \cdot \pi) \\ \tilde{c}_i = 1, \tilde{c}_{i+1} = 0, & z_i = \exp\left(j \cdot \frac{3\pi}{2}\right) \\ \tilde{c}_i = 1, \tilde{c}_{i+1} = 1, & z_i = \exp(2j\pi) \end{cases}, i = 1, \ldots, 23$$

$s_{init}$ is aQPSK symbol (x=I+jQ) and an in-phase and a quadrature-phase are $1/\sqrt{2}$. Here, $\tilde{c}$ a coded bit to which the channel coding is applied and may have a length of 46 (for example, $\tilde{c}_0, \tilde{c}_1, \ldots, \tilde{c}_{45}$).

Therefore, the length of transmitted information $b_i$ is a variable length n smaller than 32 and is input as an input bit length n of a second order Reed Muller (RM) code (32, n). $c_0, c_1, \ldots, c_{13}$ that are a most significant bit of 14 bits among $c_0, c_1, \ldots, c_{31}$ that are an output coded bit are concatenated to an original 32 bit output $c_0, c_1, \ldots, c_{31}$, and thus 46 bits are finally generated (for example, $\tilde{c}_{0,1,2,\ldots 45} = c_0, c_1, \ldots, c_{31}, c_0, c_1, \ldots, c_{13}$).

Figure 20:
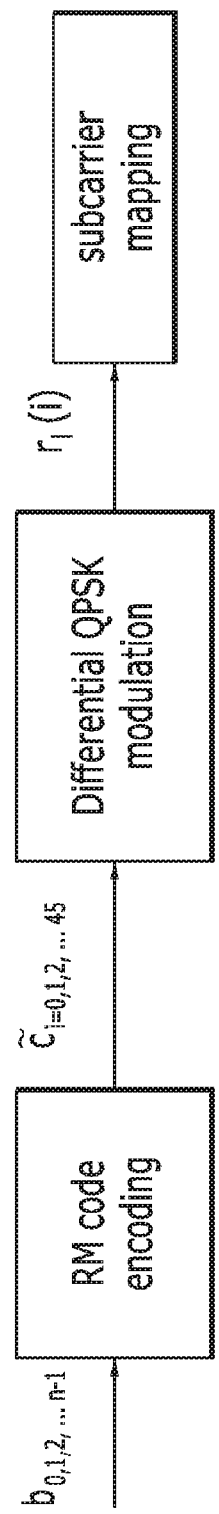
FIG. 20 is a diagram illustrating a CRS mapping flow after encoding of a frame format indicator, according to an exemplary embodiment of the present invention.

FIG. 20 is a diagram illustrating a CRS mapping flow after encoding of a frame format indicator (FFI), according to an exemplary embodiment of the present invention.

The transmission information n bits (for example, $b_0$, $b_1, \ldots, b_{n-1}$) to which the encoding is applied may include 6 bits informing the length of the transmission frame burst and the position of the special subframe and n–6 bits for an aggregated uplink transmission time indicator signal (AUTTIS). The transmission information n bits (for example, $b_0$, $b_1, \ldots, b_{n-1}$) are encoded by the RM code encoding, and thus becomes a bit stream $\tilde{c}_{i=0,1,2,\ldots,45}$. Further, the bit stream $\tilde{c}_{i=0,1,2,\ldots,45}$ is applied with bit extension and then D-QPSK modulation. The subcarrier mapping is applied to $r_l(i)$ generated by the D-QPSK modulation.

Further, the FFI may be used for the purpose of a frequency offset of the LAA TDD-LTE frame and channel estimation. As illustrated in FIG. 17 or 18, two OFDM symbols included in the FFI are repeatedly transmitted. The terminal may use the characteristics of the FFI to estimate an accurate carrier frequency offset (CFO) in the time domain.

Further, the FFI may be used for the purpose of the channel estimation function. When the channel coding demodulation is performed, the base station performs bit decoding on the transmitted bit. If the terminal performs the estimation using the decoded bit sequence to configure the transmitting D-QPSK symbol, the terminal may determine a reference symbol that the base station intends to originally transmit. Then, the terminal may estimate the phase difference for the actually received CRS, and therefore may use the FFI as the channel estimation for the receiving data. Further, the terminal may decode the synchronous signals (PSS, SSS). In detail, the terminal recovers the reference symbol and may perform the channel estimation on 12 PRBs of a center corresponding to the synchronous signals (PSS, SSS) based on a scheme of comparing the recovered reference symbol with the received signal.

The partial subframe does not take the complete subframe form as illustrated in FIG. 17 but is used for the case in which only a portion of the subframe like the DwPTS or the UpPTS is transmitted. In the current TDD-LTE standard, only the DwPTS consisting of 3, 6, 9, 10, 11, or 12 OFDM symbols is defined, but according to an exemplary embodiment of the present invention, the DwPTS or the UpPTS may consist of 1, 2, 4, 5, 7, or 8 OFDM symbols.

Figure 21:
FIG. 21 is a diagram illustrating the TDD-LTE frame format configuration for LAA when the maximum continuous transmission length is 10 ms, according to an exemplary embodiment of the present invention.

FIG. 21 is a diagram illustrating the TDD-LTE frame format configuration for LAA when the maximum continuous transmission length is 10 ms, according to an exemplary embodiment of the present invention.

In detail, FIG. 21 illustrates the LTE-LAA TDD frame format that may be added by the extended structure of FIG. 17 when the maximum continuous transmission limitation is 10 ms.

FIG. 21 illustrates one that may be represented by 6 bits other than the AUTTIS information among n bits allocated to the FFI. The FFI may include the AUTTIS information, the position of the special subframe, and the entire length of the transmission burst of the TDD-LTE frame format The structure (or principle) of the LAA frame format illustrated in FIG. 21 is the same as or similar to the structure (or principle) of the LAA frame format illustrated in FIG. 17.

For example, in the LAA frame format 6 in illustrated in FIG. 21, the position of the special subframe and the entire length of the transmission burst of the TDD-LTE frame format may be represented by 010110. As another example, in the LAA frame format 7, the position of the special subframe and the entire length of the transmission burst of the TDD-LTE frame format may be represented by 010111.

As another example, in the LAA frame format 8, the position of the special subframe and the entire length of the transmission burst of the TDD-LTE frame format may be represented by 011000. As another example, in the LAA frame format 15, the position of the special subframe and the entire length of the transmission burst of the TDD-LTE frame format may be represented by 011111.

As illustrated in FIG. 21, the structure of the LAA frame format (for example, LAA frame format 15, . . . , 8-6, . . . , x) may include the reservation signal, the FFI, the downlink partial subframe, the downlink subframe, the DwPTS, the GP, the UpPTS, the uplink subframe, the uplink partial subframe, or the like.

Hereinafter, a method for determining opportunistic and adaptive uplink signal transmission timing suitable for an unlicensed band by using an aggregated uplink transmission time indicator signal (AUTTIS) will be described The transmission timing of the uplink signal may be efficiently configured to fit the unlicensed band based on the frame structure illustrated in FIGS. 17 and 21.

Figure 22:
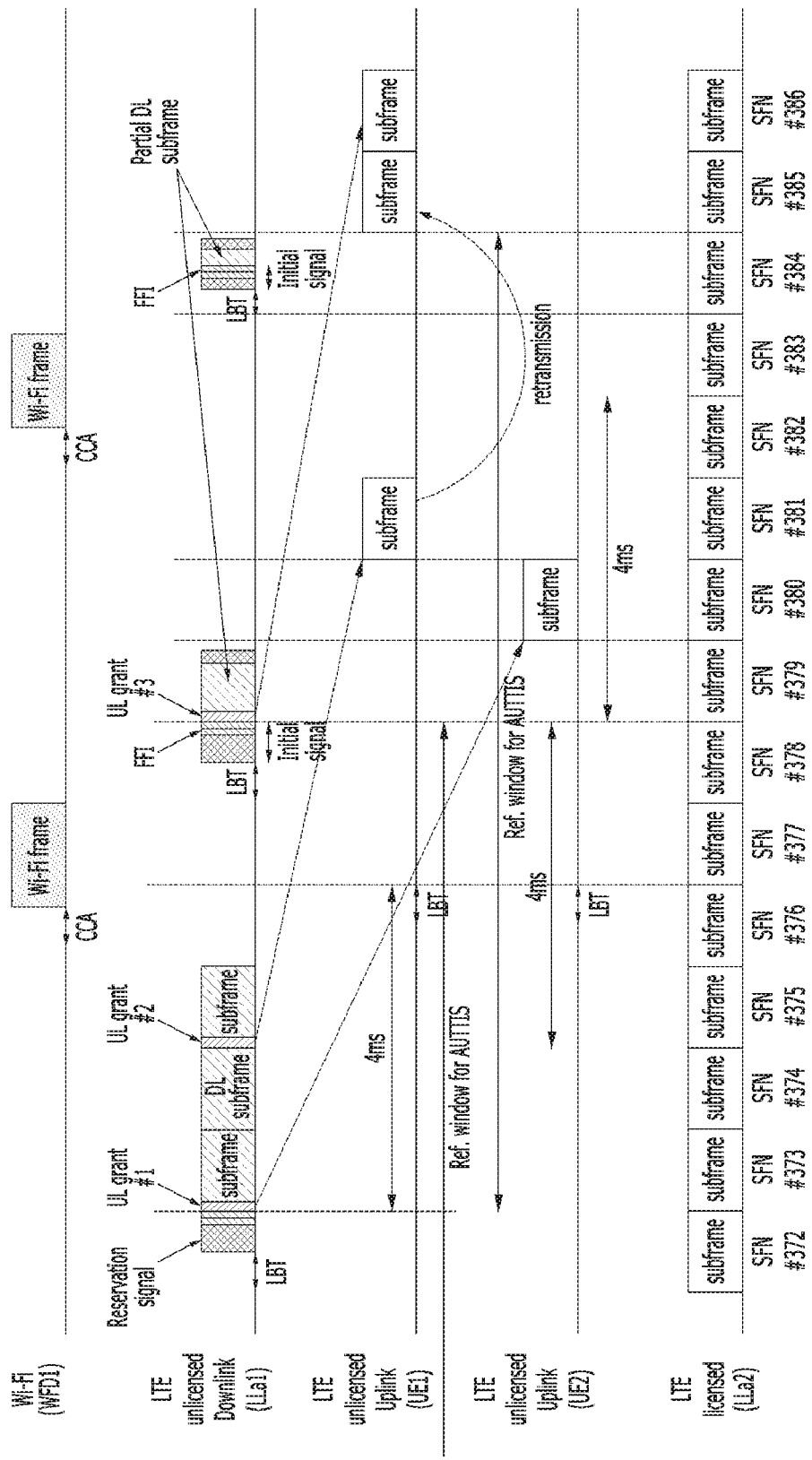
FIG. 22 is a diagram illustrating a relationship between aggregated uplink transmission time indicator signal (AUTTIS) information and an uplink transmission, according to an exemplary embodiment of the present invention.

FIG. 22 is a diagram illustrating a relationship between aggregated uplink transmission time indicator signal (AUTTIS) information and an uplink transmission, according to an exemplary embodiment of the present invention. In detail, FIG. 22 illustrates the WiFi device WFD1, the base station LLa1, and the terminals UE1 and UE2 that are operated in the unlicensed band and the base station LLa2 operated in the licensed band.

As illustrated in FIG. 22, the AUTTIS included in the FFI suggests the information on the uplink frame response transmission instruction for the subframe time to which a grant is given (transmitted) within a length of a window for the AUTIS. Here, the window for the AUTTIS corresponds to past N (for example, 12) subframes based on the timing when the AUTTIS signal is transmitted.

That is, if the granted terminals demodulate the AUTTIS, they may confirm the transmission grant signal matching the timing of the subframe to which the grant is given (transmitted) among past N (for example, 12) subframes based on the timing of the subframe at which the AUTTIS is transmitted.

FIG. 22 illustrates the case in which an UL grant is given (transmitted) at subframe numbers (SFN) 373, 375, and 379. That is, an UL grant UL grant #1 for the terminal UE2 is given (transmitted) at the SFN 373 and an UL grant UL grant #2 and UL grant #3 for the terminal UE1 is given (transmitted) at the SFNs 375 and 379.

For example, the base station LLa1 approaches the unlicensed band channel at timing of SFN 378 to confirm that the corresponding channel is in the idle status and transmits the initial signal after the constant back-off. The initial signal includes the reservation signal and the FFI (including AUTTIS). If the terminal UE1 demodulates the AUTTIS included in the initial signal, the terminal UE1 may confirm at what past subframe reversely from the timing when the demodulation is performed the grant UL grant #3 is obtained. That is, viewing from a different standpoint, the terminals UE1 and UE2 may obtain the information on when the uplink transmission may be performed through the demodulation of the AUTTIS.

Figure 23:
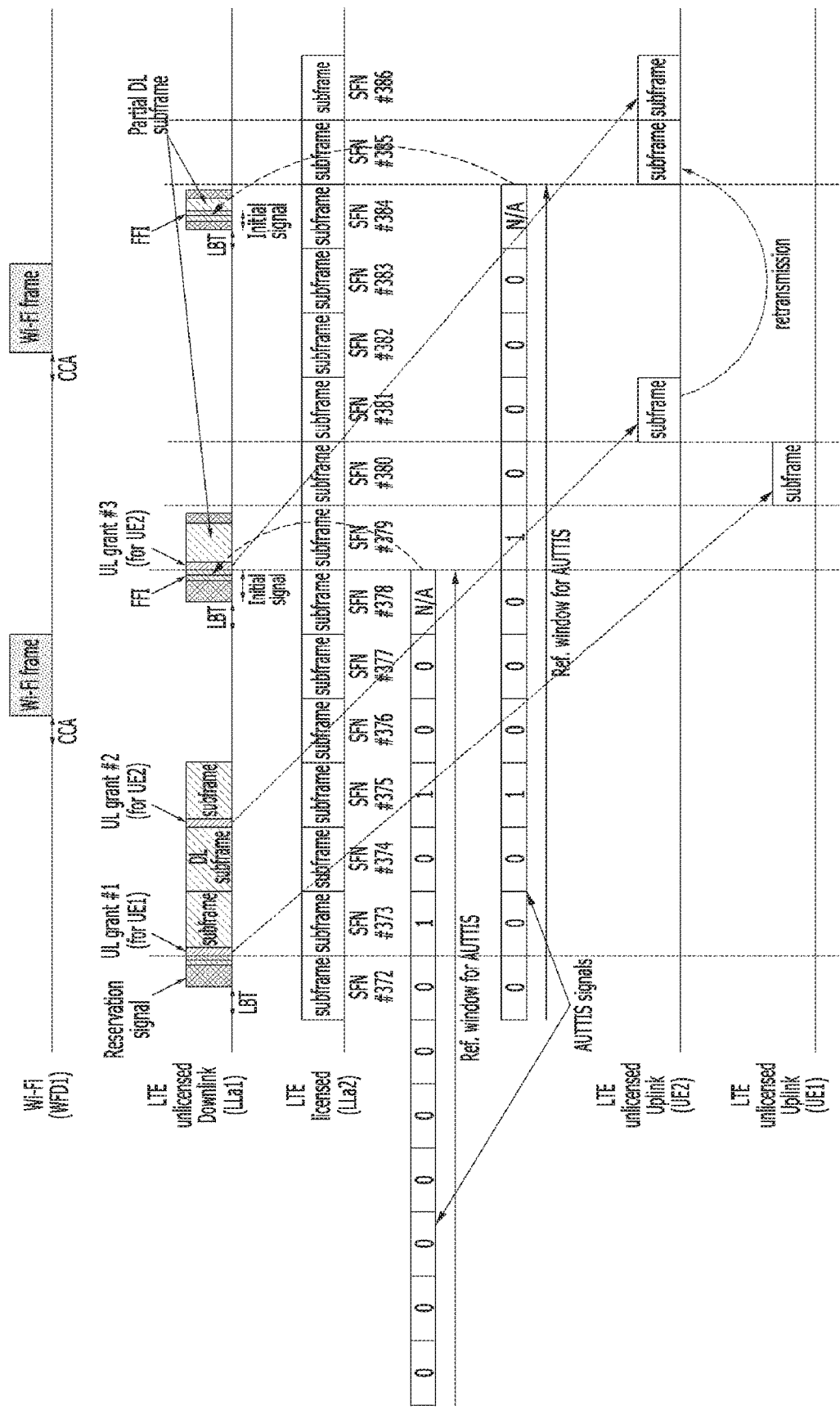
FIG. 23 is a diagram illustrating a relationship between an AUTTIS binary bit structure and an uplink grant (UL grant), according to an exemplary embodiment of the present invention.

FIG. 23 is a diagram illustrating a relationship between an AUTTIS binary bit structure and an uplink grant (UL grant), according to an exemplary embodiment of the present invention. In detail, FIG. 23 illustrates the WiFi device WFD1, the base station LLa1, and the terminals UE1 and UE2 that are operated in the unlicensed band and the base station LLa2 operated in the licensed band.

As illustrated in FIG. 23, the AUTTIS may represent, in a subframe unit, the subframe at which the grant information is transmitted among past N (for example, 12) subframes based on the subframe timing at which the AUTTIS is transmitted. For example, when N=12, the AUTTIS may consist of 12 bits.

Further, since the transmission order of the terminal from a bit closest to the MSB of the AUTTIS is determined, the transmission order of the terminal may be automatically determined. When the plurality of terminals obtains a grant at the same subframe time and transmits a signal, the plurality of terminals may simultaneously transmit a signal based on the frequency division multiplexing like the operation of the existing licensed band.

FIG. 23 illustrates the case in which the base station LLa1 gives (transmits) UL grant UL grant #1 for the terminal UE1 at the SFN 373 and gives (transmits) UL grant UL grant #2 and UL grant #3 for the terminal UE2 at the SFNs 375 and 379.

As illustrated in FIG. 23, when each bit for the SFNs 373 and 375 among 12 bits of the AUTTIS belonging to the FFI transmitted at the SFN 378 is set to be 1, the terminals UE1 and UE2 receive the corresponding AUTTIS at the SFN 378 and then demodulate it. Further, the terminal UE1 associated with a grant given (transmitted) at the SFN 373 performs the uplink transmission to the timing of SFN 380. Further, the terminal UE2 associated with a grant given (transmitted) at the SFN 375 performs the uplink transmission to the timing of SFN 381.

Therefore, the AUTTIS transmitted at the SFN 378 is 000000010100 (In the case of N=12) and the AUTTIS transmitted at SFN 384 is 000100010000 (in the case of N=12). That is, the number of bits having a value of 1 among the bits of the AUTTIS transmitted at the SFN 378 is two and a bit closest to the MSB among the two bits having a value of 1 corresponds to the UL grant UL grant #1 transmitted by the base station LLa1 at the SFN 373 and a bit second closest to the MSB corresponds to the UL grant UL grant #2 transmitted by the base station LLa1 at the SFN 375.

Therefore, since there is no grant transmitted at the SFN 374, the terminal UE1 and the terminal UE2 may sequentially perform the uplink transmission at the SFNs 380 and 381 and the base station LLa1 may know that the terminals UE1 and UE2 sequentially transmit the uplink signal without a gap. That is, the terminal UE1 corresponding to a bit closest to the MSB among bits having a value of 1 belonging to the AUTTIS may transmit the uplink signal prior to another terminal UE2.

As a result, when the initial signal may be transmitted by the base station LLa1 in the unlicensed band, the base station LLa1 may use the AUTTIS to efficiently inform the terminal of the uplink transmission timing in an asynchronous, adaptive, and aggregated form. Further, the method for using an AUTTIS has advantages in that the uplink transmission is not performed at the timing when 4 ms lapses from the UL grant timing.

The AUTTIS according to the exemplary embodiment of the present invention may have a function of separately informing a retransmission request. In the method according to the exemplary embodiment of the present invention, unlike the hybrid automatic repeat request (HARQ) uplink transmission timing base in the asynchronous form for the existing licensed band, the asynchronous retransmission scheduling is performed.

As illustrated in FIG. 23, the base station LLa1 requests the retransmission of the uplink subframe transmitted at the SFN 38 by the terminal UE2 to the terminal UE2, using the AUTTIS belonging to the FFI transmitted at the SFN 384. The terminal UE2 performs the retransmission of the corresponding uplink subframe at the SFN 385.

Since the AUTTIS transmitted at the SFN 384 indicates the UL grant UL grant #2 transmitted at the SFN 375, the retransmission of the uplink signal received at the SFN 381 by the base station LLa1 is performed.

The AUTTIS transmitted at the SFN 384 is 000100010000 (in the case of N=12), in which a bit closest to the MSB among two bits having a value of 1 corresponds to the UL grant (UL grant #2) transmitted by the base station LLa1 at the SFN 375 and a bit second closest to the MSB corresponds to the UL grant (UL grant #3) transmitted by the base station LLa1 at the SFN 379. That is, since a bit closest to the MSB among two bits having a value of 1 corresponds to the retransmission, the terminal UE2 performs the retransmission at the SFN 385 and the uplink subframe corresponding to the UL grant (UL grant #3) transmitted at the SFN 379 is transmitted at SFN 386.

Figure 24:
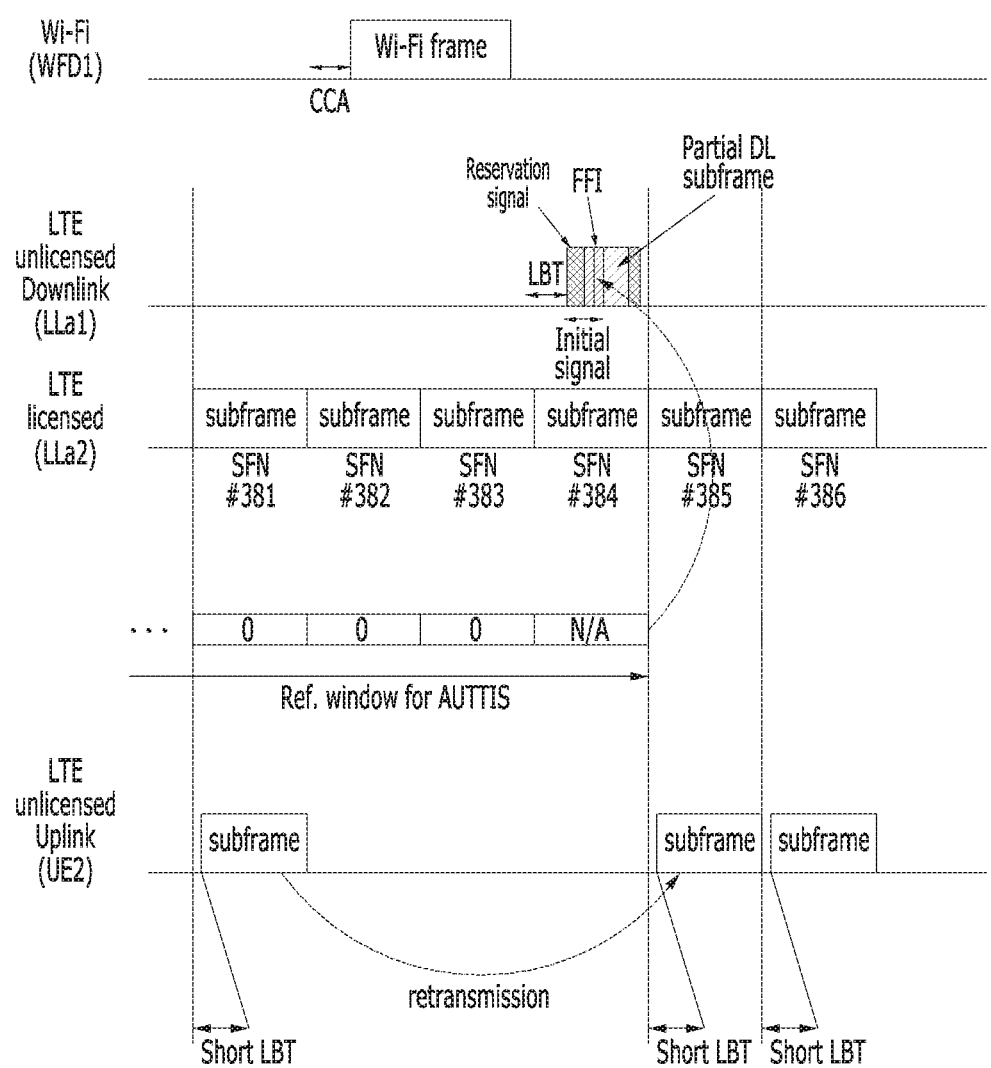
FIG. 24 is a diagram illustrating a short LBT performed just before the uplink transmission, according to an exemplary embodiment of the present invention.

FIG. 24 is a diagram illustrating a short LBT performed just before the uplink transmission, according to an exemplary embodiment of the present invention. In detail, FIG. 24 illustrates the WiFi device WFD1, the base station LLa1, and the terminal UE2 that are operated in the unlicensed band and the base station LLa2 operated in the licensed band.

In detail, FIG. 24 illustrates the case in which the terminal UE1 transmits the uplink signal after performing a short LBT operation prior to performing the uplink transmission. The case in which the short LBT is not applied corresponds to a default.

The method illustrated in FIG. 24 may be a method for additionally applying a short LBT to the method illustrated in FIG. 23. For example, the terminal UE2 may perform the short LBT prior to performing the uplink transmission at the SFN 381. As another example, the terminal UE2 may perform the short LBT prior to performing the retransmission of the uplink signal, that is transmitted at the SFN 381, at the SFN 385 and perform the short LBT prior to performing the uplink transmission at the SFN 386. Meanwhile, a length (for example, length of 13 OFDM symbols) of the subframe after the short LBT may be different from a length (for example, length of 14 OFDM symbols) of the LTE subframe.

If a sharing channel is in a busy status for a short LBT period, the terminal UE1 cancels the uplink transmission.

However, when the short LBT is applied (for example, FIG. 24) and the short LBT is not applied (for example, FIG. 23), there is no difference in the entire uplink transmission timing of the subframe unit indicated by the AUTTIS and the mechanism.

Meanwhile, the length of the short LBT may be (16+9*k) μs,

Here, k is a parameter defined by the system.

According to the exemplary embodiment of the present invention, the occurrence problem of interference may be solved due to the time division duplexing-based LTE frame format in which the uplink and the downlink are present in the unlicensed band.

Further, according to the exemplary embodiment of the present invention, the function that is not supported by the related art is added, and thus the interference problem caused at the guard interval and the uplink transmission timing may be solved by changing the structure of the special subframe of the TDD-LTE frame format. By doing so, the increase in the entire network throughput may be expected by securing the prevention of the signal collision on the radio channel along with the increase in the transmission efficiency.

Further, according to the exemplary embodiment of the present invention, the frame format associated with the ratio and the timing between the uplink subframe and the downlink subframe may be changed depending on the change in the scheduling of the base station and the information on the frame format may be efficiently transmitted.

Further, according to the exemplary embodiment of the present invention, the frame format indicator signal may be used for the purpose of providing the information on the frame format as well as may be used for the purpose of estimating the frequency synchronization like the frequency error (carrier frequency offset) and estimating the channel for the demodulation of the data signal. By doing so, it is possible to increase the transmission efficiency in the LTE operation of the unlicensed band.

Further, according to the exemplary embodiment of the present invention, it is possible to increase the efficiency of the LTE-LAA network as well as the network efficiency of all the systems used by sharing the unlicensed band by efficiently applying the uplink transmission in consideration of the unlicensed characteristics in the scheduling-based LTE uplink system.

3. Method for Transmitting Initial Signal in Wireless Communication Cellular System of Unlicensed Frequency Band The current LTE standard does not define the channel sensing function and does not define a procedure of transmitting a wireless signal to sense the channel in a small unit in the existing synchronized frame structure and then rapidly occupy the channel.

The frame structure of the current LTE is appropriate for the licensed band, and therefore is hardly applied to the unlicensed band as it is. Actually, the unlicensed band is under the environment in which several devices coexist and the environment in which the LTE signal cannot but be discontinuously transmitted by the LBT. Further, in the unlicensed band, a max length (max-COT: maximum channel occupancy time) at which the device may continuously transmit a signal is limited (for example, Japan: 4 ms, Europe: 10 ms). Due to the restrictions, the received signal synchronization technology of some of the terminals that may be applied to the existing licensed band receiver based on the discontinuous signal is also hardly applied to the unlicensed band.

Further, the case in which the base station does not transmit a signal as much as the maximum continuous transmission length limitation may also be present. For example, in the case of Europe, even when the maximum continuous transmission length is 10 ms, the case in which a length at which the base station continuously transmits a signal is 7 ms may occur. In this case, a procedure of transmitting, by the base station, information on whether the current continuous transmission length is maximum or not and information (for example, n numbers in a subframe unit) on what length the current continuous transmission length specifically corresponds to is not defined in the current LTE standard.

Further, a discovery reference signal (DRS) periodically transmitted by the small cell LTE base station for the existing license band is not transmitted when the channel is in a busy status by the LBT operation in the unlicensed band. That is, there is a problem in that the DRS applied to the current LTE licensed band may not periodically transmitted in the unlicensed band The reason is that the success of the signal transmission at the periodically accurate timing in the unlicensed band is not guaranteed due to the regulations (including content of the CCA) like the LBT. For example, the case in which the radio channel is occupied by the DRS of other devices (for example, WiFi, radar, etc.) or another base station may be generated. Under the foregoing situation, the device is difficult to confirm an indication on whether the DRS transmission succeeds or not at a high speed and a signal informing whether the try of the DRS transmission by the base station succeeds or not is not defined in the current licensed band.

Therefore, all the foregoing problems need to be solved and the initial signal useful to make the LTE wireless network operation in the unlicensed band feasible needs to be defined.

Hereinafter, a method for transmitting an initial signal in a wireless communication cellular system of an unlicensed frequency band will be described.

Further, a method for operating an LTE system of an unlicensed band featuring a discontinuous downlink burst frame transmission will be described below.

Further, a method for generating an initial signal for fitting time synchronization and frequency synchronization of a received signal and maintaining fine frame synchronization between an unlicensed band and a licensed band will be described below.

Further, a channel estimation method using an initial signal capable of improving performance of a coherent signal demodulation method will be described below.

Further, a method for indicating an uplink and downlink integrated frame length and uplink transmission timing using an initial signal will be described below.

Further, a method for rapidly indicating whether a DRS transmission succeeds or not using an initial signal will be described below.

A method and an apparatus according to an exemplary embodiment of the present invention may belong to a physical layer of an LTE wireless mobile communication system. In detail, the method and apparatus according to the exemplary embodiment of the present invention may relate to a design of a signal transmitted from the base station to the terminal in the LTE system operated in the unlicensed band. Further, the method and apparatus according to an exemplary embodiment of the present invention may relate to an initial signal transmission technology reflecting characteristics of the signal transmission scheme of the unlicensed band, not the licensed band. Further, the method and apparatus according to the exemplary embodiment of the present invention may relate to a technology of providing a plurality of information (for example, configuration information of the uplink and downlink data frame, configuration information of the DRS, time synchronization and frequency synchronization, channel estimation information) using an initial signal.

Figure 25:
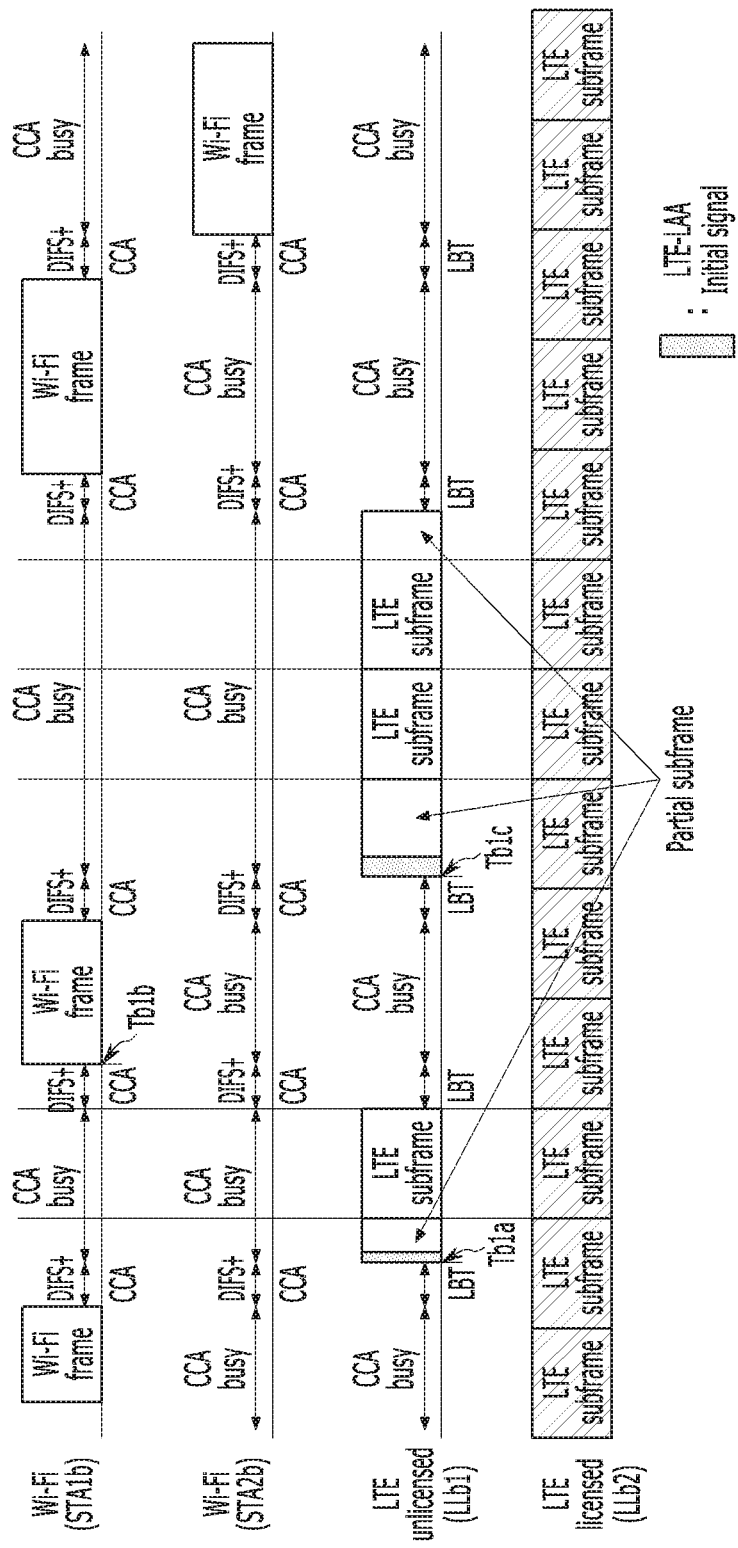
FIG. 25 is a diagram illustrating performance timing of LBT, transmission timing of an initial signal, transmission timing of a partial subframe in the unlicensed band, and a structure thereof, according to an exemplary embodiment of the present invention.

FIG. 25 is a diagram illustrating performance timing of LBT, transmission timing of an initial signal, transmission timing of a partial subframe in the unlicensed band, and a structure thereof, according to an exemplary embodiment of the present invention.

In detail, FIG. 25 illustrates that the LTE base station LLb1 operated in the unlicensed band uses the same unlicensed band (for example, frequency bandwidth of 5 GHz) as IEEE 802.11a/n/ac wireless local area network (WLAN) or WiFi devices STA1$b$ and STA2$b$. In this case, a method for maintaining coexistence and synchronization between an unlicensed band and a licensed band will be described. The LTE base station LLb1 may be an LTE license assisted access (LAA) device. Meanwhile, the LTE base station LLb1 may also be operated in both of the unlicensed band the licensed band and in this case, may simultaneously transmits the signal of the unlicensed band and the signal of the licensed band.

The CCA is a method for determining whether a radio channel is used or not by using an energy level. Similarly, the LBT performs the same function as the CCA. The success of the CCA or the LBT for the channel means that the device performing the CCA or the LBT occupies the corresponding channel. The busy status of the channel represents that the corresponding channel is occupied and the idle status of the channel represents that any device does not use the corresponding channel.

As illustrated in FIG. 25, when the WiFi device STA1$b$ first occupies the channel of the unlicensed band in time to transmit the signal (WiFi frame), the WiFi device STA2$b$ and the LTE base station LLb1 each determine that the corresponding channel is in the busy status and puts off the signal transmission.

If the signal transmission of the WiFi device STA1$b$ ends, the WiFi device STA2$b$ and the LTE base station LLb1 sense that the corresponding channel is in the idle status.

When the WiFi device STA2$b$ uses the CCA check function to sense the idle status of the corresponding channel, the signal transmission is prepared, but the signal transmission needs to be performed after passing through the distributed coordinate function interframe space (DIFS) and a temporal delay period called the random back-off in the IEEE 802.11 standard (for example, distributed coordinate function (DCF) that is a function of a channel access technique for WiFi).

Similarly, when the LTE base station LLb1 also performs the CCA and the LBT function including the random delay function to sense the idle status of the corresponding channel, it suffers from any random delay and then prepares the signal transmission (for example, LBT function of the European Telecommunications Standards Institute (ETSI) standard).

In this case, the WiFi device STA2$b$ and the LTE base station LLb1 contend with each other to use the unlicensed band and the device first passing through q that is any delay time as described above may win a contention to transmit a signal. Here, the q may be a temporal concept and may be a counter of a 1 to 9 μs unit.

Therefore, the WiFi device STA2$b$ and the LTE base station LLb1 each may transmit a signal only when passing through a total of any delay time q called the constant delay and random back-off. In the case of the WiFi device STA2$b$, as described above, the q may include the DIFS time of 34 μs and the random back-off (for example, multiple of 9 μs (including 0), that is, time of 0–N*9 μs, however, N follows IEEE 802. 11 standard). In the case of the LTE base station LLb1, the q by the LBT function may include a similar xIFS value and random back-off (for example, N*20 μs, however, N is basically random and a maximum value of N may be 24 according to the ETSI regulations) in the DIFS of the WLAN.

For example, when the WiFi device STA2$b$ suffers from the random back-off period (DIFS+CCA check), the LTE base station LLb1 first passes through any q period (extended CCA check) to transmit the initial signal at timing Tb1$a$ and transmits the partial subframe and the LTE subframe having a payload. The WiFi devices STA1$b$ and STA2$b$ sense that the corresponding channel is in the occupied state due to the initial signal transmitted by the LTE base station LLb1 and does not perform the signal transmission.

The LTE base station LLb2 operated in the licensed band does not cause the signal interference with the unlicensed band but transmits the continuous signal and transmits the signal based on a constant subframe format to provide a time reference for the unlicensed band. The length of the LTE subframe is defined in the standard as 1 ms (1000 μs).

Here, the LBT may include the WiFi devices STA1$b$ and STA2$b$ as well as a function of avoiding the collision with another LTE base station LLb1. The channel of the unlicensed band is continued to be in the idle status before timing (for example, Tb1$a$) when the LTE base station LLb1 starts to transmit a signal. Therefore, after it is determined that the unlicensed channel is in the idle status, the LTE base station LLb1 transmits the initial signal at the timing Tb1$a$ and then completes the transmission of 'one partial subframe+one full subframe'. Next, the WiFi device STA1$b$ and the WiFi device STA2$b$ sense that the corresponding channel is in the idle status and starts a contention for occupying the corresponding channel. The WiFi device STA1$b$ first passes through any delay time q and thus starts to transmit a signal at timing Tb1$b$.

After the signal transmission of the WiFi device STA1$b$ is completed, the LTE base station LLb1 again wins the contention to occupy the channel, to thereby transmit the initial signal at timing Tb1$c$ and transmit 'two partial subframes+two full subframes'. Further, the WiFi device STA1$b$ and the WiFi device STA2$b$ each win a contention in the rest period to occupy and use the channel.

The LBT, the initial signal, and the partial subframe may use the subframe of the physical layer as it is without modifying the subframe of the physical layer used in the existing licensed band to be transmitted even in the unlicensed band as well as may provide a new type of burst frame format suitable for the unlicensed band. According to the exemplary embodiment of the present invention, the initial signal is transmitted at the beginning of the signal burst discontinuously transmitted.

Figure 26:
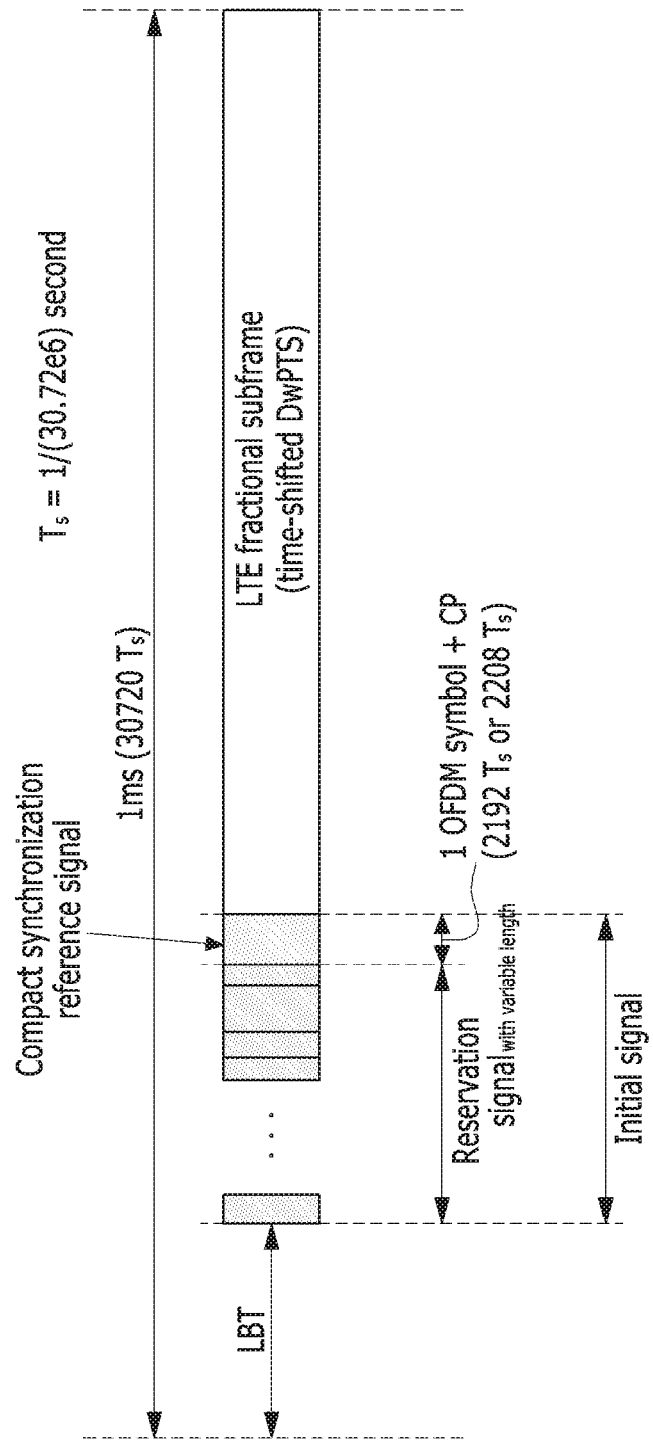
FIG. 26 is a diagram illustrating the structure of the initial signal and a relationship between the initial signal and the partial subframe, according to an exemplary embodiment of the present invention.

FIG. 26 is a diagram illustrating the structure of the initial signal and a relationship between the initial signal and the partial subframe, according to an exemplary embodiment of the present invention.

A subframe (payload data (for example, including a physical downlink shared channel (PDSCH)) following the initial signal may be a partial or fractional subframe and may also be a full subframe. FIG. 26 illustrates the case in which the partial subframe is positioned after the initial signal. The partial subframe may include a time-shifted downlink pilot time slot (DwPTS). The full subframe may have a length of 30720*$T_s$. Here, $T_s=1/(30.72e6)$ second.

The initial signal may include the reservation signal and the compact synchronization reference signal (CSRS). The reservation signal may have a variable length. The CSRS may have a fixed length (for example, one OFDM symbol+ cyclic prefix (CP)). For example, the CSRS may have a length of 2192*$T_s$ or 2208*$T_s$.

Figure 27:
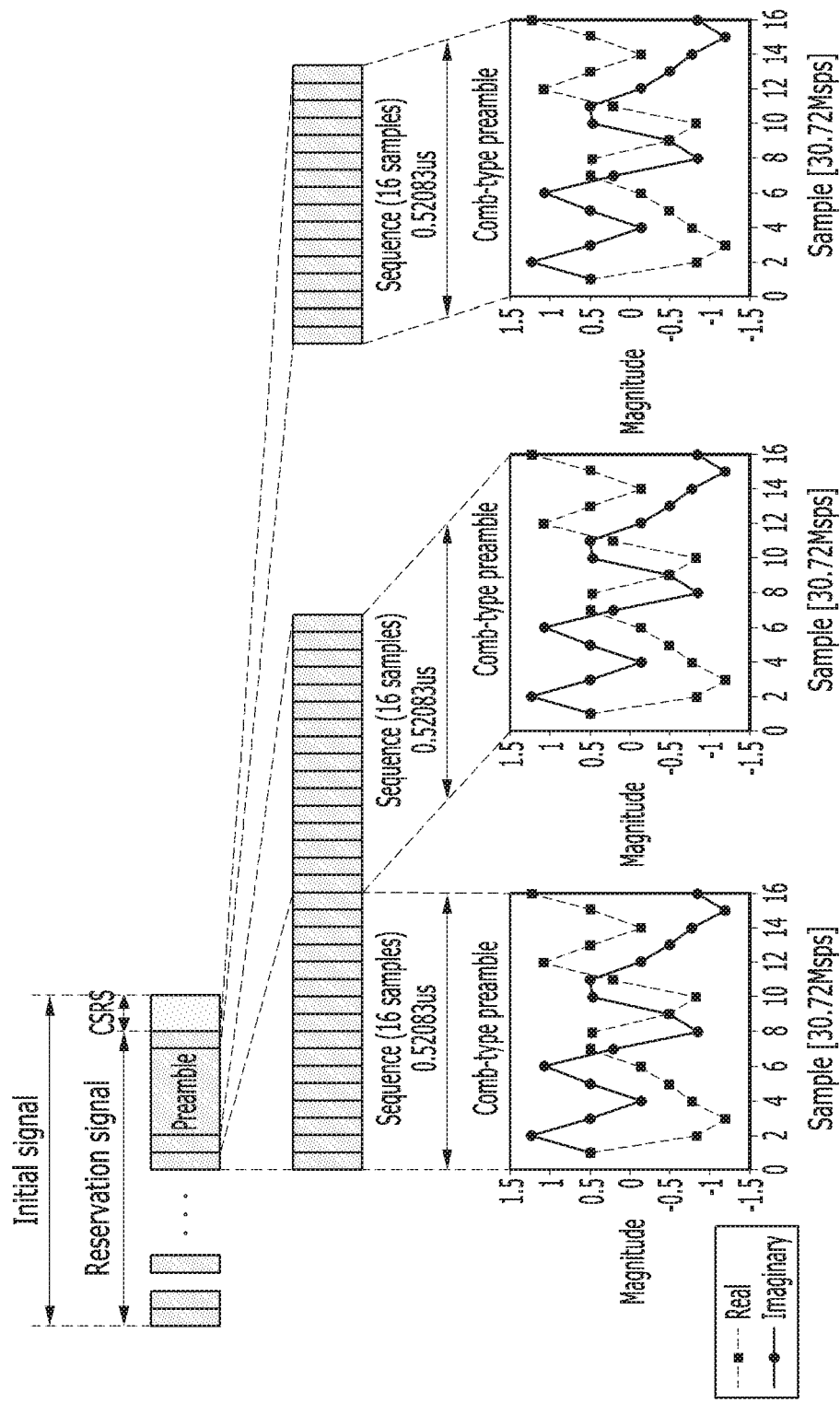
FIG. 27 is a diagram illustrating a structure of a reservation signal with a variable length used for the initial signal, according to an exemplary embodiment of the present invention.

FIG. 27 is a diagram illustrating a structure of a reservation signal with a variable length used for the initial signal, according to an exemplary embodiment of the present invention.

The reservation signal field having the variable length may include sequences consisting of 4, 8, or 16 samples. FIG. 27 illustrates the case in which a reservation signal field includes sequences consisting of 16 samples.

If one reservation signal sequence is s(n), the s(n) area may include a transmission period of a minimum signal unit having a length of about 0.521 µs. When a baseband digital sampling rate of the LTE is 30.72 MHz, time $T_s$ taken to transmit one sample is 0.0326 µs (=1/(30.72e6)). When the digital sampling rate of the baseband is 15.36 MHz, $T_s$ is 0.0651 µs (=1/(15.36e6)) and when the digital sampling rate of the baseband is 7.68 MHz, $T_s$ is 0.1302 µs (=1/(7.68e6)).

Therefore, according to an exemplary embodiment of the present invention, a transmission time of a sequence having a length of 16*$T_s$ is approximately 0.521 µs (=16/(30.72e6)). Even when the sampling rate is 15.36 MHz, the transmission time of the sequence is 0.521 µs (=8/15.36e6) and even when the sampling rate is 7.68 MHz, the transmission time of the sequence is 0.521 µs (=4/7.68e6). For reference, the transmission time of the LTE OFDM symbol is 66.67 µs (=2048/(30.72e6)). The transmission time or the length of the cyclic prefix (CP) is 4.69 µs (=144/(30.72e6)) or 5.2083 µs (=160/(30.72e6)). A length or a transmission time of one LTE subframe is 1 ms (=30720/(30.72e6)]. That is, if the sequence that is the basic unit of the preamble (reservation signal) is continuously transmitted in 1920 numbers, the sequence becomes 1 ms (one LTE subframe may be divided into 1920 periods).

The sequence s(n) of the time domain having the length of 32 may be generated by the following Equation 28.

$$s(n) = p \cdot \sum_{k=-16}^{15} \exp(j \cdot 2\pi \cdot \Delta f \cdot k \cdot n) \cdot z(k) \quad \text{(Equation 28)}$$

In the above Equation 28, p is a constant for normalizing a signal and is $\Delta f$=(30.72 MHz)/16

The sequence z(k) and the index k of the frequency domain may be defined like the following Equation 29.

$z(k)=[0 \ldots 0 \ a_{-5} \ 0 \ a_{-4} \ 0 \ldots a_{-1} \ 0 \ a_1 \ldots a_4$
$0 \ a_5 \ 0 \ldots 0]$ $k=\{-16 \ldots -1 \ 0 \ 1 \ldots 15\}$ (Equation 29)

In the above Equation 29, $a_{-5}$ to $a_5$ are a complex number and may be defined like the following Equation 30 by a binary bit.

$b_k=0, a_k=1+j$ $b_k=1, a_k=-1-j$ (Equation 30)

Binary bits $b_{-5}$ to $b_5$ may be determined by $N_{ID}^{(2)}$ and $N_{ID}^{(1)}$ that are the physical cell ID of the base station defined in the LTE standard and may be mapped to the following Equation 31.

$B(N_{ID}^{(2)})=b_4 b_5$ $B(N_{ID}^{(1)})=b_{-5}b_{-4}b_{-3}b_{-2}b_{-1}b_1 b_2 b_3$ (Equation 31)

Here, B(.) is a binary operator function that performs a conversion into a binary number. For example, if it is assumed that $N_{ID}^{(2)}$=2 and $N_{ID}^{(1)}$=97, the binary number $b_{-5}b_{-4}b_{-3}b_{-2}b_{-1}b_1 b_2 b_3 b_4 b_5$ is determined as 0110000110. Therefore, z(k) becomes [0 0 0 1+j −1−j −1−j 1+j 1+j 0 1+j 1+j −1−j −1−j 1+j 0 0].

If z(k) is converted into the time domain based on the above Equation 28, the sequence s(n) is generated. the s(n) has 32 samples as the time domain. In the system having 30.72 MHz sampling bandwidth (for example, 100 physical resource blocks (PRBs), if 16 among 33 samples of the s(n) are sequentially transmitted, 16 samples sequentially transmitted becomes a sequence having temporal granularity of about 0.5 µs. Here, the PRB is a basic unit occupying the resource of the frequency domain corresponding to 12 subcarriers in one OFDM symbol. Similarly, in the system having 15.36 MHz sampling bandwidth (for example, 50 PRBs), 8 samples among 32 samples of the s(n) are sequentially transmitted and in the system having 7.68 MHz sampling bandwidth (for example, 25 PRB), 4 samples among 32 samples of the s(n) are sequentially transmitted.

In the system occupying a bandwidth of 20 MHz, for conversion into the frequency domain, fast Fourier transform (FFT) 2048 is applied and the number of PRBs that may transmit effective data is 100. Similarly, in the system occupying a bandwidth of 10 MHz, for conversion into the frequency domain, FFT 1024 is applied and the number of PRBs that may transmit effective data is 50. Similarly, in the system occupying a bandwidth of 5 MHz, for conversion into the frequency domain, FFT 512 is applied and the number of PRBs that may transmit effective data is 25. One subcarrier occupies a bandwidth of 15 KHz.

The temporal length of the sequence s(n) is short and may have a length of the greatest common divisor corresponding to the OFDM symbol and the CP length depending on a bandwidth (for example, 100, 50, or 25 PRBs). By doing so, the sequence s(n) has a high degree of freedom and even though the device does not directly occupy the channel of the unlicensed band even in the timing when the LBT ends and the signal transmission starts, a delay up to the time when the s(n) is actually transmitted is sufficiently short, and therefore the device coexists with other devices and may achieve the time synchronization between the unlicensed band and the licensed band.

Further, since the reservation signal is transmitted in a constant pattern, an automatic gain control (AGC) process at the receiving end may effectively end at a short time. In particular, under the situation that the device does not receive the frame of the unlicensed band for a while due to discontinuity of the transmission frame, the response characteristics of the radio channel are changed and even though the power of the input frame is suddenly changed, it is possible to effectively cope with the AGC process using the reservation signal. The reservation signal for the reservation of the channel may not be transmitted depending on the situation and may be generated and transmitted by a method (for example, copying the signal of the licensed band and transmitting it as it is) other than the foregoing methods.

Figure 28:
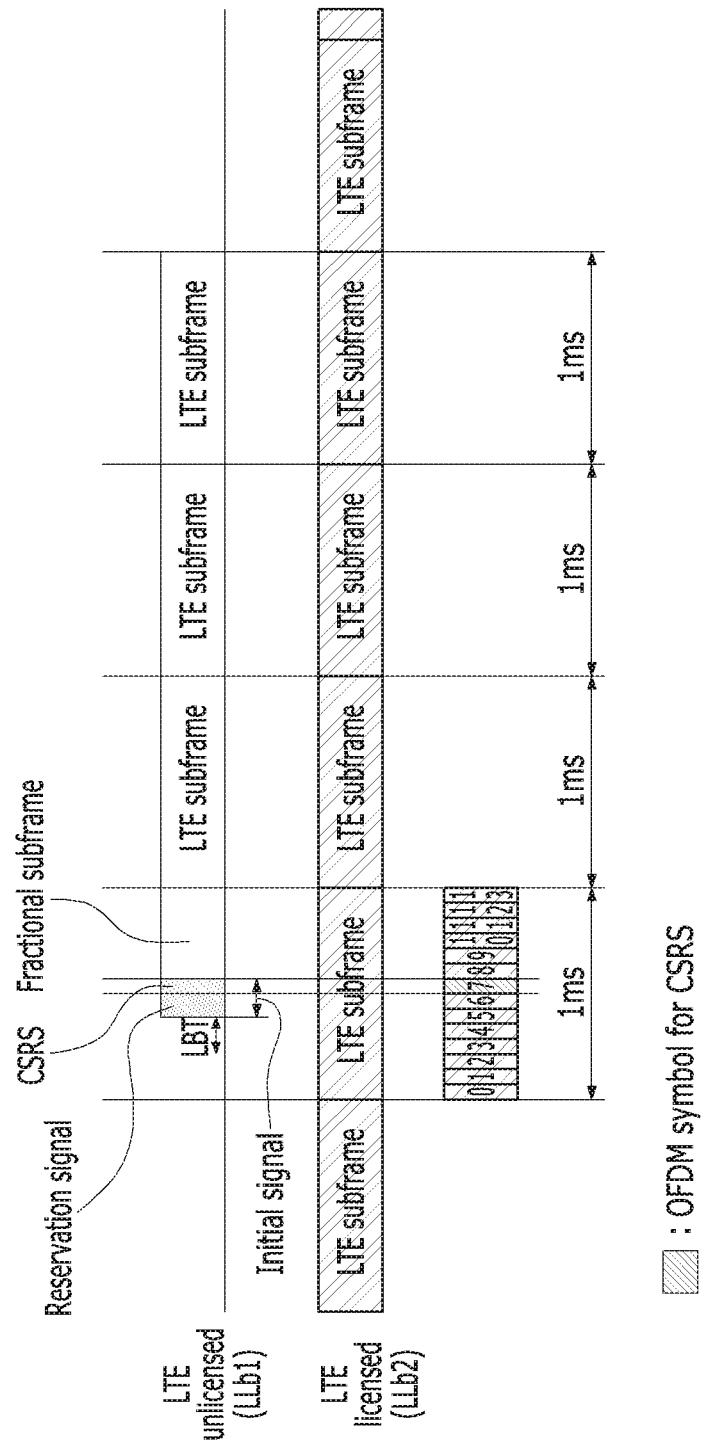
FIG. 28 is a diagram illustrating a case in which a compact synchronization reference signal (CSRS) is transmitted in the unlicensed band while being time-synchronized with OFDM symbol No. 7 of the licensed band, according to an exemplary embodiment of the present invention.

FIG. 28 is a diagram illustrating a case in which a compact synchronization reference signal (CSRS) is transmitted in the unlicensed band while being time-synchronized with OFDM symbol No. 7 of the licensed band, according to an exemplary embodiment of the present invention. FIG. 28 illustrates the LTE base station LLb1 of the unlicensed band and the LTE base station LLb2 of the licensed band.

As illustrated in FIG. 28, after the reservation signal, the CSRS transmitted by the LTE base station LLb1 may include one OFDM symbol. In detail, the CSRS is positioned between the reservation signal and the partial subframe (or full subframe).

The position of the CSRS is associated with a specific OFDM symbol number (or position) of of the subframe corresponding to the licensed band. For example, FIG. 28 illustrates the case in which the CSRS is transmitted at OFDM symbol No. 7 among OFDM symbols Nos. 0 to 13 of the unlicensed band. The beginning and end of the reservation signal are determined by the transmission timing of the fine symbol time field (FSTF). Similarly, the frame format indicator (FFI) may be automatically mapped to the specific OFDM symbol numbers of the licensed band.

The length of the CSRS may be fixed to $2192*T_s$ or $2208*T_s$ based on 30.72 MHz sampling.

Since the LBT for the channel of the unlicensed band succeeds and then the signal transmission timing may occur in all the cases within the subframe, a method for transmitting a CSRS that is a synchronous reference signal to match one of 14 OFDM symbols within the subframe may be easily considered. However, if the CSRS is not transmitted at the positions of all the possible OFDM symbols and the CSRS is transmitted only at the OFDM symbol number of the limited set, the terminal receiving the initial signal may limit candidate timing of the OFDM symbol number received by the CSRS, such that a gain of low implementation complexity may be achieved.

Figure 29:
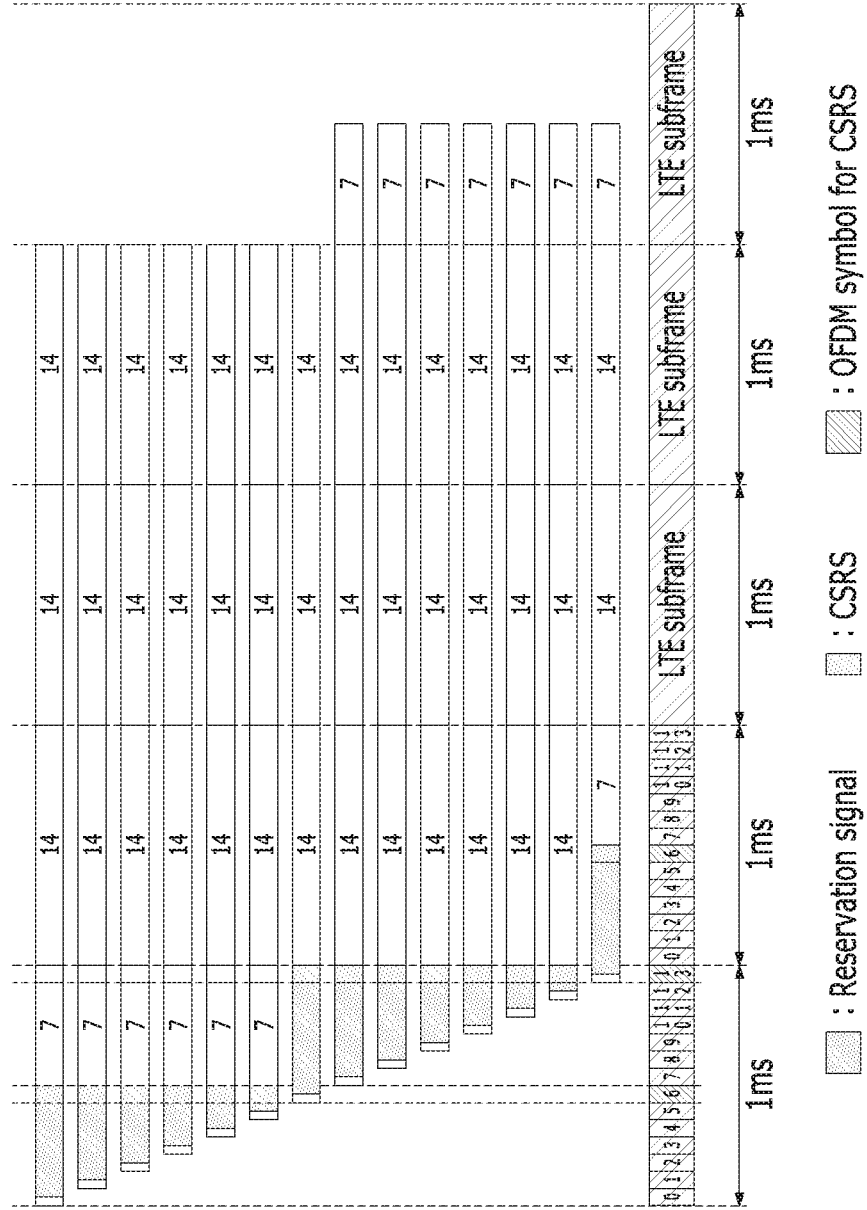
FIG. 29 is a diagram illustrating transmission timing of the CSRS classified depending on the transmission timing of the reservation signal, according to an exemplary embodiment of the present invention.

FIG. 29 is a diagram illustrating transmission timing of the CSRS classified depending on the transmission timing of the reservation signal, according to an exemplary embodiment of the present invention.

In detail, FIG. 29 illustrates the case in which the transmission timing of the CSRS is limited to OFDM symbol Nos. 6 and 13.

If all the positions of 14 OFDM symbols Nos. 0 to 13 are considered, a position estimation success possibility of the CSRS is 1/14, but if the transmission timing of the CSRS is limited as illustrated in FIG. 29, the position estimation success probability of the CSRS is increased to ½ and a kind of the partial subframes may also be limited.

Meanwhile, the timing at which the transmission may be immediately made after the LBT is one of 14 OFDM symbol number transmission timings of the subframe. Therefore, for the CSRS to be transmitted only at the position of the specific OFDM position, the actual signal transmission timing of the base station may be variably adjusted using the reservation signal as illustrated in FIG. 29. Here, the transmission of the reservation signal does not start at the boundary of the OFDM symbol and as illustrated in FIG. 29, after the LBT operation ends, the transmission of the reservation signal may immediately start at timing when it is determined that the signal transmission may be made. That is, the reservation signal may have a length of 1 OFDM symbol or more or may also have a transmission length of fractional OFDM symbol.

Therefore, the terminal does not demodulate the reservation signal having a variable length but may detect the CSRS using the correlator (for example, cross correlator). Further, the terminal compares the timing of the detected CSRS with the timing of the licensed band to implicitly know what limited case the temporal transmission position of the LTE partial subframe and the full subframe of the unlicensed band transmitted by the base station correspond to. FIG. 29 illustrates the case in which each of the partial sub frame and the full subframe of the unlicensed band transmitted by the base station correspond to 7 OFDM symbol and 4 OFDM symbols.

A basic length of a CSRS sequence $f_{1024}(n)$ is $2048*T_s$ based on a 30.72 MHz sampling rate and occupies a transmission time of 66.67 μs in time A summed length of the CP and the CSRS sequence $f_{1024}(n)$ is $2192*T_s$ or $2208*T_s$ and occupies a transmission time of 71.35 μs or 71.875 μs.

The CSRS type-1 will be described with reference to FIG. 30.

Figure 30:
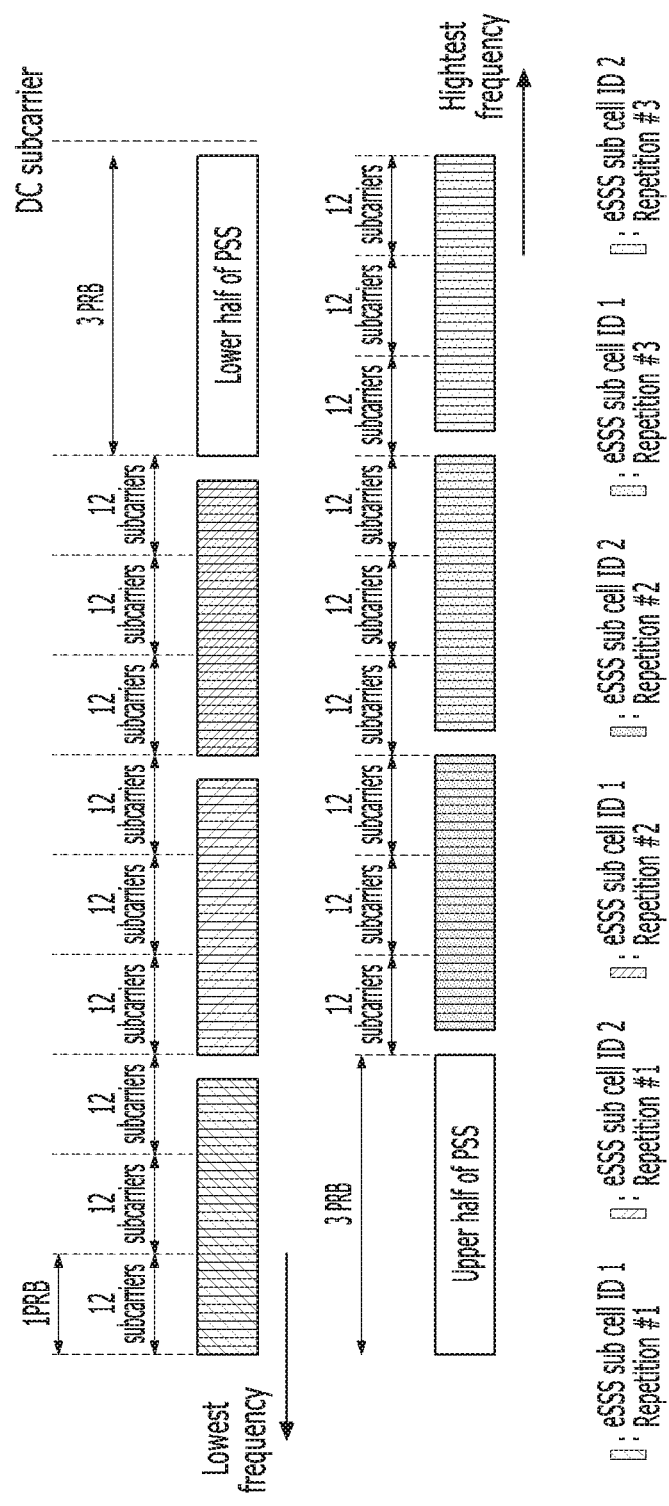
FIG. 30 is a diagram illustrating a frequency domain symbol configuration of the CSRS, according to an exemplary embodiment of the present invention.

FIG. 30 is a diagram illustrating a frequency domain symbol configuration of the CSRS, according to an exemplary embodiment of the present invention.

In detail, FIG. 30 illustrates a frequency structure of the CSRS type-1 that occupies one OFDM symbol when the bandwidth is 5 MHz. The CSRS type-1 includes a primary synchronization signal (PSS) and an encoded secondary synchronization signal (eSSS).

First, the PSS of the CSRS type-1 will be described.

The PSS has the same signal configuration and mapping form on the same frequency base as the LTE system of the licensed band. The PSS may occupy six PRBs belonging to an intermediate point among the PRBs corresponding to the entire frequency bandwidth defined by the system. Here, one PRB corresponds to 12 subcarriers.

A process of generating a frequency domain sequence $d_u(n)$ for a PSS and mapping it to a frequency domain may be defined like the following Equation 32.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{(Equation 32)}$$

In the above Equation 32, u may be defined by the following Table 3.

TABLE 3

| Root indices for the PSS | |
|---|---|
| N_ID^(2) | Root index u |
| 0 | 25 |
| 1 | 29 |
| 2 | 34 |

In the above Table 3, N_ID^(2) represents $N_{ID}^{(2)}$.

The frequency subcarrier index k of the PSS mapped to the frequency domain may be defined like the following Equation 33.

$$k = n - 31 + \frac{N_{RB}^{DL} N_{SC}^{RB}}{2} \quad \text{(Equation 33)}$$

In the above Equation 33, n=0,1,2, . . . ,61, $N_{RB}^{DL}$ represents the number of PRBs corresponding to the entire bandwidth of the system and $N_{sc}^{RB}$ is 12. $N_{RB}^{DL}$ considered in the unlicensed band may be 25, 50, 75, or 100.

The frequency subcarrier index k of the PSS mapped to a void region may be defined like $$k = n - 31 + \frac{N_{RB}^{DL} N_{SC}^{RB}}{2}$$

(however, n=−5,−4, . . . ,−1,62,63, . . . ,66).

Next, the eSSS of the CSRS type-1 will be described.

The SSS applied to the existing licensed band serves to identify 168 sub cell IDs. Therefore, if three IDs of the PSS are combined with the SSS, a total of 504 (=3*168) physical cell identities (PCIs) may be generated. Therefore, the sub cell ID of the SSS may be represented by 8 bit ($2^8$=256) information. Like the PSS, the existing SSS is mapped to the frequency domain in the form in which it occupies resources of six PRBs based on a center frequency of the entire system bandwidth. However, the PSS and the SSS are mapped to different OFDM symbols. Therefore, if the existing design succeeds as it is to configure the initial signal, the CSRS occupies at least two OFDM symbols and thus the overhead element is large. Hereinafter, a method for including one of a PSS and an SSS in an OFDM symbols and lowering demodulation failure probability that may occur upon the existing SSS demodulation will be described.

As described above, the SSS represents the physical layer cell identity (ID) group $N_{ID}^{(1)}$, and includes 168 IDs. Therefore, 168 IDs may be represented by 8 bits.

8 bits may be again divided into two SSS sub cell IDs (four bits).

The SSS sub cell ID corresponding to four bits may be encoded by Reed Muller channel encoder RM (32,4). In detail, an encoding application method may be defined by the following Equations 34 and 35.

$$M_{i,0} = 11111111111111111111111111111111$$
$$M_{i,1} = 11001100100101011010010111010010$$
$$M_{i,2} = 01011010011100001000100110111110$$
$$M_{i,3} = 00111001110011000110010010110110$$
(Equation 34)

$$B_1(i) = \sum_{n=0}^{3} (a_n \cdot M_{i,n}) \bmod 2$$

$$B_2(i) = \sum_{n=4}^{7} (a_n \cdot M_{i,n-4}) \bmod 2, \; i = 0, 1, \ldots 31$$
(Equation 35)

In the above Equation 34, $M_{i,0}$ to $M_{i,3}$ represent a basic sequence for encoding by four Reed-Muller channel coding. In the $M_{i,0}$ to $M_{i,3}$, is an index of the sequence and 0 to 3 represent a sequence number.

In the Equation 35, $a_n$ represents an input bit. For example, a 4 bit input may be converted into a 32 bit output.

The sequence generated based on the above Equations 34 and 35 are modulated by binary phase shift keying (BPSK) and the modulation process may be defined like the following Equation 36.

$$c_x(i) = 1 - 2 \cdot B_x(i)$$

or $$c_x(i) = (1 - 2 \cdot B_x(i)) \cdot \exp(j \pi/4), i=0,1,\ldots 31$$
(Equation 36)

The signal modulated based on the above Equation 36 becomes $d_x(.)$ by a differential modulation process, in which the $d_x(.)$ may be encoded like the following Equation 37.

$$d_x(i+1) = d_x(i) \cdot c_x(i)$$

$$d_x(0) = 1 \text{ or } d_x(0)\exp(j\pi/4)$$

$$i = 0, 1, \ldots 31$$
(Equation 37)

Finally, the number of symbols for representing the eSSS is 66. That is, the SSS sub cell ID requires 33 symbols.

The 33 SSS sub cell ID symbols differentially modulated are generates by being repeated n times. Here, the n for the repeat generation is determined depending on the system bandwidth. In detail, a value of n depending on the system bandwidth may be defined like the following Table 4.

TABLE 4

The frequency extendible repeat number of the repeat SSS sub cell ID symbol

| PRB | n |
|-----|---|
| 100 | 15 |
| 75 | 11 |
| 50 | 7 |
| 25 | 3 |

A total number of BPSK symbols that may be transmitted per port illustrated in the above Table 4 is changed depending on the system bandwidth and when the system bandwidth is 25 PRBs, the mapping method for n=3 is as illustrated in FIG. 30. In detail, when the entire system bandwidth is 5 MHz, the eSS sub cell ID is mapped to a resource element region corresponding to 18 PRBs other than the PSS.

Meanwhile, 'eSSS+frame additional information (AFI additional frame information)' is encoded and modulated and then may be transmitted. In detail, the SSS may be represented by 8 bits but when the device transmits the AFI through the CSRS, the AFI may be transmitted in concatenation with the SSS of 8 bits. The minimum bits additionally transmitted may be a 4 bit unit. When the device encodes only the SSS of 8 bits to generates and transmit the eSSS, the repeat transmission of n=3 may be applied on the frequency but when a bit for additional information is present, the repeat transmission frequency of 'eSSS+AFI' may be limited.

The AFI may be used as a signal representing the length of the burst frame and the transmission period of the downlink and uplink signals. Further, the AFI may include the information for identifying whether the last subframe of the downlink burst is the partial subframe as illustrated in FIG. 29.

Next, the CSRS type-2 will be described with reference to FIG. 31.

Figure 31:
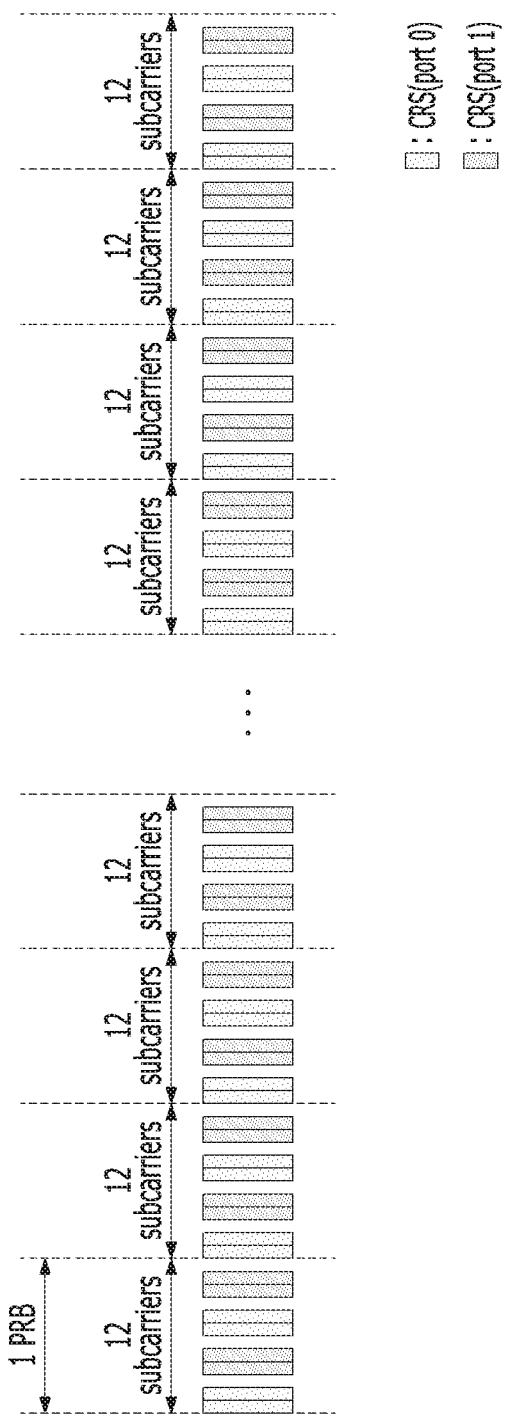
FIG. 31 is a diagram illustrating a frequency structure of a CSRS type-2, according to an exemplary embodiment of the present invention.

FIG. 31 is a diagram illustrating a frequency structure of a CSRS type-2, according to an exemplary embodiment of the present invention.

In detail, FIG. 31 illustrates a frequency structure of the CSRS type-2 that occupies one OFDM symbol. As illustrated in FIG. 31, the CSRS type-2 includes a cell-specific reference signal (CRS).

The CRS region (region to which the CRS is mapped) has the CRS structure (for example, using two antenna ports (for example, Nos. 0 and 1)) mapped to the existing LTE OFDM symbol No. 0 and may be defined by the following Equation 38.

$$a_{k,l}^{(p)} = r_{l,n_s}(m)$$
(Equation 38)

In the above Equation 38, a is a complex symbol and represents a signal input to an inverse fast Fourier transform (IFFT) block. Further, in the above Equation 38, p represents the antenna port number and corresponds to the index k of the frequency base and the index l of the OFDM symbol. $r_{l,n_s}(m)$ may be defined like the following Equation 39.

$r_{l,n_s}(m)$ $$r_{l,n_s}(m) = \frac{1}{\sqrt{2}}(1 - 2 \cdot c(2m)) + j\frac{1}{\sqrt{2}}(1 - 2 \cdot c(2m+1)),$$
(Equation 39)

$$m = 0, 1, \ldots, 2N_{RB}^{max,DL} - 1$$

In the above Equation 39, I represents the OFDM symbol number of the licensed band, $n_s$ represents the slot number of the licensed band, and $N_{RB}^{max,DL}$ represents the entire bandwidth of the downlink. Further, in the above Equation 39, c(i) may be defined like the following Equation 40.

$$c(n)=(x_1(n+N_C)+x_2(n+N_C)) \bmod 2$$

$$x_1(n+31)=(x_1(n+3)+(n)) \bmod 2$$

$$x_2(n+31)=(x_2(n+3)+x_2(n+2)+x_2(n+1)+x_2(n)) \bmod 2 \quad \text{(Equation 40)}$$

In the above Equation 40, $N_c=1600$ and a first m-sequence $x_1(.)$ is initialized to be $x_1(0)=1$ and $x_1(n)=0$ (n=1,2,...,30).

A second m-sequence $x_2(.)$ is initialized to be $c_{init}=\Sigma_{i=0}^{30}x_2(i)\cdot 2^i$.

Here, an initial seed $C_{init}$ is defined like $c_{init}=2^{10}\cdot(7\cdot(n_s+1)+l+1)\cdot(2\cdot N_{ID}^{cell}+1)+2\cdot N_{ID}^{cell}+1$ and $N_{ID}^{cell}$ represents one of 504 PCIs.

In the above Equation 39, k associated with the frequency domain mapping may be like the following Equation 41.

$$k=6m+(v+v_{shift}+z) \bmod 6$$

$$l=6$$

$$m=0,1,\ldots 2\cdot N_{RB}^{DL}-1$$

$$m'=m+N_{RB}^{max,DL}-N_{RB}^{DL}$$

$$z=0,\alpha \quad \text{(Equation 41)}$$

In the above Equation 41, v may be defined like $$v = \begin{cases} 0 & \text{if } p = 0 \\ 3 & \text{if } p = 1 \end{cases}.$$

In the above Equation 41, α may be defined like $$\alpha = \begin{cases} 1 & \text{if } (N_{ID}^{cell} \bmod 6) \neq 2 \text{ or } 5 \\ -1 & \text{if } (N_{ID}^{cell} \bmod 6) = 2 \text{ or } 5 \end{cases}.$$

In the above Equation 41, $v_{shift}$ may be defined like $v_{shift}=N_{ID}^{cell} \bmod 6$.

Meanwhile, for one burst, one OFDM symbol for the CSRS may be transmitted or the CSRS may be transmitted twice or more.

According to the exemplary embodiment of the present invention, the terminal may use the initial signal to match an automatic gain control (AGC) and the time synchronization even in the unlicensed band (having features of the discontinuous downlink frame) and finely maintain the orthogonal frequency division multiplexing (OFDM) symbol time and the frame synchronization between the unlicensed band and the licensed band every burst.

Further, according to the exemplary embodiment of the present invention, the terminal may rapidly efficiently determine whether the downlink burst signal is a signal corresponding thereto.

Further, according to the exemplary embodiment of the present invention, the device may secure the additional channel estimate for the signal discontinuously transmitted.

Further, according to the exemplary embodiment of the present invention, the terminal may know the partial subframe form and disposition of the burst frame input to the corresponding terminal based on the timing when the initial signal is sensed.

Further, according to the exemplary embodiment of the present invention, the device may transmit the additional information on the burst signal.

Further, according to the exemplary embodiment of the present invention, the initial signal may be a core element technology of the LTE-license assisted access (LTE-LAA) that is a standardization technology for the LTE operation in the unlicensed band.

4. Method and Apparatus for Transmitting Adaptive Partial Subframe in Wireless Communication Cellular System of Unlicensed Frequency Band A method according to an exemplary embodiment of the present invention belongs to a physical layer of an LTE wireless mobile communication system. In detail, the method according to the exemplary embodiment of the present invention may relate to a method for transmitting a partial subframe for operating an LTE system uplink and downlink signal in an unlicensed band in which a signal is discontinuously transmitted. Further, a method according to the exemplary embodiment of the present invention may relate to a frame structure for a partial subframe and a technology of identifying the frame structure.

Figure 32:
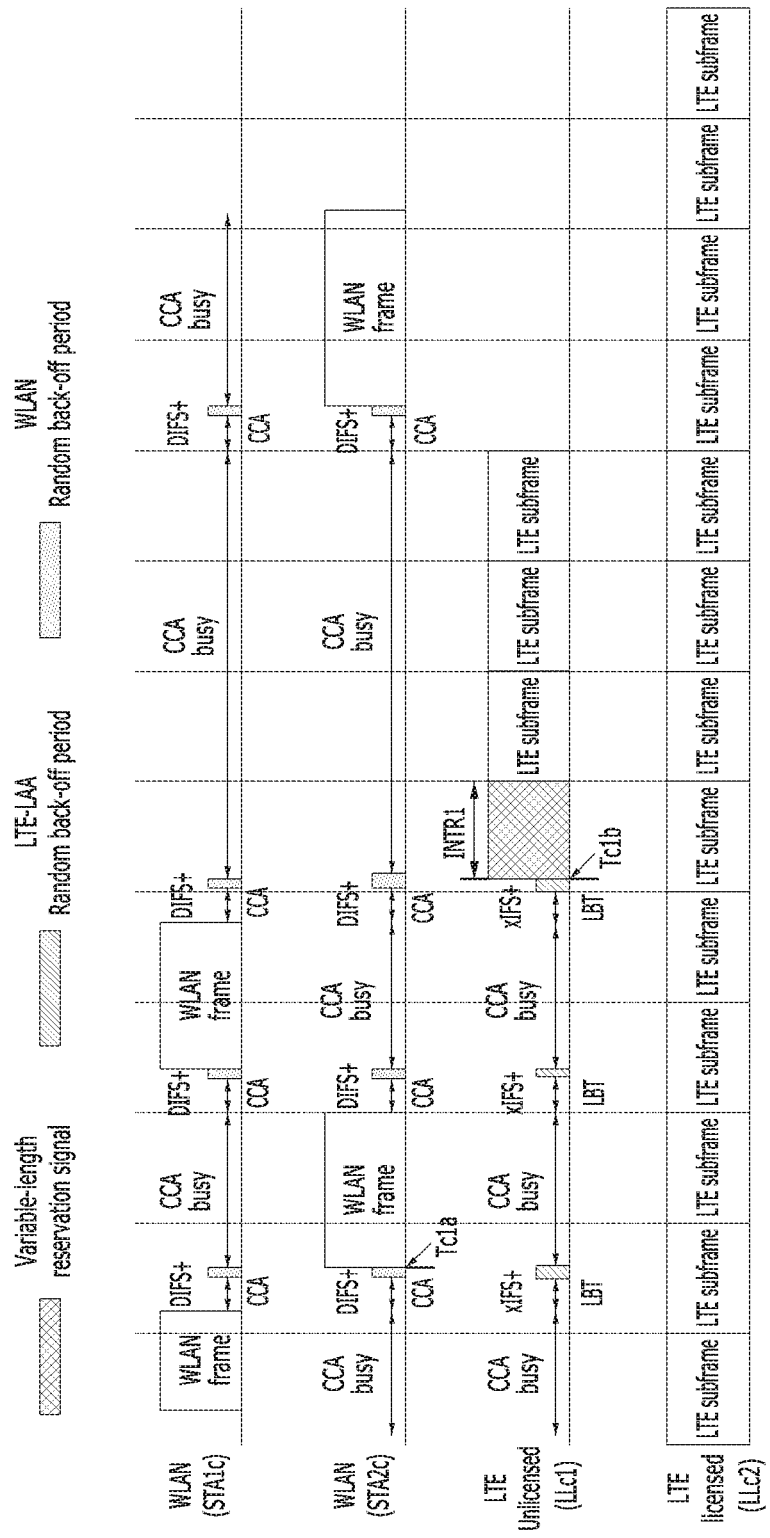
FIG. 32 is a diagram illustrating a frame form in which the reservation signal is transmitted just before a data subframe.

FIG. 32 is a diagram illustrating a frame form in which the reservation signal is transmitted just before a data subframe. In detail, FIG. 32 illustrates the case in which to align the LTE signal of the unlicensed band at a boundary between the LTE signal of the licensed band and the subframe, the reservation signal is transmitted just before the data subframe.

FIG. 32 illustrates WLAN devices STA1c and STA2c and an LTE base station LLc1 that are operated in the unlicensed band and an LTE base station LLc2 operated in the licensed band. The LTE base station LLc1 may be the LTE license assisted access (LAA) device. Meanwhile, the LTE base station LLc1 may also be operated in both of the unlicensed band the licensed band and in this case, may simultaneously transmits the signal of the unlicensed band and the signal of the licensed band. That is, the LTE base station LLc1 and the LTE base station LLc2 may be included in one base station. The WLAN devices STA1c and STA2c may be a WiFi device.

The LTE frame of the unlicensed band needs to be time-synchronized with an LTE frame operated in the licensed band. The device needs to solve it, along with the occupation of the channel. Here, the matching with the time synchronization means that as illustrated in FIG. 32, the unlicensed band signal of the corresponding device needs to be aligned at the subframe boundary of the licensed band while the device coexists with the devices (for example, STA1c and STA2c) operated in the unlicensed band.

As illustrated in FIG. 32, the LTE base station LLc1 of the unlicensed band has a precondition for supporting the carrier aggregation (CA) function. That is, to transmit the signal of the unlicensed band, the LTE base station LLc1 needs to synchronize the temporal subframe boundary with the LTE subframe of the licensed band. Therefore, the probability that the timing when the signal transmission is generated after the carrier sensing (for example, performing the CCA) is generated at the subframe boundary is extremely rare. That is, the transmission after the CCA is mainly performed at the point other than the subframe boundary. In this case, as illustrated in FIG. 32, the LTE base station LLc1 may use the preamble (or reservation signal having the variable length) to transmit any energy up to the timing when the data transmission is performed from the occupation of the channel. For example, the LTE base station LLc1 may transmit the reservation signal for a period INTR1 when it occupies the channel of the unlicensed band. By doing so, the LTE base station LLc1 may be configured so that other devices STA1c and STA2c of the unlicensed band do not occupy the corresponding channel. The method may match the subframe boundary but has the low data transmission efficiency. When the preamble (or reservation signal) is sufficiently long, the LTE base station LLc1 is enough to perform the data transmission. However, in the current standard, data may be transmitted only in a subframe unit, and therefore data may not be transmitted in a period INTR1 in which the preamble (or reservation signal) is transmitted.

In particular, since areas such as Europe and Japan have restrictions on a length that may transmit a maximum continuous signal due to propagation and communication regulations, if the signal is transmitted like the method illustrated in FIG. 32, the transmission efficiency is lower.

Hereinafter, a kind of the partial subframes and the transmission timing of the partial subframes to increase the transmission efficiency in the unlicensed band will be described. Further, a structure and a format of a frame burst including a partial subframe and a method for indicating them will be described below.

Figure 33:
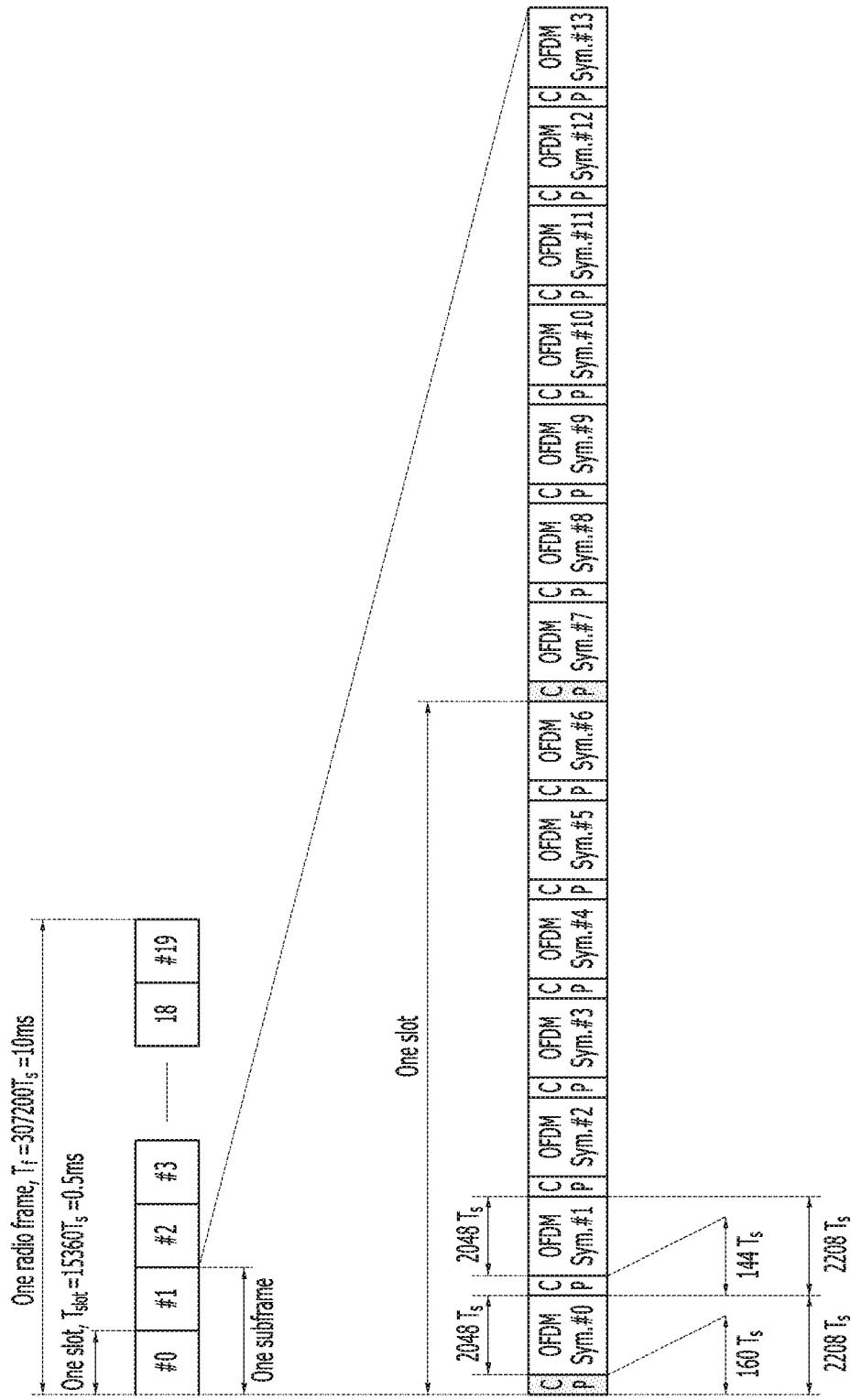
FIG. 33 is a diagram illustrating a frequency division duplexing (FDD)-based subframe structure.

FIG. 33 is a diagram illustrating a frequency division duplexing (FDD)-based subframe structure.

The method according to the exemplary embodiment of the present invention may be based on the LTE FDD scheme.

In the case of the FDD, as illustrated in FIG. 33, one radio frame includes ten subframes. One subframe occupies 1 ms and includes two slots. That is, one slot occupies 0.5 ms.

Each slot includes 7 orthogonal frequency division multiplexing (OFDM) symbols and a length of the cyclic prefix (CP) for first OFDM symbol Nos. 0 and 7 in each slot is $160*T_s$ and the CP for the rest 6 OFDM symbols Nos. 1 to 6 and 8 to 13 is $144*T_s$. As illustrated in FIG. 33, the length of each OFDM symbol is $2048*T_s$. Therefore, the transmission time of one slot is $15360*T_s$. Here, $T_s$ becomes 0.0326 μs (=1/(30.72e6)) based on a bandwidth of 20 MHz.

4.1. A Kind of Subframes and Transmission Timing of the Partial Subframe to Increase Transmission Efficiency in Unlicensed Band As described above, FIG. 32 illustrates coexistence and a method for maintaining synchronization with a licensed band when the LTE base station LLc1 operated in the unlicensed band uses the same unlicensed band (for example, frequency bandwidth of 5 GHz) as IEEE 802.11a/n/ac wireless local area network (WLAN) devices STA1 and STA2.

The CCA is a method for determining whether a radio channel is used or not by using an energy level. Similarly, the LBT performs the same function as the CCA. The success of the CCA or the LBT for the channel means that the device performing the CCA or the LBT occupies the corresponding channel. The busy status of the channel represents that the corresponding channel is occupied and the idle status of the channel represents that any device does not use the corresponding channel.

As illustrated in FIG. 32, when the WLAN device STA1c first occupies the channel of the unlicensed band in time to transmit the signal (WLAN frame), the WLAN device STA2c and the LTE base station LLc1 each determine that the corresponding unlicensed band channel is in the busy status and puts off the signal transmission.

If the signal transmission of the WLAN device STA1c ends, the WLAN device STA2c and the LTE base station LLc1 sense that the corresponding channel is in the idle status.

When the WLAN device STA2c uses the CCA check function to sense the idle status of the corresponding channel, the signal transmission is prepared, but the signal transmission needs to be performed after passing through the distributed coordinate function interframe space (DIFS) and a temporal delay period called the random back-off in the standard (for example, distributed coordinate function (DCF) that is a function of a channel access technique for WLAN).

Similarly, when the LTE base station LLc1 also performs the LBT function including a function of channel activity sensing and random delay to sense the idle status of the corresponding channel, it suffers from any random delay and then prepares the signal transmission (for example, LBT function of the European Telecommunications Standards Institute (ETSI) standard).

In this case, the WLAN device STA2c and the LTE base station LLc1 contend with each other to use the unlicensed band and the device first passing through q that is any random delay time as described above may win a contention to transmit a signal. Here, the q may be a temporal concept and may be a counter of a μs unit.

Therefore, the WLAN device STA2c and the LTE base station LLc1 each may transmit a signal only when passing through a total of any delay time q called the constant delay and random back-off. In the case of the WLAN device STA2c, as described above, the q may include the DIFS time (for example, 34 μs) and the random back-off (for example, multiple of 9 μs (including 0), that is, time of 0–N*9 μs, however, N follows IEEE 802. 11 standard). In the case of the LTE base station LLc1, the q by the LBT function may include a similar xIFS value and random back-off (for example, N*20 μs, however, N is basically random and a maximum value of N may be 24 according to the ETSI regulations) in the DIFS of the WLAN.

For example, when the LTE base station LLc1 passes through the random back-off period (DIFS+CCA check) in a first idle period of FIG. 32, the WLAN device STA2c first passes through 'DIFS+random back-off period' to start to transmit the WLAN frame at timing Tc1a.

As another example, in the second idle period of FIG. 32, the LTE base station LLc1 win a contention with the WLAN devices STA1c and STA2c to start to transmit a signal from an intermediate point Tc1b of the subframe. The LTE frame burst of the unlicensed band transmitted by the LTE base station LLc1 may include the reservation signal (VLRS: variable-length reservation signal) having the variable length, the partial subframe, and the full subframe and may satisfy the maximum transmission length limitation.

However, in the current LTE standard, since the data transmission may be made only in the subframe unit, as illustrated in FIG. 32, the preamble transmission of the excessively long time is made. The inefficient transmission structure may be sufficiently generated in the unlicensed band. Under the principle of the CA, if the actual effective data signal is included in the reservation signal, the transmission efficiency may be improved. How to use the partial subframe illustrated in FIG. 32 will be described with reference to FIG. 34.

Figure 34:
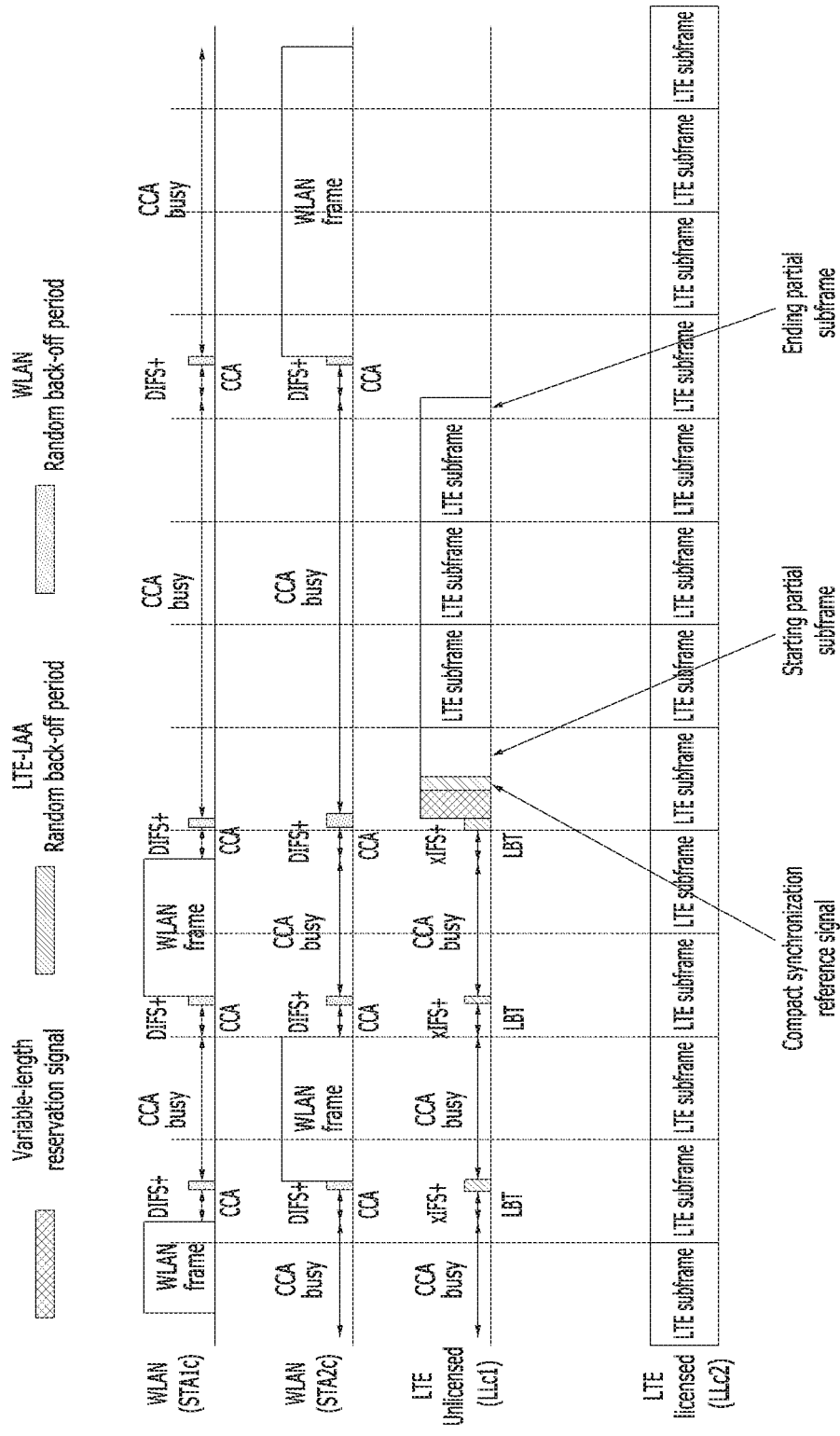
FIG. 34 is a diagram illustrating a method for increasing transmission efficiency using a partial subframe, according to an exemplary embodiment of the present invention.

FIG. 34 is a diagram illustrating a method for increasing transmission efficiency using a partial subframe, according to an exemplary embodiment of the present invention. In detail, FIG. 34 illustrates a method for improving transmission efficiency in an unlicensed band while satisfying time synchronization between an LTE signal of an unlicensed band and an LTE signal of a licensed band and maximum transmission length regulations.

As illustrated in FIG. 34, the long VLRS illustrated in FIG. 32 may be replaced by a short VLRS, a compact synchronization reference signal (CSRS), and a starting partial subframe (SPS). Further, an ending partial subframe (EPS) may be added to an end of the transmission. That is, compared to FIG. 32, it can be appreciated from FIG. 34 that the transmission efficiency corresponding to the SPS and the EPS may be improved. FIG. 34 illustrates the case in which the LTE base station LLc1 continuously transmits one SPS, three full subframe, and one EPS after the transmission of the VLRS and CSRS.

For the unlicensed band LTE, the SPS may use a slot or the downlink pilot time slot (DwPTS) defined in the existing time division duplexing (TDD) LTE-based standard and the EPS may use the DwPTS.

The DwPTS period is one of the forms of the partial subframe for the downlink and has the variable length depending on the configuration. For example, the DwPTS may have a length of one of 3, 6, 9, 10, 11, and 12 OFDM symbols. A transmit block size (TBS) is defined to match the lengths of each DwPTS period. The partial subframes (for example, SPS and EPS) according to the exemplary embodiment of the present invention use slots having lengths corresponding to 7 OFDM symbols and the DwPTS partial subframe having a length corresponding to one of 3, 6, 9, 10, 11, and 12 OFDM symbols.

Meanwhile, there is a need to adjust the transmission timing to the unlicensed band prior to transmitting the SPS consisting of the slot or the DwPTS. Further, the CSRS transmitted between the VLRS and the SPS needs to be defined.

As illustrated in FIG. 34, the CSRS that is a synchronous signal is transmitted after the preamble (or VLRS). Further, the SPS may be transmitted just after the CSRS that is the synchronous signal is transmitted. The structure will be described in detail with reference to FIG. 35.

Figure 35:
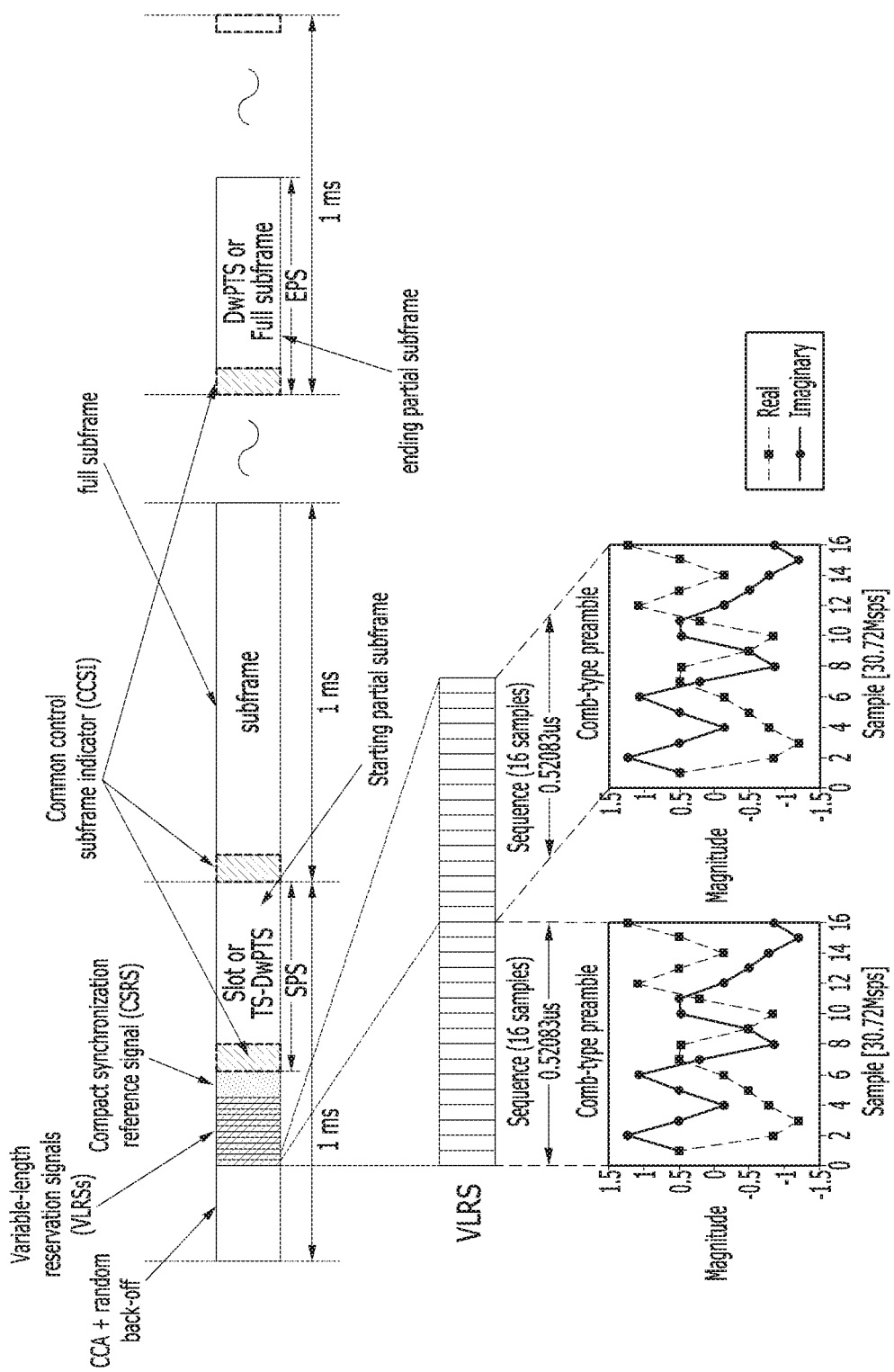
FIG. 35 is a diagram illustrating a relationship between transmission timing of a starting partial subframe and transmission timing of the reservation signal and a synchronizing signal, according to an exemplary embodiment of the present invention.

FIG. 35 is a diagram illustrating a relationship between transmission timing of a starting partial subframe and transmission timing of the reservation signal and a synchronizing signal, according to an exemplary embodiment of the present invention. In detail, FIG. 35 illustrates a relationship between the transmission timing of the SPS and the transmission timing of the VLRS and a relationship between the transmission timing of the SPS and the transmission timing of the CSRS. Here, the SPS may use a slot or a time-shifted DwPTS (hereinafter, 'TS-DwPTS').

As illustrated in FIG. 35, the SPS is transmitted after the transmission of the VLRS and the CSRS and the SPS may include a common control subframe indicator (CCSI). The full subframe transmitted after the SPS may also include the CCSI and the EPS may also include the CCSI. Instead of the EPS, the full subframe may also be transmitted.

The VLRS and the CSRS illustrated in FIG. 35 will be described and the slot or the TS-DwPTS including data will be described.

4.1.1. VLRS

The region of the sequence v(n) for the preamble (or VLRS) having the variable length may include the minimum signal unit transmission period having a length of about 0.521 µs. When the digital sampling rate of the LTE is 30.72 MHz, time $T_s$ taken to transmit one sample is 0.326 µs (=1/(30.72e6)). Therefore, when the digital sampling rate is 30.72 MHz, the transmission time of the sequence having a length of 16 (16 samples) is 16/(30.72e6)=0.521 µs. For reference, the transmission time of the LTE OFDM symbol is 2048/(30.72e6)=66.67 µs. The transmission time (or length) of the CP is 144/(30.72e6)=4.69 µs or 160/(30.72e6)=5.2083 µs. Further, a length (or transmission time) of one LTE t subframe is 30720/(30.72e6)=1 ms. That is, if the sequence that is the basic unit of the preamble (or VLRS) is continuously transmitted in 1920 numbers, the sequence becomes 1 ms (one LTE subframe may be divided into 1920 periods). Hereinafter, the sequence for the VLRS is called a VLRS sequence.

The VLRS sequence v(n) of the time domain having the length of 16 may be generated by the following Equation 42.

$$v(n) = p \cdot \sum_{k=-8}^{7} \exp(-j \cdot 2\pi \cdot \Delta f \cdot k \cdot n) \cdot z(k), \quad \text{(Equatuion 42)}$$

$$n = 0, 1, 2 \ldots 15$$

In the above Equation 42, p is a constant for normalizing a signal and is $$\Delta f = \frac{f_s}{N} = (30.72 \text{ MHz})/16$$

(however, $f_s$ represents the sampling rate and N represent the number of elements of v(n)). In the above Equation 42, the VLRS sequence v(n) includes 16 elements.

The VLRS sequence z(k) and the index k of the frequency domain may be defined like the following Equation 43.

$$z(k)=[0\ 0\ 0\ 0\ a_{-4}\ a_{-3}\ a_{-2}\ a_{-1}\ 0\ a_1\ a_2\ a_3, a_4\ 0\ 0\ 0],$$

$$k=\{-8\ -7\ -6\ -5\ -4\ -3\ -2\ -1\ 0\ 1\ 2\ 3\ 4\ 5\ 6\ 7\} \quad \text{(Equation 43)}$$

In the above Equation 43, the index k may have a value (for example, −8~7) of −N/2 to N/2−1.

In the above Equation 43, $a_{-4}$ to $a_4$ are a complex number and may be defined like the following Equation 44 by a binary bit.

$$b_k=0, a_k=1+j$$

$$b_k=1, a_k=-1-j \quad \text{(Equation 44)}$$

In the above Equation 44, binary bits $b_{-4}$ to $b_4$ may be determined by $N_{ID}^{(1)}$ that is a portion of the physical cell ID of the base station defined in the LTE standard and may be mapped to the following Equation 45.

$$B(N_{ID}^{(1)})=b_{-4}b_{-3}b_{-2}b_{-1}b_1b_2b_3b_4 \quad \text{(Equation 45)}$$

Here, B(.) is a binary operator function that performs a conversion into a binary number. For example, if it is assumed that $N_{ID}^{(1)}=97$, $b_{-4}b_{-3}b_{-2}b_{-1}b_1b_2b_3b_4$ that is the binary number is determined as 01100001. Therefore, z(k) becomes [0 0 0 0 1+j −1−j −1−j 1+j0 1+j 1+j 1+j −1−j 0 0 0].

When p is 4, if the z(k) is converted into the time domain depending on the above Equation 42, the next VLRS subsequence v(n) having the length of 16 may be generated.

$$v(n) = [0.5 + j0.5\ \ 0.1464 + j0.7774\ \ -0.5 + j1.2071\ -$$
$$0.4709 + j0.8536\ \ 0.5 - j0.5\ \ 0.8536 - j1.2362\ -$$

-continued 0.2071 − j0.5  −1.0703 + j0.1464  −0.5 − j0.5  0.1464 − j1.0703  −0.5 − j0.2071  −1.2362 + j0.8536  −0.5 + j0.5  0.8536 − j0.4709  1.2071 − 0.5  0.7774 + j0.1464]

The preamble (or VLRS) having the variable length has granularity of about 0.5 μs, and therefore the high degree of freedom may be obtained, and the device occupies the coexistence channel at any timing within the subframe under any circumferences and may match the OFDM symbol time synchronization with the licensed band.

Figure 36:
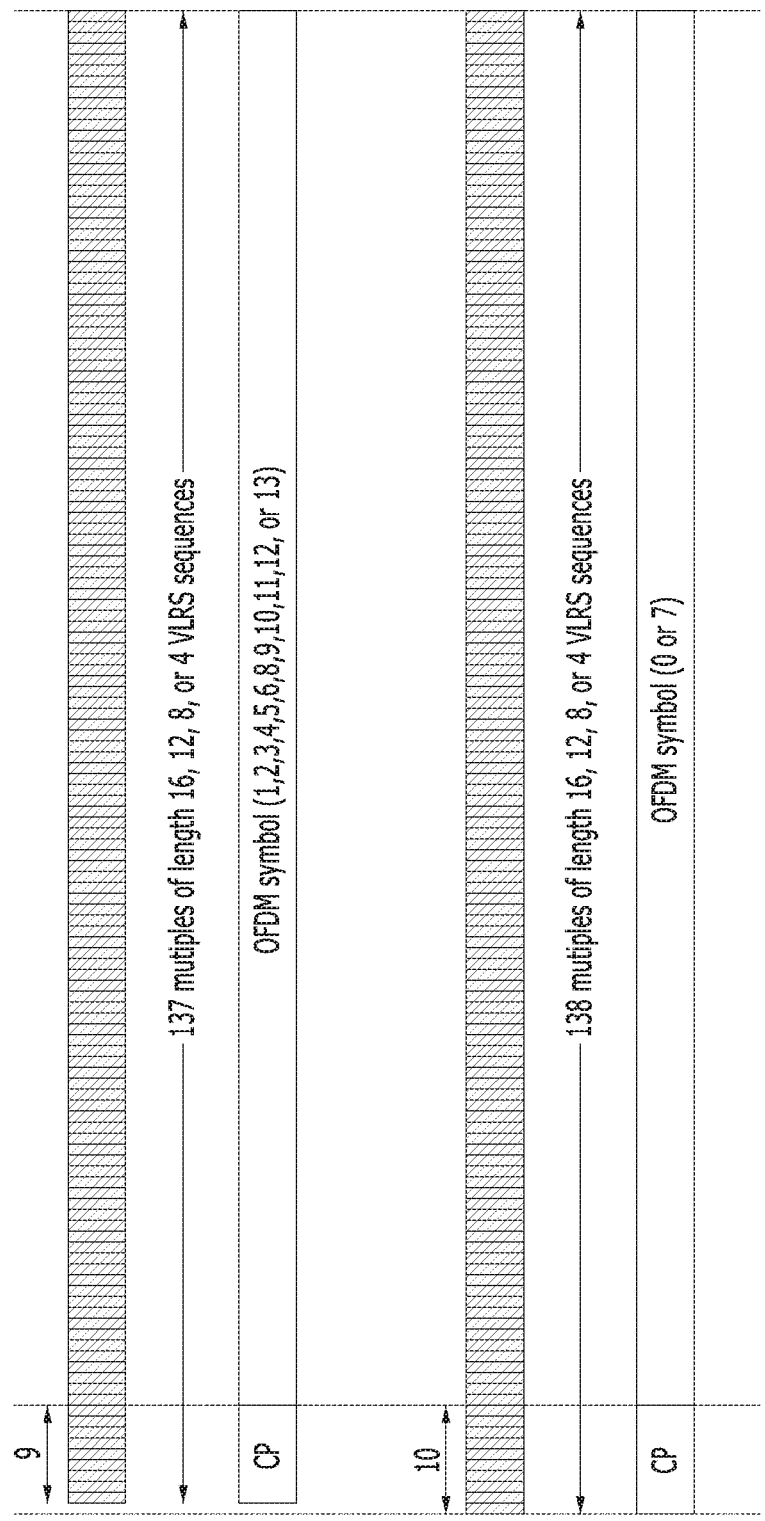
FIG. 36 is a diagram illustrating a transmission time of one 'CP+OFDM symbol' including a plurality of VLRSs, according to an exemplary embodiment of the present invention.

FIG. 36 is a diagram illustrating a transmission time of one 'CP+OFDM symbol' including a plurality of VLRSs, according to an exemplary embodiment of the present invention.

As illustrated in FIG. 36, when the digital sampling rate of the LTE is 30.72 MHz, time taken to continuously transmit a plurality of VLRS sequences (having the length of 16) accurately matches with time taken to transmit one 'CP+OFDM symbol'. One VLRS sequence v(n) may have a length of 16, 12, 8, or 4 (the number of samples).

In detail, time taken to continuously transmit 128 VLRS sequences v(n) accurately coincides with the transmission time of one OFDM symbol. Further, the length (or transmission time) of the CP for the OFDM symbol No. 0 or 7 of the subframe, respectively, is the same as the time taken to continuously transmit ten VLRS sequences. The length (or transmission time) of the CP for the OFDM symbol Nos. 1 to 6 or 8 to 13 of the subframe, respectively, is the same as the time taken to continuously transmit nine VLRS sequences.

Meanwhile, when the digital sampling rate of the LTE is 15.36 MHz, the time $T_s$ taken to transmit one sample is 1/(15.36e6)=0.651 μs. Therefore, when the digital sampling rate is 15.36 MHz, the transmission time of the VLRS sequence having a length of 8 is 8/(15.36e6)=0.521 μs.

The VLRS sequence v(n) of the time domain having the length of 8 may be generated by the following Equation 46.

$$v(n) = p \cdot \sum_{k=-8}^{7} \exp(-j \cdot 2\pi \cdot \Delta f \cdot k \cdot n) \cdot z(k),$$ (Equatuion 46)

$$n = 0, 2, 4 \ldots 14$$

In the above Equation 46, p is a constant for normalizing a signal and is Δf (15.36 MHz)/8.

The VLRS sequence z(k) and the index k of the frequency domain may be defined like the following Equation 47.

$$z(k)=[0\ 0\ 0\ 0\ 0\ 0\ a_{-2}\ a_{-1}\ 0\ a_1\ a_2\ 0\ 0\ 0\ 0\ 0],$$

$$k=\{-8\ -7\ -6\ -5\ -4\ -3\ -2\ -1\ 0\ 1\ 2\ 3\ 4\ 5\ 6\ 7\}$$ (Equation 47)

In the above Equation 47, $a_2$ to $a_2$ are a complex number and may be defined like the following Equation 48 by a binary bit.

$$b_k=0, a_k=1+j$$

$$b_k=1, a_k=-1-j$$ (Equation 48)

In the above Equation 44, binary bits $b_{-2}$ to $b_2$ may be determined by even bits of $N_{ID}^{(1)}$ that is a portion of the physical cell ID of the base station defined in the LTE standard and may be mapped to the following Equation 49.

$$B_{EVEN}(N_{ID}^{(1)})=b_{-2}b_{-1}b_1b_2$$ (Equation 49)

In the above Equation 49, $B_{EVEN}(.)$ converts an input value into a binary number and is a function of extracting even bits among the converted bits. Further, a maximum size of $N_{ID}^{(1)}$ is 255. For example, if it is assumed that $N_{ID}^{(1)}=97$, $b_{-2}b_{-1}b_1b_2$ that is a collection of even bits is determined as 0100. Therefore, z(k) becomes [0 0 0 0 0 0 1+j −1−j 0 1+j 1+j 0 0 0 0 0].

When p is 4, if the z(k) is converted into the time domain depending on the above Equation 46, the next VLRS subsequence v(n) having the length of 8 may be generated.

v(n) = [0.5 + j0.5  −0.3536 + j0.3536  1 + j0.0  −0.3536 + j0.3536  0.5 + j0.5  0.3536 − j0.3536  0.0 − j1.0  0.3536 − j0.3536]

4.1.2. CSRS

Figure 37:
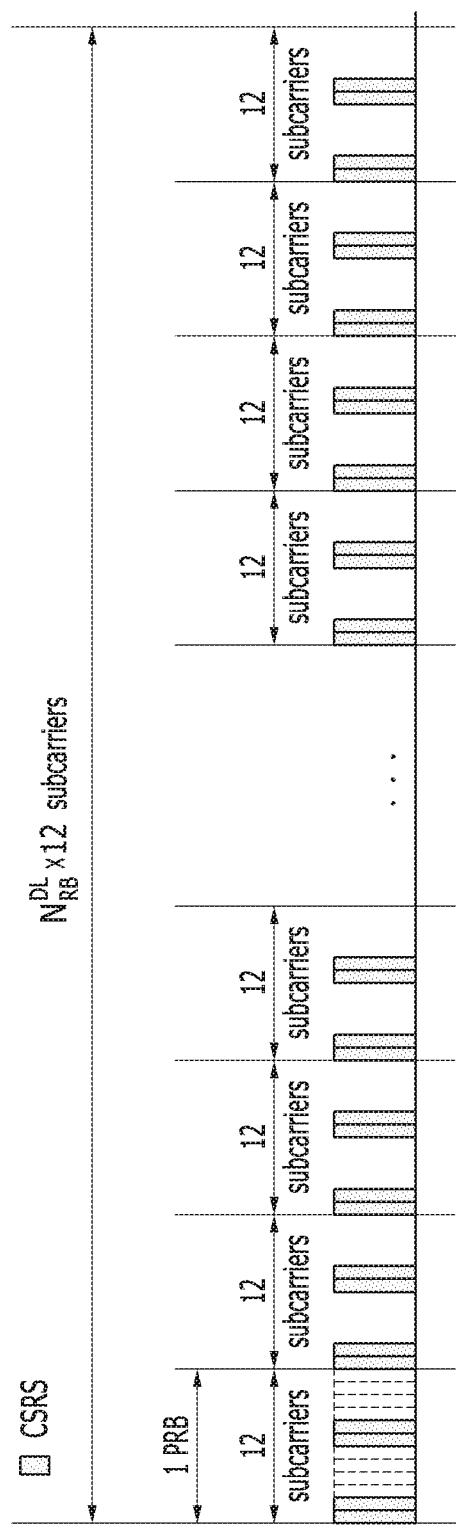
FIG. 37 is a diagram illustrating a frequency domain structure of the CSRS, according to an exemplary embodiment of the present invention.

FIG. 37 is a diagram illustrating a frequency domain structure of the CSRS, according to an exemplary embodiment of the present invention. In detail, FIG. 37 illustrates the frequency structure of the CSRS (having a time length corresponding to one OFDM symbol) occupying one OFDM symbols. In FIG. 37, $N_{RB}^{DL}$ represents the number of physical resource blocks (PRBs) corresponding to the entire downlink bandwidth of the system and one PRB includes 12 subcarriers.

The frequency domain to which the CSRS is mapped may have the CSRS structure (using antenna port No. 0) mapped to OFDM symbol No. 0 of the existing LTE subframe and may be generated by the following Equation 50.

$$a_{k,l}^{(p)}=r_{l,n_s}(m)$$ (Equation 50)

In the above Equation 50, a is a complex symbol and represents a signal input an inverse fast Fourier transform (IFFT) block. In the above Equation 50, p represents the antenna port number and corresponds to the index k of the frequency base and the index I of the OFDM symbol. $r_{l,n_s}(m)$ may be defined like the following Equation 51. $r_{l,n_s}(m)$ $$r_{l,n_s}(m) = \frac{1}{\sqrt{2}}(1 - 2 \cdot c(2m)) + j\frac{1}{\sqrt{2}}(1 - 2 \cdot c(2m+1)),$$ (Equation 51)

$$m = 0, 1, \ldots, 2N_{RB}^{max,DL} - 1$$

$$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1$$

In the above Equation 51, I represents the OFDM symbol number of the licensed band and $n_s$ represents the slot number of the licensed band. $N_{RB}^{max,DL}$ represents the largest PRB number corresponding to the entire downlink bandwidth. $N_{RB}^{max,DL}$ c(i) may be defined like the following Equation 52.

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$ (Equation 52)

In the above Equation 52, $N_c=1600$ and a first m-sequence $x_1(.)$ is initialized to be $x_1(0)=1$ and $x_1(n)=0$ (n=1,2,...,30). A second m-sequence $x_2(.)$ is initialized to be $c_{init}=\sum_{i=0}^{30} x_2(i) \cdot 2^i$.

Here, an initial seed $c_{init}$ is defined like $c_{init}=2^{10}\cdot(7\cdot(n_s+1)+l+1)\cdot(2\cdot N_{ID}^{cell}+1)+2\cdot N_{ID}^{cell}+1$ and $N_{ID}^{cell}$ represents physical cell identity (PCI) of the base station and represents one of 504 PCIs.

In the above Equation 50, the index k associated with the frequency domain mapping may be like the following Equation 53.

$$k=6m+(v+v_{shift}+z)\bmod 6$$

$$l=6$$

$$m=0,1,\ldots,2\cdot N_{RB}^{DL}-1$$

$$m'=m+N_{RB}^{max,DL}-N_{RB}^{DL}$$

$$z=0,\alpha \qquad \text{(Equation 53)}$$

In the above Equation 53, v may be defined like v=0.
In the above Equation 53, a may be defined like $$\alpha = \begin{cases} 1 & \text{if } (N_{ID}^{cell}\bmod 6) \neq 2 \text{ or } 5 \\ -1 & \text{if } (N_{ID}^{cell}\bmod 6) = 2 \text{ or } 5 \end{cases}.$$

In the above Equation 53, $v_{shift}$ may be defined like $v_{shift}=N_{ID}^{cell} \bmod 6$.

Figure 38:
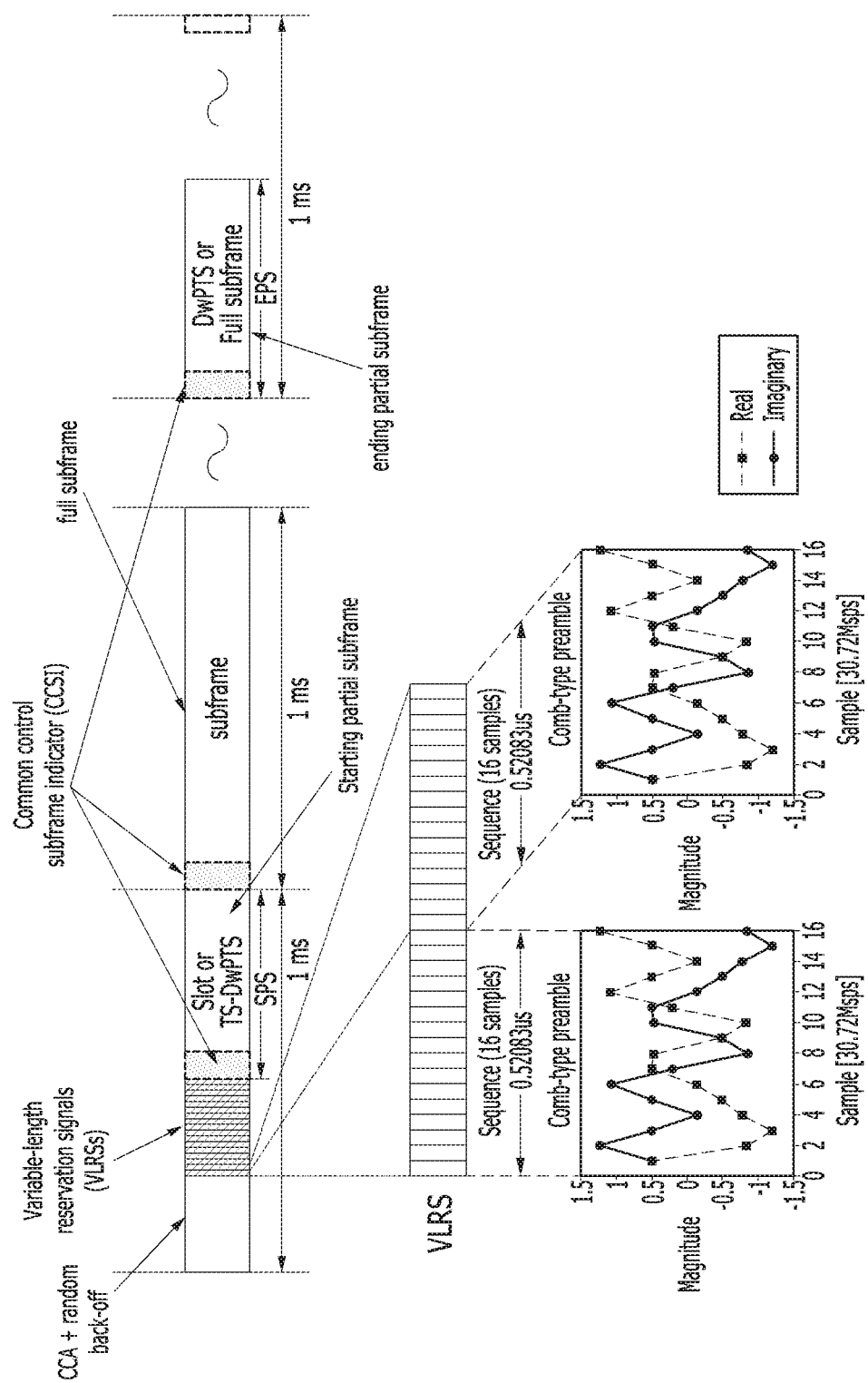
FIG. 38 is a diagram illustrating a case in which the CSRS transmission is canceled based on the determination of the base station, according to an exemplary embodiment of the present invention.

FIG. 38 is a diagram illustrating a case in which the CSRS transmission is canceled based on the determination of the base station, according to an exemplary embodiment of the present invention.

As illustrated in FIG. 38, the transmission of the CSRS may also be canceled by the determination of the LTE base station LLc1. In detail, the SPS may be transmitted without the CSRS after the transmission of the VLRS.

4.1.3. SPS, Full Subframe (FS), and EPS

As described above, the SPS may consist of the slot or the TS-DwPTS. The SPS may be transmitted after the transmission of the VLRS and the CSRS in time.

As illustrated in FIG. 35 or 38, the EPS corresponds to an end of the continuous transmission and may be transmitted in the DwPTS.

Hereinafter, the partial subframe defined by using the slot or the DwPTS will be described and the entire frame burst format that may be configured to correspond to a case that may be generated in the unlicensed band will be described.

The TS-DwPTS and the DwPTS may be defined as the following Table 5.

TABLE 5

Definition and length of DwPTS and TS-DwPTS

| Partial subframe length | DwPTS | TS-DwPTS |
|---|---|---|
| 3 OFDM symbols | 6592*$T_s$ | 6576*$T_s$ |
| 6 OFDM symbols | 13168*$T_s$ | 13152*$T_s$ |
| 9 OFDM symbols | 19760*$T_s$ | 19744*$T_s$ |
| 10 OFDM symbols | 21952*$T_s$ | 21936*$T_s$ |
| 11 OFDM symbols | 24144*$T_s$ | 24128*$T_s$ |
| 12 OFDM symbols | 26336*$T_s$ | 26320*$T_s$ |

However, as the result of the LBT, the SPS is not configured and the full subframe may also be transmitted without the SPS.

As the LBT result, when the transmission timing of the VLRS is determined as the time corresponding to one point of 14 OFDM symbols, the case in which the SPS is configured and thus is transmitted after 'VLRS+CSRS' and the case in which the full subframe is directly configured without the SPS and thus is transmitted after 'VLRS+CSRS' will be described with reference to FIGS. 39 to 42.

Figure 39:
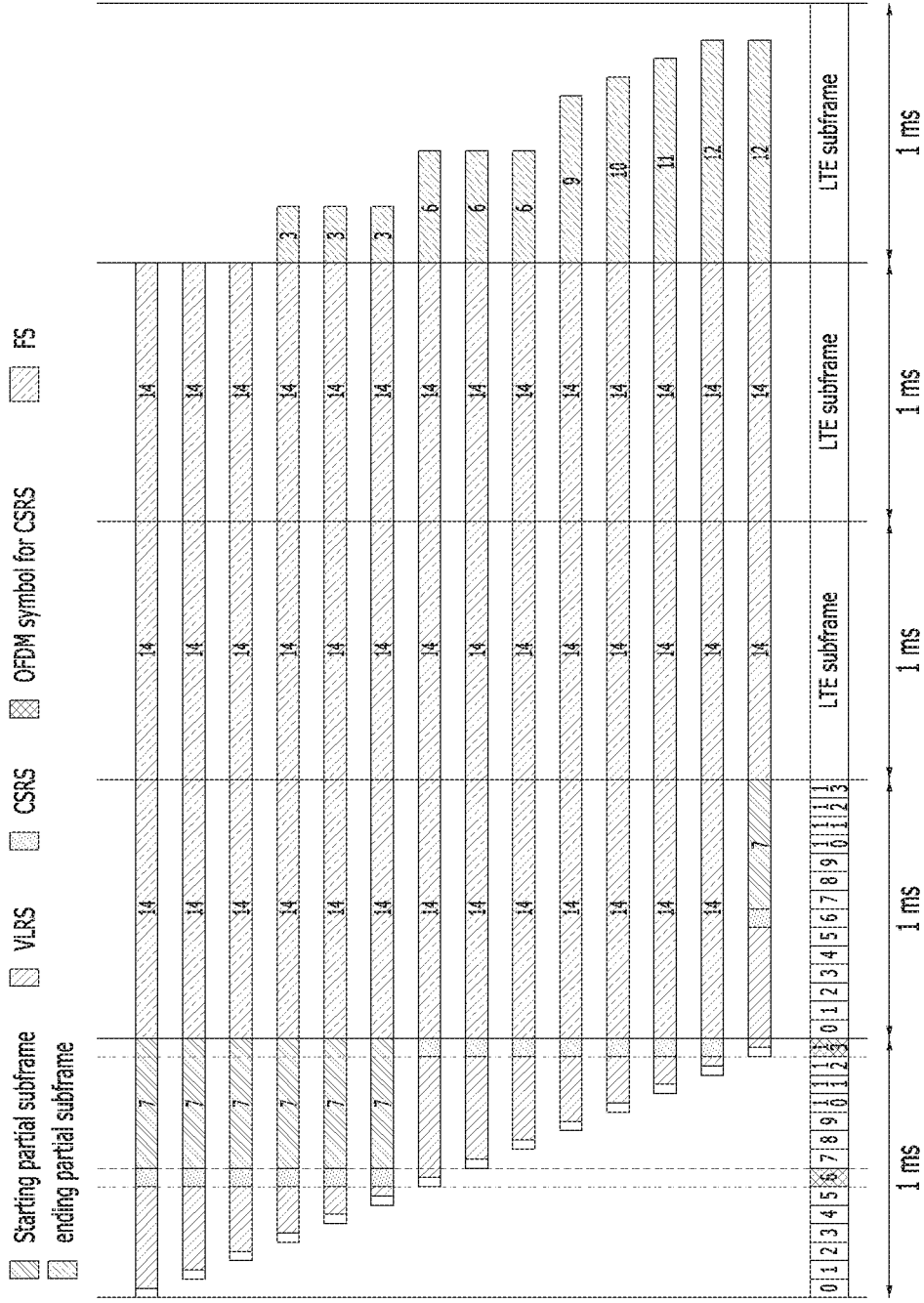
FIGS. 39, 40, 41, and 42 are diagrams illustrating a configuration of a starting partial subframe and an ending partial subframe based on the transmission timing of the VLRS when the maximum transmission length is 4 ms, according to an exemplary embodiment of the present invention.

FIG. 39 is a diagram illustrating a configuration of a starting partial subframe and an ending partial subframe based on the transmission timing of the VLRS when the maximum transmission length is 4 ms, according to an exemplary embodiment of the present invention.

In detail, FIG. 39 illustrates the case in which the SPS consists of a slot. That is, FIG. 39 illustrates the case in which the SPS has a length of 7 OFDM symbols.

FIG. 39 illustrates the case in which the transmission timing of the CSRS is limited to OFDM symbol Nos. 6 and 13.

As illustrated in FIG. 39 the timing at which the transmission may be immediately made after the LBT is one of 14 OFDM symbol number transmission timings of the subframe. Therefore, the actual signal transmission timing of the LTE base station LLc1 may be variably adjusted using the VLRS so that the CSRS is transmitted only in the specific OFDM symbol positions Nos. 6 and 13. Here, the transmission of the VLRS does not start at the boundary of the OFDM symbol and as illustrated in FIG. 39, after the LBT operation ends, the transmission of the VLRS may immediately start at timing when it is determined that the signal transmission may be made. That is, the LTE base station LLc1 does not wait the starting point of the OFDM symbol and may immediately transmit the VLRS at the timing when the signal may be transmitted. The VLRS may have a length of one OFDM symbol or more or may also have a length of a fractional OFDM symbol (for example, length smaller than that of one OFDM symbol).

FIG. 39 illustrates the case in which the EPS has a length of 3, 6, 9, 10, 11, or 12 OFDM symbols.

As illustrated in FIG. 39, the SPS or the EPS may be configured and may not be configured depending on the transmission timing of the VLRS.

Figure 40:
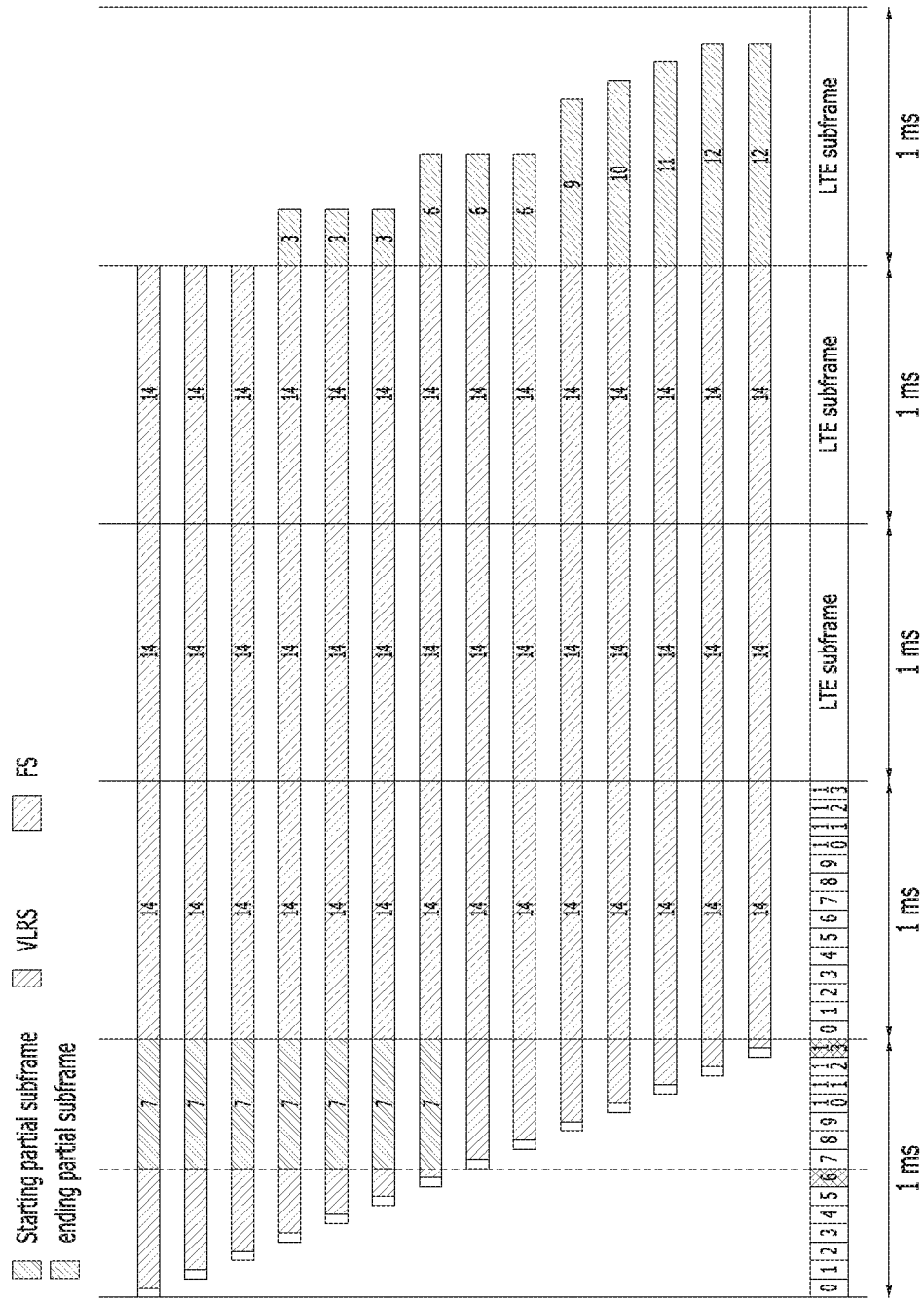

FIG. 40 is a diagram illustrating a configuration of a starting partial subframe and an ending partial subframe based on the transmission timing of the VLRS when the maximum transmission length is 4 ms, according to another exemplary embodiment of the present invention. In detail, FIG. 40 illustrates the case in which the SPS consists of a slot and the CSRS is ruled out.

The exemplary embodiment of FIG. 40 is different from the exemplary embodiment of FIG. 39 in that the CSRS transmission is canceled.

Figure 41:
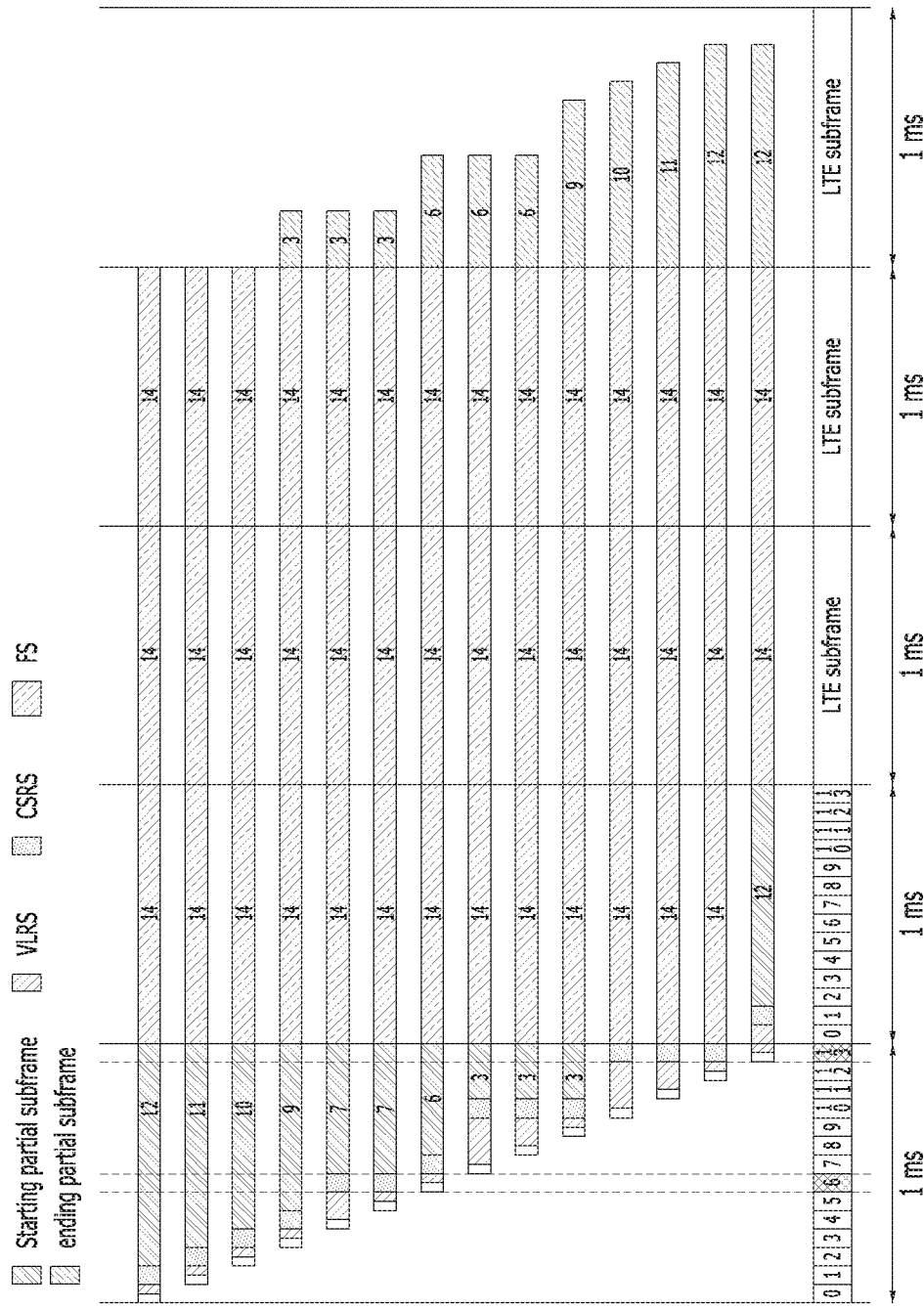

FIG. 41 is a diagram illustrating a configuration of a starting partial subframe and an ending partial subframe based on the transmission timing of the VLRS when the maximum transmission length is 4 ms, according to another exemplary embodiment of the present invention. In detail, FIG. 41 illustrates the case in which the SPS is configured based on the TS-DwPTS.

FIG. 41 illustrates the case in which the SPS has a length of 12, 11, 10, 9, 7, 6, or 3 OFDM symbols.

FIG. 41 illustrates the case in which the transmission timing of the CSRS is OFDM symbol Nos. 1 to 4, 6, 7, 10, or 13.

As illustrated in FIG. 41, the transmission of the VLRS does not start at the boundary of the OFDM symbol and after the LBT operation ends, the transmission of the VLRS may immediately start at timing when it is determined that the signal transmission may be made.

FIG. 41 illustrates the case in which the EPS has a length of 3, 6, 9, 10, 11, or 12 OFDM symbols.

As illustrated in FIG. 41, the SPS or the EPS may be configured and may not be configured depending on the transmission timing of the VLRS.

Figure 42:
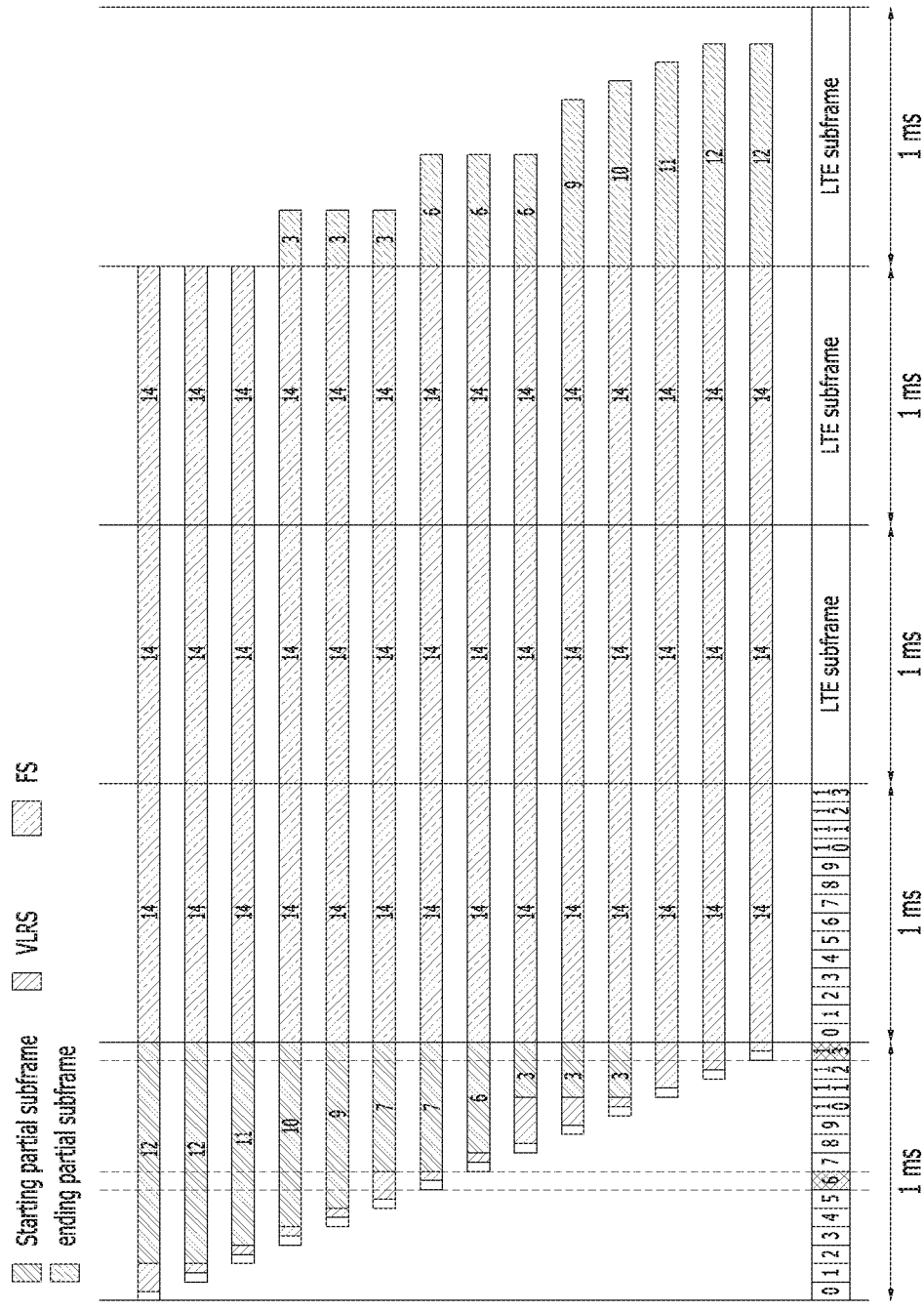

FIG. 42 is a diagram illustrating a configuration of a starting partial subframe and an ending partial subframe based on the transmission timing of the VLRS when the maximum transmission length is 4 ms, according to another exemplary embodiment of the present invention. In detail, FIG. 42 illustrates the case in which the SPS is configured based on the TS-DwPTS and the CSRS is ruled out.

The exemplary embodiment of FIG. 42 is different from the exemplary embodiment of FIG. 41 in that the CSRS transmission is canceled.

The kind and the number of DwPTSs that is a concept of the partial subframe (for example, SPS and EPS) according to the exemplary embodiment of the present invention are limited. Further, if the position of the partial subframe is shuffled, the frame burst format may be generated in all cases. Further, the independent scheduling for each partial subframe may be made, and therefore even though the retransmission is performed, the terminal may necessarily receive a signal as one of the frame forms of the FIGS. 39 to 42.

4.1.4. CCSI

In the LTE frame structure for the LAA, as illustrated in FIG. 39, depending on the transmission timing of the VLRS, the initial portion of the effective data transmission is limited to the partial subframe (actually corresponding to the slot) or the full subframe. Further, the frame form transmitted subsequent to the initial portion of the data transmission may again be the partial subframe or the full subframe. Further, the ending portion of the data transmission may be the partial subframe or the full subframe.

Therefore, the terminal (receiver) may recognize the information on whether the current or next subframe received is the partial subframe, the full subframe, or the special subframe based on the CCSI information included in the control channel (for example, physical downlink control channel (PDCCH)). The CCSI information may be defined like the following Tables 6 and 7 and the base station may transmit the CCSI information through the PDCCH that is the control channel.

TABLE 6

Definition and length of least signifiant bit (LSB) 4 bits included in CCSI

| CCSI signal | Current or Next subframe configuration |
| --- | --- |
| 0 | Next subframe is 3 OFDM symbols |
| 1 | Next subframe is 6 OFDM symbols |
| 2 | Next subframe is 9 OFDM symbols |
| 3 | Next subframe is 10 OFDM symbols |
| 4 | Next subframe is 11 OFDM symbols |
| 5 | Next subframe is 12 OFDM symbols |
| 6 | Next subframe is full (14 OFDM symbols) |
| 7 | Current subframe is 3 OFDM symbols |
| 8 | Current subframe is 6 OFDM symbols |
| 9 | Current subframe is 9 OFDM symbols |
| 10 | Current subframe is 10 OFDM symbols |
| 11 | Current subframe is 11 OFDM symbols |
| 12 | Current subframe is 12 OFDM symbols |
| 13 | Current subframe is full and end of transmission |
| 14 | Reserved |
| 15 | Reserved |

TABLE 7

Definition of most significant bit (MSB) 3 bits included in CCSI

| CCSI signal | Current or Next subframe configuration |
| --- | --- |
| 0 | Next subframe is a downlink subframe |
| 1 | Next subframe is a special subframe and end of downlink subframe |
| 2 | Next 1 subframe is an uplink subframe |
| 3 | Next 2 subframes are uplink subframes |
| 4 | Next 3 subframes are uplink subframes |
| 5 | Next 4 subframes are uplink subframes |
| 6 | Next 5 subframes are uplink subframes |
| 7 | Next 6 subframes are uplink subframes |

As illustrated in FIG. 35 or 38, the CCSI may be included in the control channel of the partial subframe (for example, SPS, EPS) or the full subframe and the CCSI may have a total of 7 bit information. The CCSI may represent the configuration information on the current subframe or the next subframe. In detail, the LSB 4 bits of the CCSI represents the number of OFDM symbols occupied within the current or next subframes and may be defined like the above Table 6. The MSB 3 bits of the CCSI represents whether the next subframe is the downlink subframe, the special subframe, or the uplink subframe and may be defined like the above Table 7.

Figure 43:
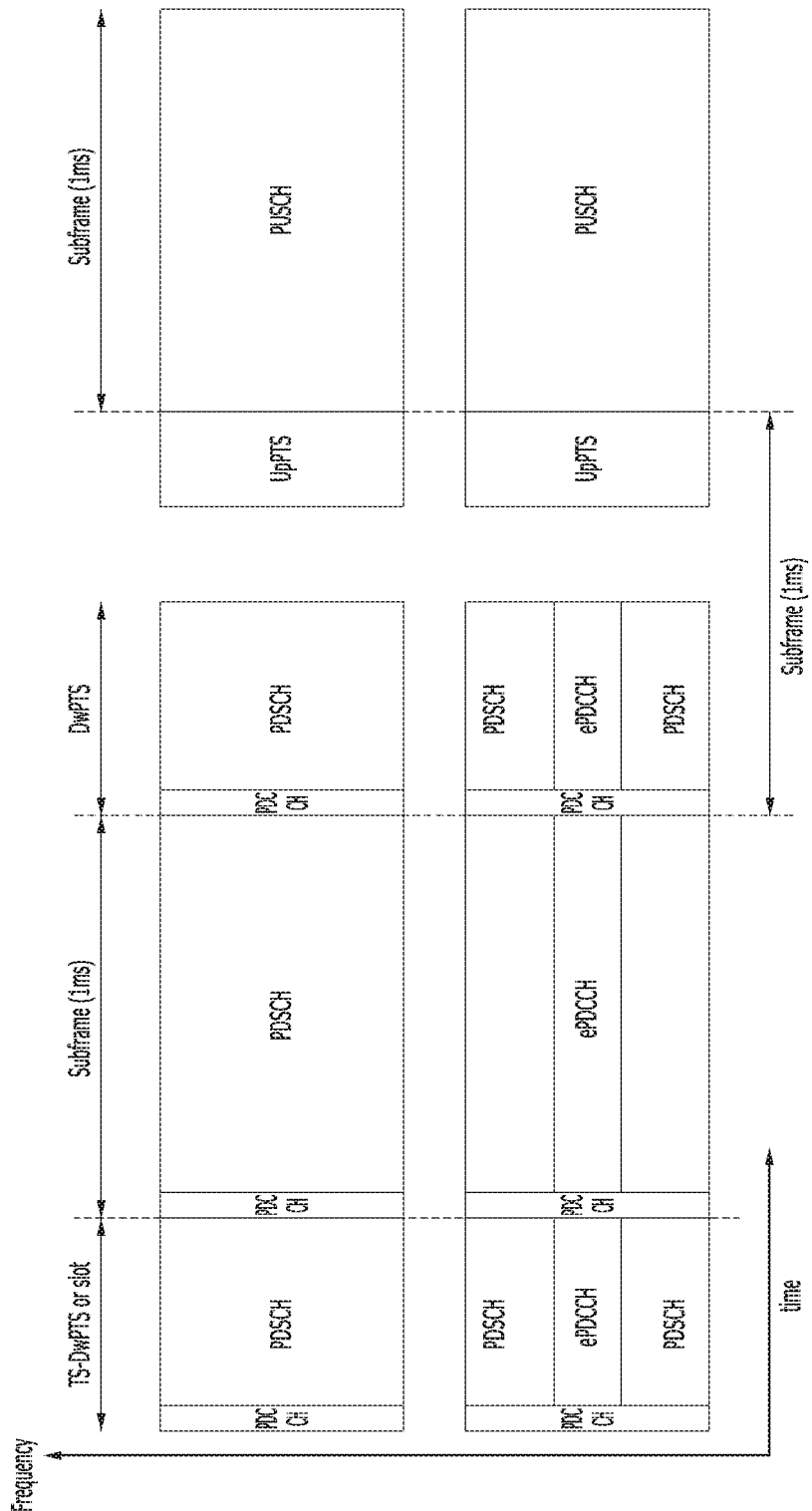
FIG. 43 is a diagram illustrating a mapping relationship of a downlink control information channel of a partial subframe and a downlink data channel to a frequency domain, according to an exemplary embodiment of the present invention.

FIG. 43 is a diagram illustrating a mapping relationship of a downlink control information channel of a partial subframe and a downlink data channel to a frequency domain, according to an exemplary embodiment of the present invention. In detail, FIG. 43 illustrates a PDCCH, an enhanced PDCCH (EPDCCH), and a physical downlink shared channel (PDSCH) for the downlink and an uplink pilot time slot (UpPTS) and a physical uplink shared channel (PUSCH) for the uplink.

As illustrated in FIG. 43, the DwPTS (or TS-DwPTS) or the slot may consist of the PDCCH (or EPDCCH) region and the PDSCH region. The PDCCH (or EPDCCH) includes the downlink control information (DCI). The PDSCH transmits data.

Since the ePDCCH may have the occupied resources smaller than the PDCCH, the ePDCCH may be allocated to the PDSCH region alone without the PDCCH. The PDCCH includes the CCSI information.

4.2. CCSI Signaling for Supporting Uplink in Unlicensed Band and Transmission Timing of Special Subframe, Full Subframe, and Partial Subframe Hereinafter, a method for using an SPS, a full subframe, a special subframe, an EPS, and a CCSI (included in the control channel) to transmit an uplink signal will be described.

Figure 44:
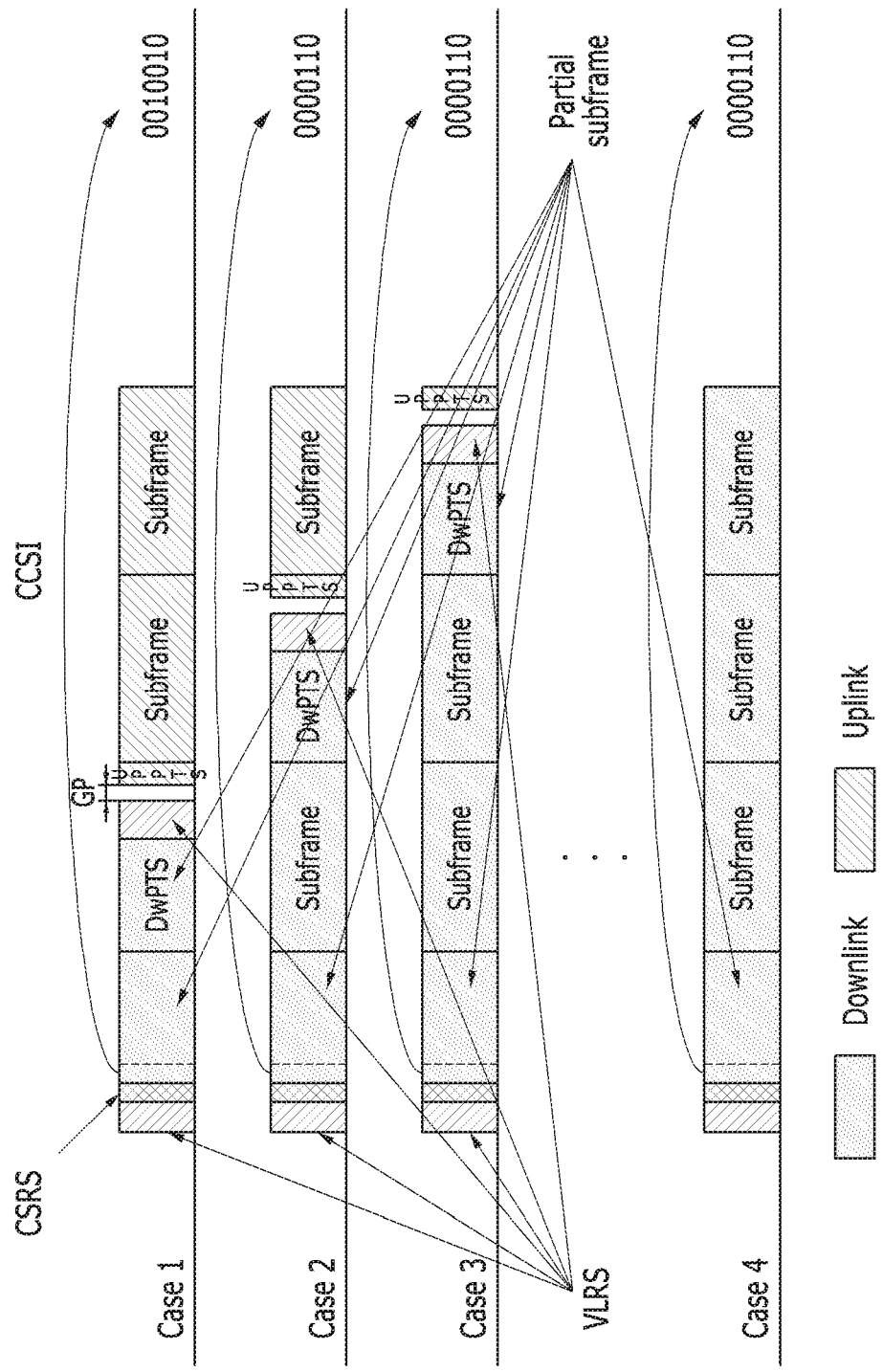
FIG. 44 is a diagram illustrating a CCSI information configuration of a first subframe (or first SPS) when a limitation of the maximum continuous transmission length is 4 ms, according to an exemplary embodiment of the present invention.

FIG. 44 is a diagram illustrating a CCSI information configuration of a first subframe (or first SPS) when a limitation of the maximum continuous transmission length is 4 ms, according to an exemplary embodiment of the present invention.

In detail, FIG. 44 illustrates the LTE-LAA TDD frame format in which the uplink and the downlink are present together. The LTE-LAA TDD frame format of FIG. 44 may be classified depending on the application of FIG. 35 or 38.

In Case 1 illustrated in FIG. 44, the LTE-LAA TDD frame format may include the VLRS, the CSRS, the downlink SPS (including the CCSI), the special subframes (DwPTS, VLRS, GP, UpPTS), and the two uplink full subframes.

In Case 2 illustrated in FIG. 44, the LTE-LAA TDD frame format may include the VLRS, the CSRS, the downlink SPS (including the CCSI), the downlink full subframe, the special subframes (DwPTS, VLRS, GP, UpPTS), and the uplink full subframe.

In Case 3 illustrated in FIG. 44, the LTE-LAA TDD frame format may include the VLRS, the CSRS, the downlink SPS (including the CCSI), the two downlink full subframe, and the special subframes (DwPTS, VLRS, GP, UpPTS).

In Case 4 illustrated in FIG. 44, the LTE-LAA TDD frame format may include the VLRS, the CSRS, the downlink SPS (including the CCSI), and three downlink full subframes.

The LTE-LAA TDD frame format of FIG. 44 may be represented by 7 bit CCSI included in the PDCCH.

As illustrated in FIG. 44, the 7 bit CCSI information included in the SPS may be determined by the configuration and the transmission timing of the continued downlink subframe (or downlink partial subframe), the special subframe, and the uplink subframe (or uplink partial subframe), or the like.

In Case 1 illustrated in FIG. 44, the CCSI information included in the SPS is 0010010. In detail, to inform that the subframe transmitted after the SPS is the special subframe, the MSB 3 bits among the CCSI (7 bits) become 001 and to inform the information that the downlink transmission portion (DwPTS) of the corresponding special subframe occupies nine OFDM symbols, the LSB 4 bits among the CCSI (7 bits) become 0010.

In Cases 2, 3, and 4 illustrated in FIG. 44, the CCSI information included in the SPS is 0000110. In detail, to inform that the subframe transmitted after the SPS is the downlink subframe, the MSB 3 bits of the CCSI become 000 and to inform the information that the subframe transmitted after the SPS is the full subframe (occupying 14 OFDM symbols), the LSB 4 bits of the CCSI become 0110.

Figure 45:
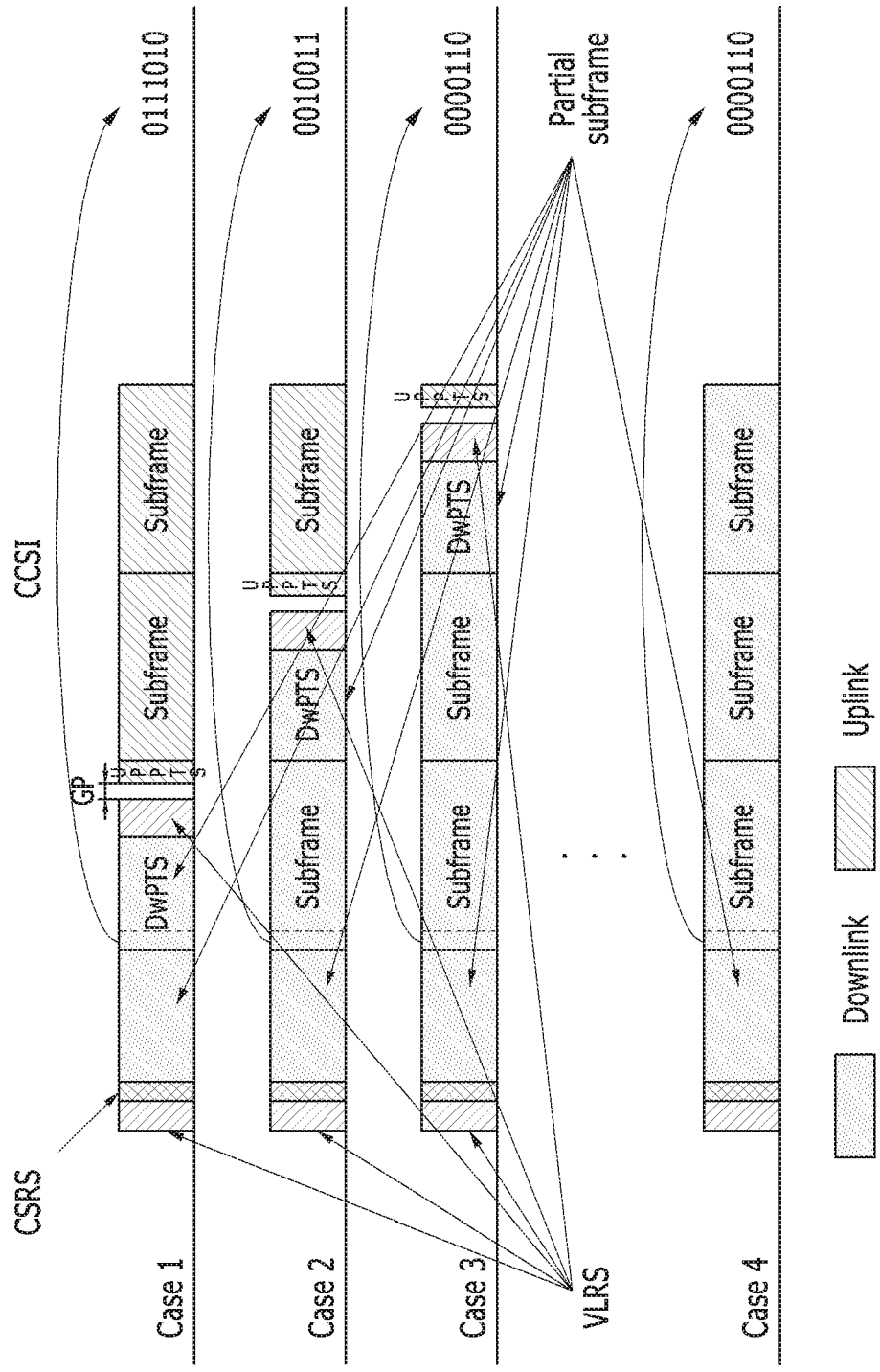
FIG. 45 is a diagram illustrating a CCSI information configuration of a second subframe (or second SPS) when a limitation of the maximum continuous transmission length is 4 ms, according to an exemplary embodiment of the present invention.

FIG. 45 is a diagram illustrating a CCSI information configuration of a second subframe (or second SPS) when a limitation of the maximum continuous transmission length is 4 ms, according to an exemplary embodiment of the present invention.

As illustrated in FIG. 45, the CCSI information included in the subframe (special subframe or downlink subframe) transmitted after the SPS is different from the CCSI information (FIG. 44) included in the SPS.

In the continuous transmission burst of the Case 1 illustrated in FIG. 45, the CCSI information included in the special subframe after the SPS is 0111010. In detail, to inform that the subframe transmitted at the next subframe timing is the uplink subframe and the two uplink subframes are configured, the MSB 3 bits among the CCSI (7 bits) become 011. Further, to inform that the downlink transmission portion (DwPTS) of the current special subframe occupies ten OFDM symbols, the LSB 4 bits among the CCSI (7 bits) become 1010.

In Case 2 illustrated in FIG. 45, the CCSI information included in the subframe after the SPS is 0010011. In detail, to inform that the subframe transmitted after the current subframe is the special subframe and the downlink subframe is an end, the MSB 3 bits among the CCSI (7 bits) become 001. Further, to inform that the downlink transmission portion (DwPTS) of the special subframe after the current subframe occupies ten OFDM symbols, the LSB 4 bits among the CCSI (7 bits) become 0011.

In Cases 3 and 4 illustrated in FIG. 45, the CCSI information included in the special subframe after the SPS is 0000110. In detail, to inform that the subframe transmitted after the current subframe is the downlink subframe, the MSB 3 bits among the CCSI (7 bits) become 000. Further, to inform that the downlink subframe after the current subframe occupies the full subframe (occupying 14 OFDM symbols), the LSB 4 bits among the CCSI (7 bits) become 0110.

Meanwhile, as illustrated in FIG. 44 or 45, the uplink consists of the UpPTS and a legacy LTE uplink subframe. The VLRS and a void guard period (GP) in which no signal is transmitted are present between the downlink transmission period and the uplink transmission period.

Figure 46:
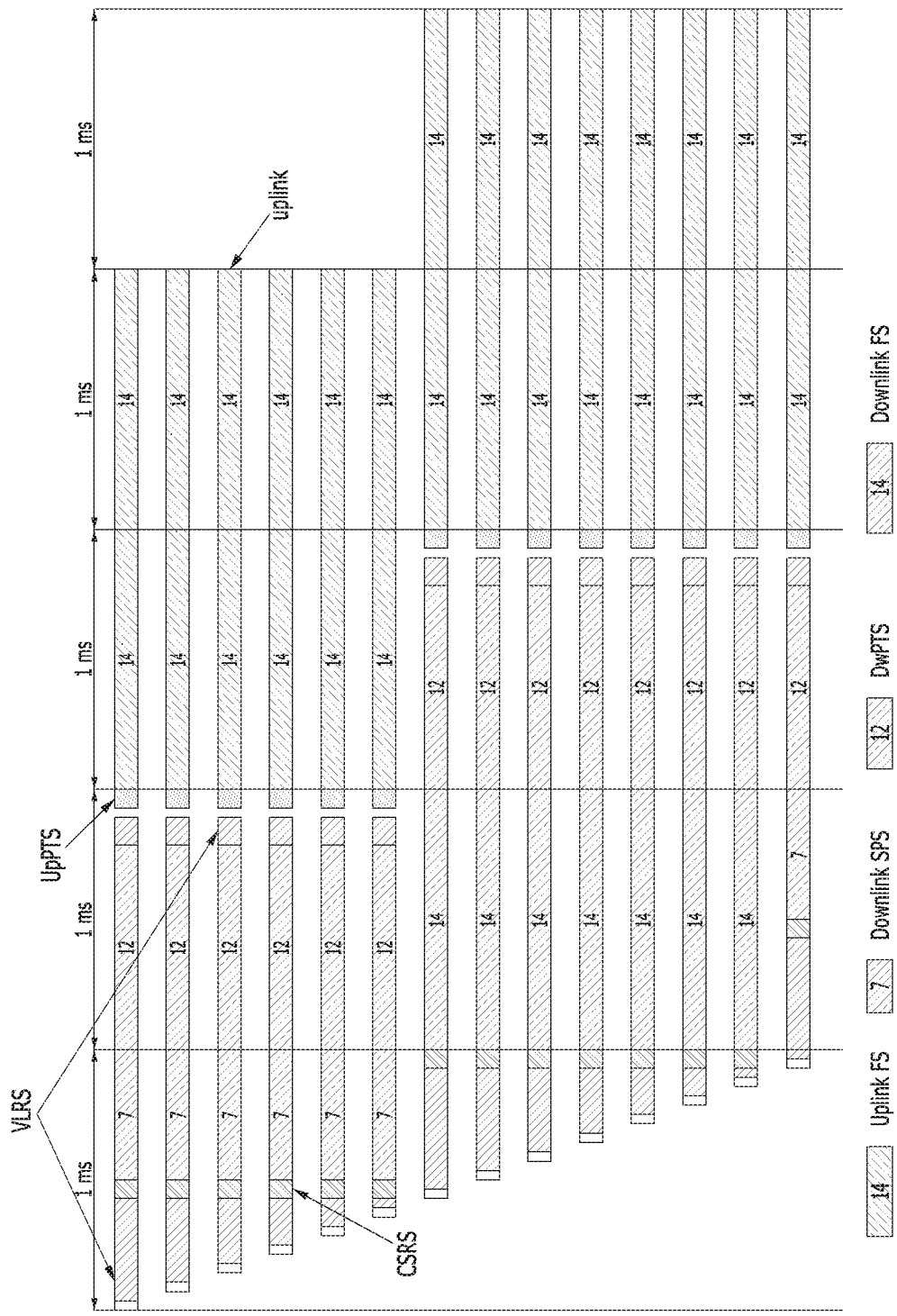
FIG. 46 is a diagram illustrating a downlink and uplink frame configuration using a VLRS, a CSRS, a partial subframe (TS-DwPTS), a downlink full subframe, an UpPTS, and an uplink subframe, according to an exemplary embodiment of the present invention.

FIG. 46 is a diagram illustrating a downlink and uplink frame configuration using a VLRS, a CSRS, a partial subframe (TS-DwPTS), a downlink full subframe, an UpPTS, and an uplink subframe, according to an exemplary embodiment of the present invention.

Figure 47:
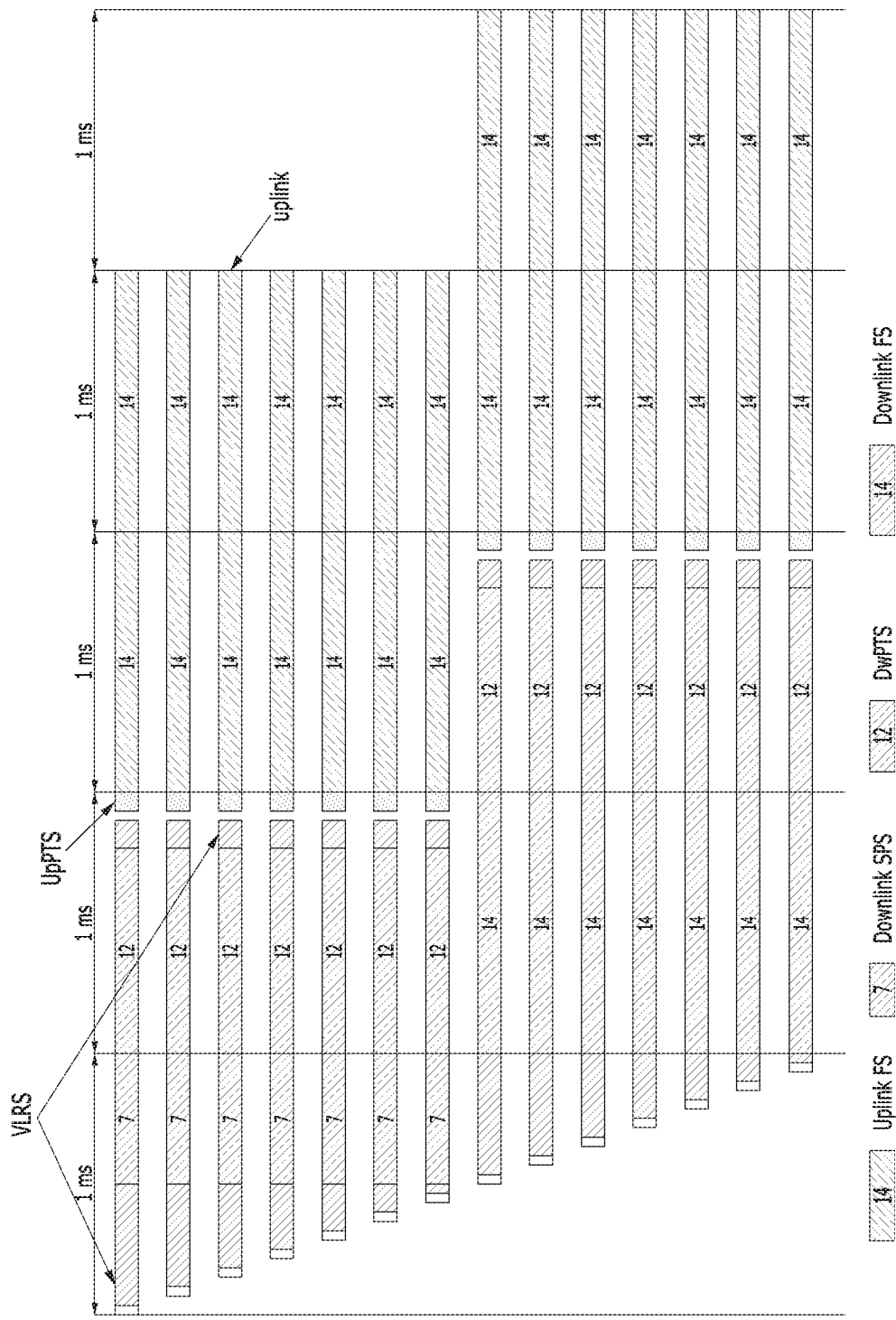
FIG. 47 is a diagram illustrating the downlink and uplink frame configuration using the VLRS, the partial subframe (TS-DwPTS), the downlink full subframe, the UpPTS, and the uplink subframe, according to an exemplary embodiment of the present invention.

Further, FIG. 47 is a diagram illustrating the downlink and uplink frame configuration using the VLRS, the partial subframe (TS-DwPTS), the downlink full subframe, the UpPTS, and the uplink subframe, according to an exemplary embodiment of the present invention.

FIGS. 46 and 47 illustrate the case in which the downlink SPS has a length of 7 OFDM symbols and the DwPTS of the special subframe has a length of 12 OFDM symbols.

The exemplary embodiment of FIG. 47 is different from the exemplary embodiment of FIG. 46 in that the CSRS transmission is not transmitted.

If the special subframe is transmitted, the position at which the special subframe may be transmitted is relative depending on the timing when the initial VLRS is transmitted. As illustrated in FIGS. 46 and 47, the reason why the special subframe is not transmitted from the initial transmission signal is that the terminal (receiver) may have an insufficient margin for processing time to demodulate the CCSI and then perform the uplink transmission. That is, for the terminal to have a sufficient time margin required to demodulate the information of the CCSI included in the downlink transmission and prepare the uplink transmission, all the initial transmission is made as the downlink transmission. As a result, a difference between the timing when the CCSI of the initial downlink data transmission signal (for example, SPS or starting full subframe) is transmitted and the timing when the first uplink transmission is made is equal to or more than 1.5 subframe.

Therefore, as illustrated in FIG. 46 or 47, the downlink subframe (or partial subframe) is transmitted at least once before the special subframe.

Figure 48:
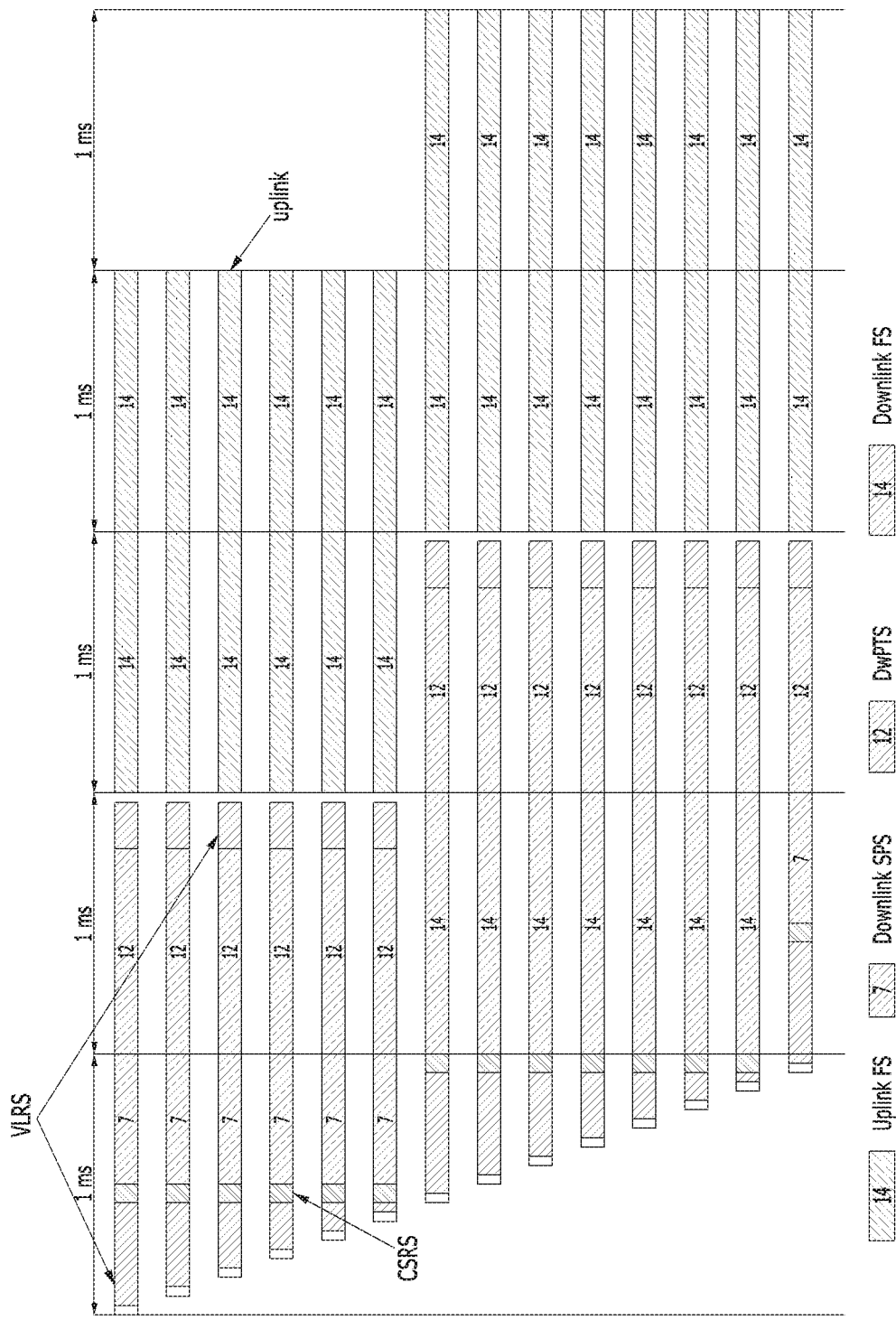
FIG. 48 is a diagram illustrating the downlink and uplink frame configuration using the VLRS, the CSRS, the partial subframe (TS-DwPTS), the downlink full subframe, and the uplink subframe, according to an exemplary embodiment of the present invention.

FIG. 48 is a diagram illustrating the downlink and uplink frame configuration using the VLRS, the CSRS, the partial subframe (TS-DwPTS), the downlink full subframe, and the uplink subframe, according to an exemplary embodiment of the present invention.

Figure 49:
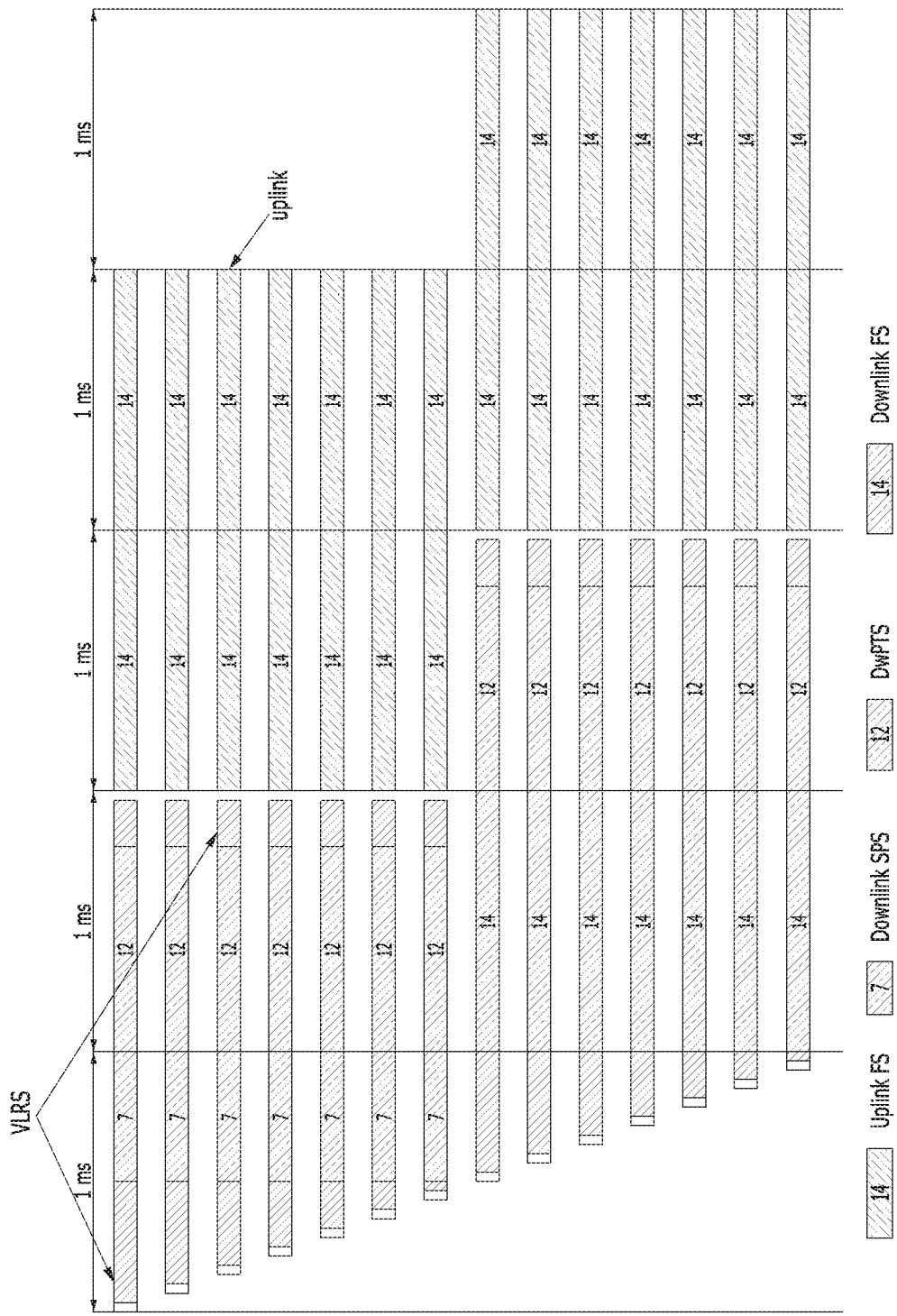
FIG. 49 is a diagram illustrating the downlink and uplink frame configuration using the VLRS, the partial subframe (TS-DwPTS), the downlink full subframe, and the uplink subframe, according to an exemplary embodiment of the present invention.

FIG. 49 is a diagram illustrating the downlink and uplink frame configuration using the VLRS, the partial subframe (TS-DwPTS), the downlink full subframe, and the uplink subframe, according to an exemplary embodiment of the present invention.

FIGS. 48 and 49 illustrate the case in which the downlink SPS has a length of 7 OFDM symbols and the DwPTS of the special subframe has a length of 12 OFDM symbols.

The exemplary embodiment of FIGS. 48 and 49 is different from the exemplary embodiment of FIGS. 46 and 47 in that the uplink signal is transmitted without the UpPTS.

The exemplary embodiment of FIG. 49 is different from the exemplary embodiment of FIG. 48 in that the CSRS transmission is not transmitted.

4.3. Method for Determining Opportunistic and Adaptive Uplink Signal Transmission Timing Suitable for Unlicensed Band by Using Aggregated Uplink Transmission Time Indicator Signal (AUTTIS)

The transmission timing of the uplink signal may be efficiently determined to match the unlicensed band based on the frame structure illustrated in FIG. 44 or 45.

Figure 50:
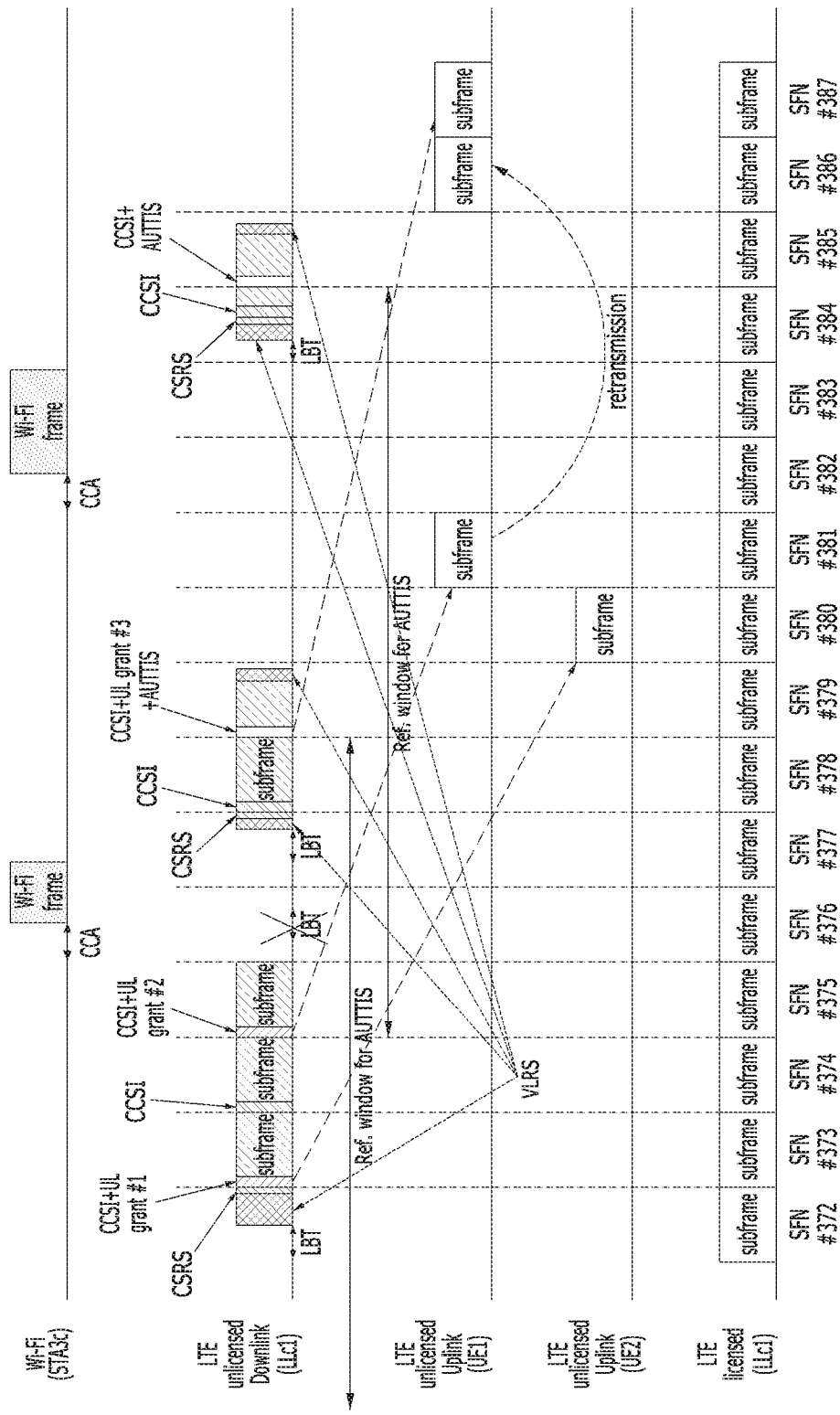
FIG. 50 is a diagram illustrating a relationship between the UL grant and the AUTTIS information and the uplink transmission, according to an exemplary embodiment of the present invention.

FIG. 50 is a diagram illustrating a relationship between the UL grant and the AUTTIS information and the uplink transmission, according to an exemplary embodiment of the present invention. FIG. 50 illustrates the WiFi device STA3c and the terminals UE1 and UE2 operated in the unlicensed band and the LTE base station LLc1 operated in both of the unlicensed band and the licensed band.

In detail, FIG. 50 illustrates when the terminal granted by the base station performs the uplink transmission in the case in which the LTE unlicensed band system and the WiFi system coexist.

As illustrated in FIG. 50, the uplink (UL) grant is given (transmitted) at the subframe numbers (SFNs) 373, 375, and 379. That is, the CCSI and the UL grant UL grant #1 for the terminal UE2 are given (transmitted) at the timing of the SFN 373 and the CCSI and the UL grants UL grant #2 and UL grant #3 for the terminal are given (transmitted) at the timing of the SFNs 375 and 379. In the present specification, transmitting and receiving a signal at SFN A includes transmitting and receiving a signal at the timing of the SFN A.

If the UL grant is transmitted, the terminals UE1 and UE2 receiving the UL grant are prepared to perform the uplink transmission. However, the timing when the terminals UE1 and UE2 actually transmit the uplink signal is just after the timing when the AUTTIS is received.

As illustrated in FIG. 50, when the UL grants UL grant #1, #2, and #3 are transmitted at the SFNs 373, 375, and 379, the LTE base station LLc1 confirms that the unlicensed band channel is in the idle status at the timing of the SFNs 378 and 384. Further, the LTE base station LLc1 succeeds in the approach to the corresponding channel to transmit the VLRS and the CSRS after the constant back-off. The CSRS is omitted and may be replaced by the VLRS.

Then, the LTE base station LLc1 transmits the control channel (for example, PDCCH) including the AUTTIS and the CCSI at the timing of the SFNs 379 and 385.

Next, the terminals UE1 and UE2 demodulate the AUTTIS included in the control channel at the timing of the SFNs 379 and 385.

If the terminals UE1 and UE2 succeed in the AUTIS demodulation, the terminal transmission timing information is confirmed within past N (for example, 8) subframe time reversely from the demodulation timing. Here, the terminal transmission timing information means the transmission timing information of the transmittable terminal determined by the LTE base station LLc1. That is, since the terminals UE1 and UE2 know the timing when the UL grant is given through the reception of the previous control channel, when the UL grant timing represented by the AUTTIS and the timing of the UL grant actually received by the terminals UE1 and UE2 coincide with each other, the terminals UE1 and UE2 may perform the uplink transmission.

As described above, the AUTTIS included in the control channel (for example, PDCCH) suggests the information on the uplink frame response transmission instruction for the subframe time to which the UL grant is transmitted within a length of a window for the AUTTIS. Here, the window for the AUTTIS corresponds to past N (8) subframes based on the timing when the AUTTIS is transmitted.

That is, if the UL granted terminal UE1 and UE2 demodulate the AUTTIS, they may confirm the transmission grant signal matching the timing of the subframe to which the UL grant is transmitted among past N (for example, 8) subframes based on the timing (for example, SFN 379 or 385) of the subframe at which the AUTTIS is transmitted.

Meanwhile, in FIG. 50, the terminals UE1 and UE2 do not check whether the unlicensed band channel is in an idle status. That is, when the terminals UE1 and UE2 receive the AUTTIS, if a predetermined time (for example, 4 ms) lapses from the timing when the UL grant is received, the uplink transmission may be performed to fit an order represented by the AUTTIS without confirming the channel state (channel status). For this purpose, the LTE base station LLc1 performs the scheduling for the unlicensed band channel (for example, continuously transmit the VLRS).

The transmission and the retransmission of the terminals UE1 and UE2 will be described in detail with reference to FIG. 51.

Figure 51:
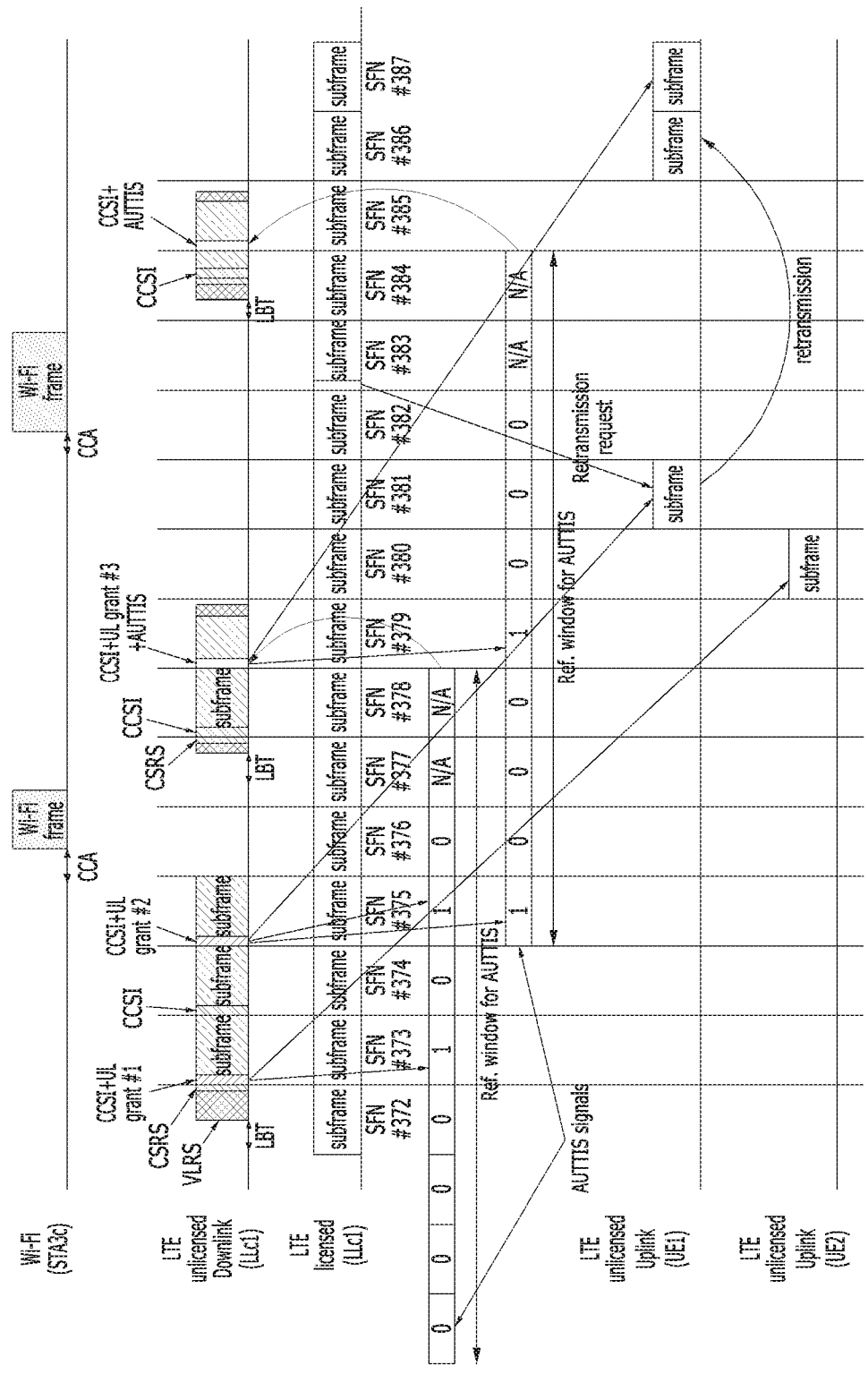
FIG. 51 is a diagram illustrating a relationship between the AUTTIS binary bit structure and the uplink grant (UL grant), according to an exemplary embodiment of the present invention.

FIG. 51 is a diagram illustrating a relationship between the AUTTIS binary bit structure and the uplink grant (UL grant), according to an exemplary embodiment of the present invention. FIG. 51 illustrates the WiFi device STA3c and the terminals UE1 and UE2 operated in the unlicensed band and the LTE base station LLc1 operated in both of the unlicensed band and the licensed band. In detail, the exemplary embodiment of FIG. 51 is based on the exemplary embodiment of FIG. 50.

As illustrated in FIG. 51, the AUTTIS may represent, in a subframe unit, the subframe at which the UL grant information is transmitted among past N (for example, 8) subframes based on the timing at which the AUTTIS is transmitted. For example, when N=8, the AUTTIS may consist of 8 bits.

Further, since the transmission order of the terminal from a bit closest to the MSB of the AUTTIS is determined, the transmission order for a plurality of terminals may be automatically determined.

For example, if it is assumed that the UL grant UL grant #1 for the terminal UE2 is transmitted at the SFN 373 and the UL grants UL grant #2 and #3 for the terminal UE1 are transmitted at the SFN 375 and 379, the transmission timing of the terminals UE1 and UE2 will be described in detail.

As illustrated in FIG. 51, the AUTTIS received by the terminals UE1 and UE2 at the timing of the SFN 379 informs the terminals UE1 and UE2 of the information on the SFN to which the UL grant is transmitted among the SFNs 369 to 376.

When each bit for the SFNs 373 and 375 among 8 bits of the AUTTIS transmitted at the SFN 379 is set to be 1 (when the bits for the rest SFNs is set to be 0), the terminals UE1 and UE2 receives the corresponding AUTTIS at the SFN 379 and demodulates it and then the terminal UE2 associated with the UL grant UL grant #1 transmitted at the SFN 373 performs the uplink transmission at the timing of the SFN 380 and the terminal UE1 associated with the UL grant UL grant #2 transmitted at the SFN 375 performs the uplink transmission at the timing of the SFN 381. That is, the terminal UE2 confirms that four bits before a bit for the SFN 373 among 8 bits of the AUTTIS transmitted at the SFN 379 have a value of 0 and performs the uplink transmission at the SFN 380 subsequent to the SFN 379 at which the AUTTIS is transmitted. Further, the terminal UE1 confirms that one bit (bit for the SFN 373) having a value of 1 before a bit for the SFN 375 among 8 bits of the AUTTIS transmitted at the SFN 379 is present and the uplink transmission is performed at the SFN 381 after waiting one subframe time from the SFN 379 at which the AUTTIS is transmitted.

That is, the bit set to be 1 among 8 bits of the AUTTIS transmitted at the SFN 379 is two (bit for the SFNs 373 and 375). The UL grant UL grant #1 corresponding to the bit closest to the MSB among two bits having the value of 1 has priority that may preferentially transmit a signal. Therefore, at the SFN 380, the terminal UE2 performs the uplink signal transmission prior to the terminal UE1 and then at the SFN 381, the terminal UE1 performs the transmission of the uplink signal.

The AUTTIS transmitted at the SFN 379 is 00001010 (when N=8) and the AUTTIS transmitted at the SFN 385 is 10001000 (when N=8). That is, the number of bits having a value of 1 among the bits of the AUTTIS transmitted at the SFN 379 is two and a bit closest to the MSB among the two bits having a value of 1 corresponds to the UL grant UL grant #1 transmitted by the LTE base station LLc1 at the SFN 373 and a bit second closest to the MSB corresponds to the UL grant UL grant #2 transmitted by the LTE base station LLc1 at the SFN 375.

Therefore, since there is no UL grant transmitted at the SFN 374, the terminal UE2 and the terminal UE1 may sequentially perform the uplink transmission at the SFNs 380 and 381 and the LTE base station LLc1 may know that the terminals UE2 and UE1 sequentially transmit the uplink signal without a gap.

As a result, when the AUTTIS may be transmitted by the LTE base station LLc1 in the unlicensed band, the LTE base station LLc1 may efficiently inform the terminals UE1 and UE2 of the uplink transmission timing in an asynchronous, adaptive, and aggregated form. Further, the method for using an AUTTIS has advantages in that the uplink transmission is not performed at the timing when a predetermined time (4 ms) lapses from the UL grant timing, that is, has the transmission timing flexibility.

When the plurality of terminals obtains the UL grant at the same subframe time and transmits a signal, the plurality of terminals may simultaneously transmit a signal based on the frequency division multiplexing like the operation of the existing licensed band.

Meanwhile, the AUTTIS may have a function of separately informing a retransmission request. In the method according to the exemplary embodiment of the present invention, unlike the hybrid automatic repeat request (HARQ) uplink transmission timing-based scheme in the synchronous form that is a scheme for the existing licensed band, the asynchronous retransmission scheduling is performed.

As illustrated in FIG. 51, the LTE base station LLc1 requests the retransmission of the uplink subframe transmitted by the terminal UE1 at the SFN 381 to the terminal UE1 through the licensed band at the SFN 383. That is, the LTE base station LLc1 may request the retransmission of the corresponding uplink subframe to the terminal UE1 when not receiving the uplink subframe transmitted at the SFN 381. Further, the terminal UE1 performs the retransmission of the corresponding uplink subframe at the SFN 386.

Since the AUTTIS transmitted at the SFN 385 indicates the UL grant UL grant #2 transmitted at the SFN 375 (MSB 1 bit of the AUTTIS has the value of 1), the retransmission of the uplink signal received at the SFN 381 by the LTE base station LLc1 is performed. In FIG. 51, the window for the AUTTIS transmitted at the SFN 385 correspond to the SFN 375 to SFN 382.

The AUTTIS transmitted at the SFN 385 is 10001000 (in the case of N=12), in which a bit closest to the MSB among two bits having a value of 1 corresponds to the UL grant (UL grant #2) transmitted by the LTE base station LLc1 at the SFN 375 and a bit second closest to the MSB corresponds to the UL grant (UL grant #3) transmitted by the LTE base station LLc1 at the SFN 379. That is, since a bit closest to the MSB among two bits having a value of 1 corresponds to the retransmission, the terminal UE1 performs the retransmission at the SFN 386 and the uplink subframe corresponding to the UL grant (UL grant #3) transmitted at the SFN 379 is transmitted at SFN 387.

Figure 52:
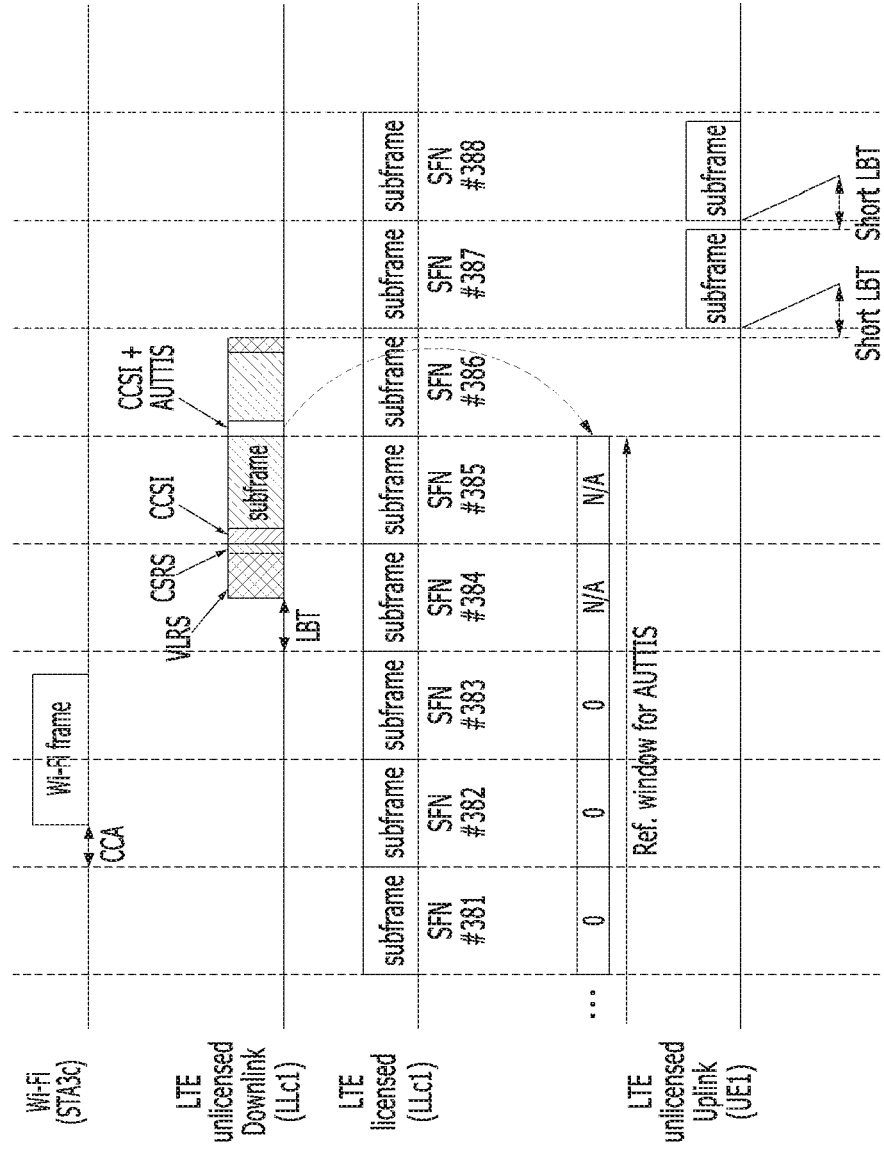
FIG. 52 is a diagram illustrating the short LBT performed just before the uplink transmission, according to an exemplary embodiment of the present invention.

FIG. 52 is a diagram illustrating the short LBT performed just before the uplink transmission, according to an exemplary embodiment of the present invention. FIG. 52 illustrates the WiFi device STA3c and the terminal UE1 operated in the unlicensed band and the LTE base station LLc1 operated in both of the unlicensed band and the licensed band.

FIG. 52 illustrates the case in which the LTE base station LLc1 transmits the control channel including the AUTTIS and the CCSI at the timing of the SFN 386.

As illustrated in FIG. 52, the terminal UE1 may transmit the uplink signal after performing a short LBT operation prior to performing the uplink transmission. The case in which the short LBT is not applied (for example, exemplary embodiment of FIG. 51) corresponds to the default.

As illustrated in FIG. 52, the time of the short LBT performed by the terminal UE1 is shorter than the time of the foregoing LBT (for example, the time of the LBT when the LTE base station is performed).

If the sharing channel is in the busy status for the short LBT period, the terminal UE1 cancels the uplink transmission and if the corresponding sharing channel is in the idle status, the terminal UE1 performs the uplink transmission.

However, when the short LBT is applied (for example, exemplary embodiment of FIG. 52) and the short LBT is not applied (for example, exemplary embodiment of FIG. 51), there is no difference in the entire uplink transmission timing indicated in the subframe unit by the AUTTIS and the mechanism. That is, the exemplary embodiment of FIG. 52 is different from the exemplary embodiment of FIG. 51 in that the short LBT is applied, but the rest operation principle of the exemplary embodiment of FIG. 52 is similar to that of the exemplary embodiment of FIG. 51.

Meanwhile, as illustrated in FIG. 52, when the terminal UE1 performs the short LBT, the uplink subframe (for example, length of 13 or 12 OFDM symbols) having a length smaller than the full subframe, not the full subframe (14 OFDM symbols) may be transmitted after the short LBT.

Meanwhile, the length of the short LBT may be $(16+9*k)_l$ as. Here, k is a parameter defined by the system.

Figure 53:
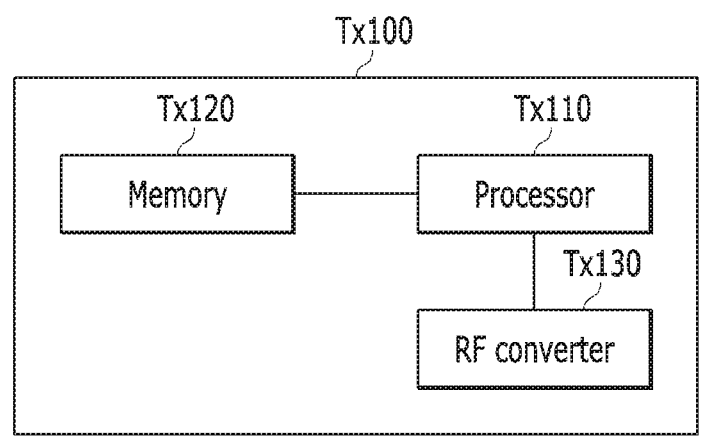
FIG. 53 is a diagram illustrating a transmitter according to an exemplary embodiment of the present invention.

FIG. 53 is a diagram illustrating a transmitter according to an exemplary embodiment of the present invention.

A transmitter Tx100 includes a processor Tx110, a memory Tx120, and a radio frequency (RF) converter Tx130.

The processor Tx110 may be configured to implement the procedures, the functions, and the methods described in connection with the transmission of the base station or the transmission of the terminal in the present specification. Further, the processor Tx110 may control each component of the transmitter Tx100.

The memory Tx120 is connected to the processor Tx110 and stores various types of information associated with the operation of the processor Tx110.

The RF converter Tx130 is connected to the processor Tx110 to transmit and receive a radio signal. Further, the transmitter Tx100 may have a single antenna or a multiple antenna.

The transmitter Tx100 may be the base station or the terminal

Figure 54:
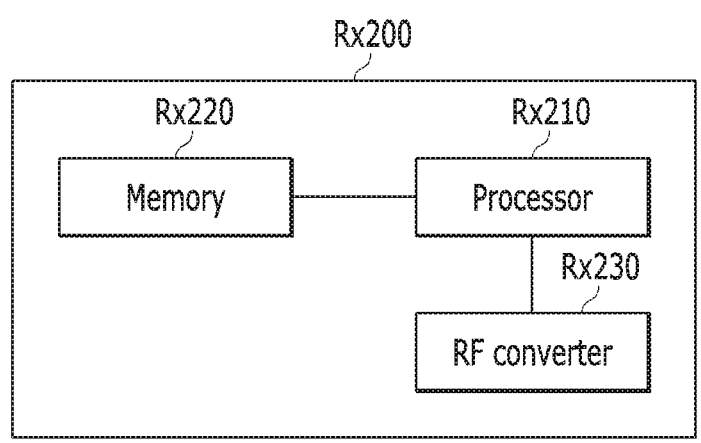
FIG. 54 is a diagram illustrating a receiver according to an exemplary embodiment of the present invention.

FIG. 54 is a diagram illustrating a receiver according to an exemplary embodiment of the present invention.

A receiver Rx200 includes a processor Rx210, a memory Rx220, and an RF converter Rx230.

The processor Rx210 may be configured to implement the procedures, the functions, and the methods described in connection with the reception of the base station or the reception of the terminal in the present specification. Further, the processor Rx210 may control each component of the receiver Rx200.

The memory Rx220 is connected to the processor Rx210 and stores various types of information associated with the operation of the processor Rx210.

The RF converter Rx230 is connected to the processor Rx210 to transmit and receive a radio signal. Further, the transmitter Rx200 may have a single antenna or a multiple antenna.

The receiver Rx200 may be the terminal or the base station

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A transmission method for a transmitter, the method comprising:
   performing channel sensing for occupying an unlicensed band;
   after the unlicensed band is determined to be idle as a result of the channel sensing, transmitting first configuration information through a control channel included in a first unit duration and transmitting data through a data channel included in the first unit duration; and
   transmitting second configuration information through another control channel included in a next unit duration following the first unit duration and transmitting data through another data channel included in the next unit duration following the first unit duration,
   wherein the first configuration information indicates a number of symbols occupied in the next unit duration following the first unit duration and the second configuration information indicates the number of symbols occupied in the next unit duration following the first unit duration.

2. The method of claim 1, wherein the first configuration information consists of 4 bits.

3. The method of claim 1, further comprising:
   transmitting a reservation signal for preventing other devices from occupying the unlicensed band when the unlicensed band is determined to be idle as a result of the channel sensing before the control channel and the data channel included in the first unit duration are transmitted.

4. The method of claim 3, wherein a time length of the reservation signal is 16 samples.

5. A transmission method for a transmitter, the method comprising:
   performing channel sensing for occupying an unlicensed band;
   after the unlicensed band is determined to be idle as a result of the channel sensing, transmitting first configuration information through a control channel included in a first unit duration and transmitting data through a data channel included in the first unit duration; and
   transmitting second configuration information through another control channel included in a next unit duration following the first unit duration and transmitting data through another data channel included in the next unit duration following the first unit duration,
   wherein the first configuration information indicates a number of symbols occupied in the next unit duration following the first unit duration and the second configuration information indicates a number of symbols occupied in a unit duration which follows the next unit duration following the first unit duration.

6. A reception method performed through an unlicensed band by a receiver, the method comprising:
   receiving a reference signal from a transmitter after the unlicensed band is determined to be idle;
   receiving first configuration information through a control channel included in a first unit duration and receiving data through a data channel included in the first unit duration; and
   receiving second configuration information through another control channel included in a next unit duration following the first unit duration and receiving data through another data channel included in the next unit duration following the first unit duration,
   wherein the first configuration information indicates a number of symbols occupied in a next unit duration following the first unit duration and the second configuration information indicates the number of symbols occupied in the next unit duration following the first unit duration.

7. A reception method performed through an unlicensed band by a receiver, the method comprising:
   receiving a reference signal from a transmitter after the unlicensed band is determined to be idle;
   receiving first configuration information through a control channel included in a first unit duration and receiving data through a data channel included in the first unit duration; and
   receiving second configuration information through another control channel included in a next unit duration following the first unit duration and receiving data through another data channel included in the next unit duration following the first unit duration,
   wherein the first configuration information indicates a number of symbols occupied in the next unit duration following the first unit duration and the second configuration information indicates another number of symbols occupied in a unit duration which follows the next unit duration following the first unit duration.

8. The method of claim 7, wherein the first configuration information consists of 4 bits.

9. The method of claim 7, wherein the reference signal is received for preventing other devices from occupying the unlicensed band when the unlicensed band is determined to be idle before the control channel and the data channel included in the first unit duration are received from the transmitter.

10. The method of claim 9, wherein a time length of the reference signal is 16 samples.

\* \* \* \* \*